United States Patent
Cummings et al.

(10) Patent No.: US 6,630,786 B2
(45) Date of Patent: Oct. 7, 2003

(54) LIGHT-EMITTING DEVICE HAVING LIGHT-REFLECTIVE LAYER FORMED WITH, OR/AND ADJACENT TO, MATERIAL THAT ENHANCES DEVICE PERFORMANCE

(75) Inventors: William J. Cummings, San Francisco, CA (US); Lawrence S. Pan, Los Gatos, CA (US); Christopher J. Spindt, Menlo Park, CA (US); George B. Hopple, Palo Alto, CA (US); Colin D. Stanners, San Jose, CA (US); James C. Dunphy, San Jose, CA (US); Shiyou Pei, Saratoga, CA (US); Theodore S. Fahlen, San Jose, CA (US)

(73) Assignees: Candescent Technologies Corporation, Los Gatos, CA (US); Candescent Intellectual Property Services, Inc., Los Gatos, CA (US)

( * ) Notice: Subject to any disclaimer, the term of this patent is extended or adjusted under 35 U.S.C. 154(b) by 0 days.

(21) Appl. No.: 09/823,872

(22) Filed: Mar. 30, 2001

(65) Prior Publication Data

US 2002/0190643 A1 Dec. 19, 2002

(51) Int. Cl.[7] .................. H01J 17/24; H01J 19/70; H01J 61/26
(52) U.S. Cl. .................. 313/553; 313/496; 313/554
(58) Field of Search .................. 313/553, 554, 313/555, 495, 493, 524, 103 CM, 496

(56) References Cited

U.S. PATENT DOCUMENTS

| | | | |
|---|---|---|---|
| 3,585,433 A | * | 6/1971 | O'Keefe .................. 313/542 |
| 3,867,662 A | * | 2/1975 | Endriz .................. 313/542 |
| 5,453,659 A | | 9/1995 | Wallace et al. .................. 313/495 |
| 5,498,925 A | | 3/1996 | Bell et al. .................. 313/497 |
| 5,520,563 A | | 5/1996 | Wallace et al. .................. 445/24 |
| 5,548,181 A | | 8/1996 | Jones .................. 313/309 |
| 5,606,225 A | | 2/1997 | Levine et al. .................. 315/169.3 |
| 5,614,785 A | | 3/1997 | Wallace et al. .................. 315/496 |
| 5,628,662 A | | 5/1997 | Vickers et al. .................. 445/24 |
| 5,656,889 A | | 8/1997 | Niiyama et al. .................. 313/553 |
| 5,689,151 A | | 11/1997 | Wallace et al. .................. 313/495 |
| 5,693,438 A | | 12/1997 | Liu et al. .................. 430/28 |
| 5,725,787 A | * | 3/1998 | Curtin et al. .................. 216/25 |
| 5,789,859 A | | 8/1998 | Watkins et al. .................. 313/495 |
| 5,793,158 A | * | 8/1998 | Wedding, Sr. .................. 313/493 |
| 5,835,991 A | | 11/1998 | Niiyama et al. .................. 313/553 |

(List continued on next page.)

FOREIGN PATENT DOCUMENTS

| | | |
|---|---|---|
| EP | 996141 A2 | 4/2000 |
| JP | 09-082245 | 3/1997 |
| WO | WO 99/00822 | 1/1999 |
| WO | WO 00/02081 | 1/2000 |

OTHER PUBLICATIONS

U.S. patent application Ser. No. 09/698,696, filed Oct. 27, 2000 (205 pages).

Washington, "Color Display Using the Channel Multiplier CRT," *Procs. SID*, 1998, pp. 23–31.

Primary Examiner—Vip Patel
Assistant Examiner—Kevin Quarterman
(74) Attorney, Agent, or Firm—Ronald J. Meetin

(57) ABSTRACT

A light-emitting device (42, 68, 80, 90, or 100) suitable for a flat-panel CRT display contains a plate (54), a light-emissive region (56), a light-blocking region (58), and a light-reflective layer (60 or 70). The light-emitting device achieves one or more of the following characteristics by suitably implementing the light-reflective layer or/and providing one or more layers (72, 82, 92, and 100) along the light-reflective layer: (a) reduced electron energy loss as electrons pass through the light-reflective layer, (b) gettering along the light-reflective layer, (c) reduced secondary electron emission along the light-reflective layer, (d) reduced electron backscattering along the light-reflective layer, and (e) reduced chemical reactivity along the light-reflective layer.

128 Claims, 13 Drawing Sheets

U.S. PATENT DOCUMENTS

| | | | |
|---|---|---|---|
| 5,849,442 A | 12/1998 | Liu et al. | 430/28 |
| 5,858,619 A | 1/1999 | Chang et al. | 430/312 |
| 5,859,502 A | 1/1999 | Spindt et al. | 315/169.3 |
| 5,865,930 A * | 2/1999 | Schmid et al. | 156/265 |
| 5,866,978 A | 2/1999 | Jones et al. | 313/495 |
| 5,869,928 A | 2/1999 | Liu et al. | 313/495 |
| 5,874,803 A * | 2/1999 | Garbuzov et al. | 313/506 |
| 5,920,080 A * | 7/1999 | Jones | 257/40 |
| 5,923,120 A * | 7/1999 | Suzuki et al. | 313/532 |
| 5,931,713 A | 8/1999 | Watkins et al. | 445/55 |
| 5,936,342 A | 8/1999 | Ono et al. | 313/495 |
| 5,945,780 A | 8/1999 | Ingle et al. | 313/495 |
| 5,969,343 A | 10/1999 | Nakamura et al. | 250/227.31 |
| 5,990,614 A * | 11/1999 | Spindt | 313/495 |
| 5,998,925 A * | 12/1999 | Shimizu et al. | 313/503 |
| 6,020,683 A * | 2/2000 | Cathey, Jr. et al. | 313/497 |
| 6,049,165 A | 4/2000 | Spindt et al. | 313/495 |

* cited by examiner

Fig. 8d1 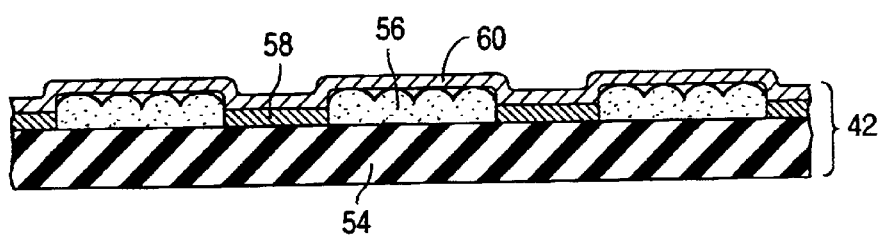
Fig. 8d2 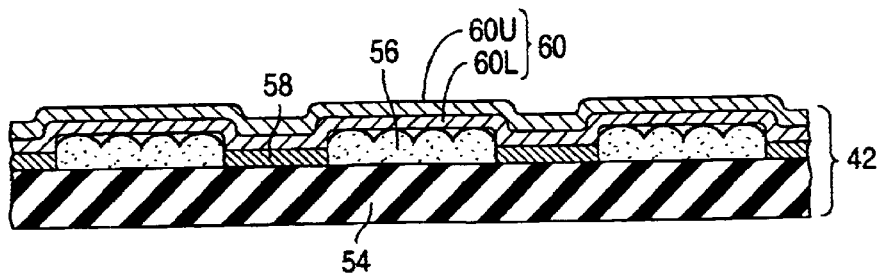

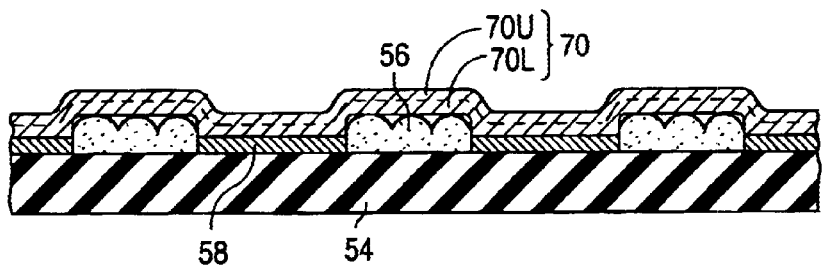
Fig. 14a
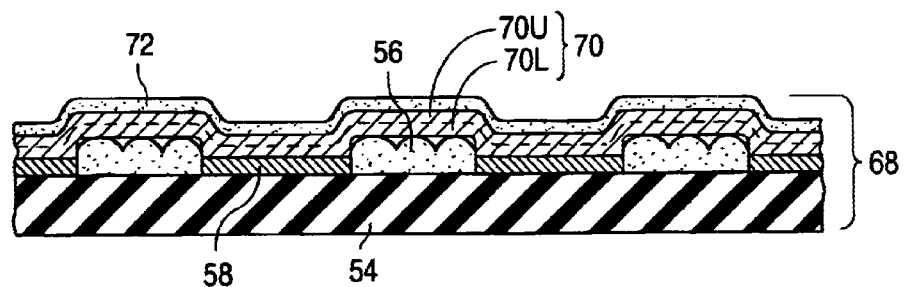
Fig. 14b1
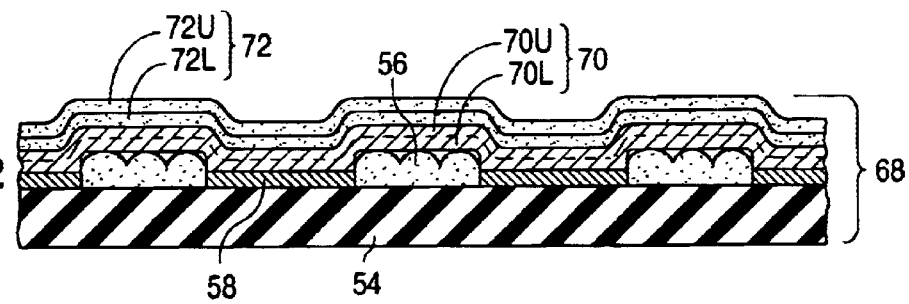
Fig. 14b2
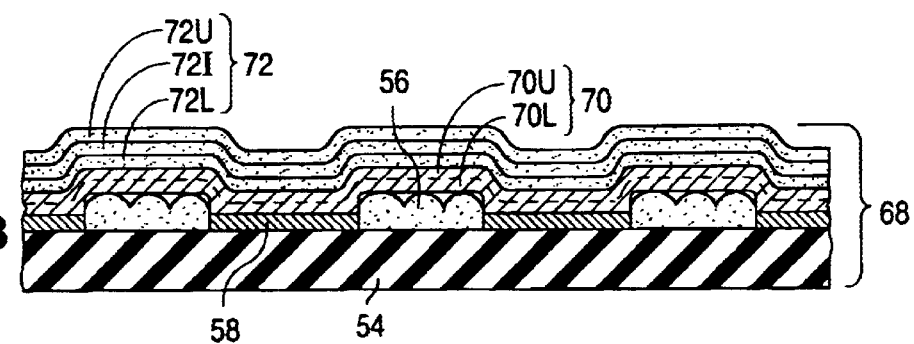
Fig. 14b3

LIGHT-EMITTING DEVICE HAVING LIGHT-REFLECTIVE LAYER FORMED WITH, OR/AND ADJACENT TO, MATERIAL THAT ENHANCES DEVICE PERFORMANCE

FIELD OF USE

This invention relates to the configuration and manufacture of light-emitting devices suitable for use in flat-panel displays such as flat-panel cathode-ray tube ("CRT") displays.

BACKGROUND ART

A flat-panel CRT display is formed with an electron-emitting device and an oppositely situated light-emitting device. The electron-emitting device, or cathode, contains electron-emissive elements that emit electrons across a relatively wide area. An anode in the light-emitting device attracts the electrons toward light-emissive regions distributed across a corresponding area in the light-emitting device. The anode can be located above or below the light-emissive regions. In either case, the light-emissive regions emit light upon being struck by the electrons to produce an image on the display's viewing surface.

FIG. 1 presents a side cross section of part of a conventional flat-panel CRT display such as that described in U.S. Pat. No. 5,859,502 or U.S. Pat. No. 6,049,165. The flat-panel CRT display of FIG. 1 is formed with electron-emitting device 20 and light-emitting device 22. Electron-emitting device 20 contains backplate 24 and overlying electron-emissive regions 26. Electrons emitted by regions 26 travel toward light-emitting device 22 under control of electron-focusing system 28. Item 30 represents an electron trajectory.

Light-emitting device 22, a partial plan view of which is shown in FIG. 2, contains faceplate 32 coupled to electron-emitting device 20 through an outer wall (not shown) to form a sealed enclosure maintained at a high vacuum. Light-emissive regions 34 overlie faceplate 32 respectively opposite electron-emissive regions 26. When electrons emitted by regions 26 strike light-emissive regions 34, the light emitted by regions 34 produces the display's image on the exterior surface (lower surface in FIG. 1) of light-emitting device 22. Contrast-enhancing black matrix 36 laterally surrounds regions 34.

Light-emitting device 22 also contains light-reflective layer 38 situated over light-emissive regions 34 and black matrix 36. Regions 34 emit light in all directions. Part of the light thus travels backward toward the interior of the display. Layer 38 reflects some of the rear-directed light forward to increase the intensity of the image.

Light-reflective layer 38 typically consists of aluminum, a silvery white metal which is highly reflective of visible light and a good conductor of electricity. Layer 38 is commonly exposed to air at some point during the display fabrication process. Inasmuch as aluminum is of relatively high chemical reactivity, a native coating (not shown) of aluminum oxide normally forms along the outside surface of layer 38 during the exposure to air. The native aluminum oxide coating is quite thin, typically 1–5 nm in thickness.

Light-reflective layer 38 functions as the display's anode. For this purpose, layer 38 receives a high electrical potential that attracts electrons toward light-emitting device 22. Because layer 38 is located above light-emissive regions 34, electrons emitted by regions 26 pass through layer 38 and the overlying native oxide coating before striking light-emissive regions 34. By having layer 38 located above regions 34, the display of FIGS. 1 and 2 avoids the loss in image intensity that occurs in a flat-panel CRT display where light emitted by the light-emitting device must pass through the anode, typically transparent but still partially light-absorbent, before reaching the viewing surface.

A disadvantage of the conventional display of FIGS. 1 and 2 is that the electrons emitted by regions 26 lose some energy when they pass through light-reflective layer 38 and the overlying native oxide coating. Also, instead of passing through layer 38 and the oxide coating, some of the electrons emitted by regions 26 (a) scatter backward off layer 38 or/and the oxide coating or (b) cause layer 38 or/and the oxide coating to emit secondary electrons. Some of the backscattered and secondary electrons strike the interior of the display at such locations as to cause the image to be degraded. In addition, the native oxide coating along light-reflective layer 38 forms part of the interior surface of the display of FIGS. 1 and 2. Contaminants, such as oxygen and other chemically reactive gaseous species, commonly adhere to the oxide coating. As electrons (both primary and secondary) strike the oxide coating, these contaminants can be released into the display's interior and cause damage.

Washington, "Color Display Using the Channel Multiplier CRT", *Procs. SID*, 1998, pages 23–31, discloses a flat channel multiplier CRT display in which a carbon coating is applied to a light-reflective aluminum layer situated over the interior surface of the display's fluorescent screen. Electrons pass through the carbon coating before passing through the aluminum layer to strike the screen. Washington reports that the carbon coating reduces both the number and energy of backscattered electrons. Although Washington is of interest, Washington presents a narrow solution to the electron backscattering problem and does not deal generally with electron backscattering, secondary electron mission, and display contamination problems that occur as electrons impinge on a light-reflective layer such as layer 38 in the conventional display of FIGS. 1 and 2.

It is desirable to reduce the loss in electron energy that occurs when electrons pass through a light-reflective layer in a flat-panel CRT display before striking light-emissive regions in the display's light-emitting device. It is also desirable to have a general methodology for reducing electron backscattering and secondary electron emission that occur as electrons emitted by the display's electron-emitting device impinge on the light-reflective layer. Furthermore, it is desirable to reduce the amount of contaminants released into the interior of the display as electrons impinge on the light-reflective layer.

GENERAL DISCLOSURE OF THE INVENTION

The present invention furnishes a light-emitting device containing a plate, a light-emissive region overlying the plate where the plate is generally transmissive of visible light, and a light-reflective layer extending over the light-emissive region. The light-emitting device of the invention is suitable for use in a flat-panel display, especially a flat-panel CRT display in which an electron-emitting device is situated opposite the light-emitting device. The electron-emitting device emits electrons which pass through the light-reflective layer and strike the light-emissive region, causing it to emit light.

Compared to a conventional light-emitting device having an aluminum light-reflective layer covered with a native coating of aluminum oxide and situated in generally the same relative location as the light-reflective layer in the light-emitting device of the invention, the present light-emitting device is configured to achieve one or more of the following characteristics: (1) reduced electron energy loss as electrons pass through the light-reflective layer, (2) gettering in the immediate vicinity of the light-reflective layer for reducing the amount of damage caused by contaminants, especially contaminants released close to the light-reflective layer, (3) reduced electron backscattering as electrons impinge on the light-reflective layer from above the light-emitting device, (4) reduced secondary electron emission as electrons impinge on the light-reflective layer from above the light-emitting device, and (5) reduced chemical reactivity along the light-reflective layer.

In a first aspect of the invention, the light-reflective layer contains non-aluminum metal consisting of at least one of lithium, beryllium, boron, sodium, and magnesium. The energy lost by an electron in passing through a layer depends on the number of protons that the electron effectively encounters (interacts with) during its passage through the layer. In turn, the number of protons encountered by an electron passing through a layer depends on the layer's thickness, the angle at which the electron impinges on the layer, and the average volumetric density of protons in the layer. Each of lithium, beryllium, boron, sodium, and magnesium is of lower average volumetric proton density than aluminum. As a result, electrons lose, on the average, less energy in passing through the present light-reflective layer than through an equally thick aluminum layer.

The light-reflective layer in the present light-emitting device typically includes aluminum in addition to one or more of lithium, beryllium, boron, sodium, and magnesium. Because the present light-reflective layer contains one or more of these five non-aluminum metals, the electron energy lost in passing through the light-reflective layer is, on the average, again less than that lost in passing through an equally thick pure aluminum layer. By reducing the electron energy loss through the light-reflective layer, the present light-emitting device operates more efficiently than an otherwise equivalent prior art light-emitting device.

In a second aspect of the invention, the light-reflective layer is implemented as a getter for sorbing (adsorbing or absorbing) contaminant gases, especially sulfur a common constituent of the light-emissive region. The light-reflective getter layer contains one or more of magnesium, chromium, manganese, cobalt, copper, molybdenum, palladium, silver, platinum, and lead, each of which is suitable for sorbing sulfur. When sulfur is present in the light-emissive region, electrons striking the light-emissive region may cause it to outgas sulfur in the form of atomic/molecular sulfur or/and gaseous sulfur-containing compounds. Inasmuch as the light-reflective getter layer is very close to the light-emissive region, the light-reflective getter layer can sorb outgassed sulfur before it leaves the immediate vicinity of the light-reflective layer and causes damage elsewhere. The same applies to other contaminants which are released in the immediate vicinity of the light-reflective getter layer and which are readily sorbable by its getter material.

In a third aspect of the invention, an overcoat layer overlies the light-reflective layer above the light-emissive region. Relative to an imaginary native aluminum oxide coating formed along an imaginary aluminum layer and subjected to electrons which impinge on the native oxide coating at generally the same energies and impingement angles as electrons impinge on the overcoat layer, the overcoat layer provides at least one of (a) lower chemical reactivity than the native oxide coating, (b) lower secondary electron emission per unit area than the oxide coating, and (c) lower electron backscattering per unit area than the oxide coating.

The term "imaginary" is used here in describing the native aluminum oxide coating because the oxide coating, although serving in conjunction with the imaginary aluminum layer as a reference or baseline for comparisons of chemical reactivity, secondary electron emission, and electron backscattering, is not actually present as a surface layer in the active portion of the electron-emitting device of the invention. Instead of being described as imaginary, the oxide coating could be described as a reference or baseline. Similar comments apply to the use of "imaginary" in describing the aluminum layer covered by the oxide coating.

Materials especially attractive for the overcoat layer include beryllium, boron, chromium, silver, gold, beryllium oxide, boron nitride, boron oxide, aluminum nitride, silicon nitride, silicon oxide, vanadium oxide, chromium oxide, cerium oxide, and neodymium oxide depending on which of the preceding chemical reactivity, secondary electron emission, and electron backscattering properties is, or are, to be provided by the overcoat layer. Magnesium, silicon, germanium, tin, lead, boron-magnesium, vanadium phosphorus oxide, silver oxide, and europium oxide are all attractive for the overcoat layer. Other materials suitable for the overcoat layer are cobalt, ruthenium, neodymium, iridium, platinum, lithium-aluminum, beryllium-boron, beryllium carbide, beryllium-aluminum, boron-aluminum, sodium carbide, sodium nitride, sodium oxide, sodium-aluminum, magnesium-aluminum, copper oxide, and molybdenum oxide.

The overcoat layer may be implemented as two or more layers, each providing at least one of the preceding chemical reactivity, secondary electron emission, and electron backscattering properties. When reduced chemical reactivity is furnished by the overcoat layer in a multi-layer implementation, the uppermost of the layers provides the reduced chemical reactivity. All of the materials identified in the previous paragraph are variously suitable for the different layers in multi-layer implementations of the overcoat layer. In addition, carbon is especially attractive for use in multi-layer implementations. Other attractive or suitable candidates for use in multi-layer implementations are iron, nickel, niobium, molybdenum, and barium.

Reducing chemical reactivity along the light-reflective layer according to the teachings of the invention leads to a reduction in device contamination that occurs as electrons impinge on the light-reflective layer. By reducing electron backscattering or/and secondary electron emission according to the invention's teachings, image degradation caused directly by such electron backscattering or/and secondary electron emission is reduced. Also, display contamination that results from outgassing caused by electron backscattering or/and secondary electron emission is reduced. The result is an improvement in device performance or/and lifetime.

A getter layer, referred to as the overcoating getter layer, overlies the light-reflective layer in a fourth aspect of the invention, the overcoating getter layer can lie fully above the light-emissive region. Alternatively or additionally, the overcoating getter layer can lie above a light-blocking region situated to the side of the light-emissive region below the light-reflective layer. In all of these cases, the overcoating getter layer is close to the light-emissive region.

Candidate materials for the overcoating getter layer are the metals magnesium, chromium, cobalt, copper, palladium, silver, platinum, and lead, along with oxides of magnesium, chromium, manganese, cobalt, nickel, and lead. All of these materials can readily sorb sulfur. Should sulfur or similar contaminants outgas from the light-emissive region and pass through the light-reflective layer, the overcoating getter layer can sorb these contaminants. Importantly, the close proximity of the overcoating getter layer to the light-emissive region enables the getter layer to sorb these contaminants before they leave the immediate vicinity of the light-emissive region and cause damage elsewhere. The overcoating getter layer is also well suited for sorbing contaminants which are released by the light-blocking region and pass through the light-reflective layer.

In a fifth aspect of the invention, a transparent undercoat layer is situated between the light-emissive region and the light-reflective layer. Compared to an imaginary native coating of aluminum oxide formed along an imaginary aluminum layer, the undercoat layer more strongly inhibits the light-reflective layer from undergoing chemical reactions along its lower surface, i.e., along where the light-reflective layer is closest to the undercoat layer, than does the imaginary native coating inhibit the imaginary aluminum layer from undergoing chemical reactions along the interface between the native coating and the aluminum layer. Due to presence of the undercoat layer, damaging chemical compounds such as opaque materials which could degrade the efficiency of the light-reflective layer are less likely to form along its lower surface.

Especially attractive candidates for the undercoat layer are silicon nitride, aluminum nitride, and chromium oxide. Other suitable candidates for the undercoat layer are the metal oxides silicon oxide, magnesium oxide, zirconium oxide, indium oxide, indium tin oxide, and tin oxide. Forming the undercoat layer with one or more of those metal oxides, including chromium oxide, stabilizes the lower surface of the light-reflective layer against later exposure to oxygen, a highly reactive gas to which the light-reflective layer is typically exposed subsequent to its formation. A similar benefit can be achieved by forming the undercoat layer with aluminum oxide of greater thickness than the imaginary native aluminum oxide coating.

A getter layer, referred to as the undercoating getter layer, lies under the light-reflective layer in a sixth aspect of the invention. In particular, the undercoating getter layer lies between the light-reflective layer and a light-blocking region provided to the side of the light-emissive region below the light-reflective layer. As such, the undercoating getter layer is quite close to the light-emissive region.

Suitable materials for the undercoating getter layer include the metals magnesium, chromium, manganese, cobalt, nickel, copper, palladium, silver, platinum, and lead, along with oxides of magnesium, chromium, manganese, cobalt, nickel, and lead. With nickel being particularly suitable for sorbing sulfur, all of these materials are particularly suitable for sorbing sulfur. The undercoating getter layer can thereby readily sorb sulfur. Since the undercoating getter layer is quite close to the light-emissive region, the sorbing of sulfur and other similar contaminants can be done before these contaminants escape the immediate vicinity of the light-emissive region and cause damage elsewhere. The undercoating getter layer is also well located for sorbing contaminants released by the light-blocking region.

Fabrication of a light-emitting device in accordance with the invention entails providing a light-emissive region over a plate. When the present undercoat layer is to be included in the device, the undercoat layer is formed over the light-emissive region. When the undercoating getter layer is to be included in the device, the undercoating getter layer is formed over a light-blocking region provided to the side of the light-emissive region. The light-reflective layer is then formed over the undercoat layer or the undercoating getter layer. If neither the undercoat layer nor the undercoating getter layer is to be present, the light-reflective layer is simply formed over the light-emissive region. When the overcoat layer or the overcoating getter layer is to be included in the device, the overcoat layer or the overcoating getter layer is formed over the light-reflective layer.

In short, the light-emitting device of the invention is configured to improve image clarity or/and increase device lifetime without significant loss in image intensity. The present light-emitting device can readily be manufactured in a large-scale production environment. Accordingly, the invention provides a substantial advance over the prior art.

BRIEF DESCRIPTION OF THE DRAWINGS

FIGS. 8a–8c, 8d1, and 8d2 are cross-sectional side views representing steps in fabricating the light-emitting device of FIGS. 3 and 4 and the light-emitting device of FIG. 6 according to the invention.

FIGS. 14a, 14b1, 14b2, and 14b3 are cross-sectional side views representing steps in fabricating the light-emitting device of FIGS. 9 and 10 and the light-emitting devices of FIGS. 12 and 13 according to the invention starting essentially from the stage of FIG. 8d1 or 8d2.

FIGS. 21a, 21b, and 21c1–21c4 are cross-sectional side views representing steps in fabricating the light-emitting device of FIGS. 15 and 16 and the light-emitting devices of FIGS. 18–20 according to the invention starting essentially from the stage of FIG. 8c.

Like reference symbols are employed in the drawings and in the description of the preferred embodiments to represent the same, or very similar, item or items.

DESCRIPTION OF THE PREFERRED EMBODIMENTS

General Considerations

Figure 1:
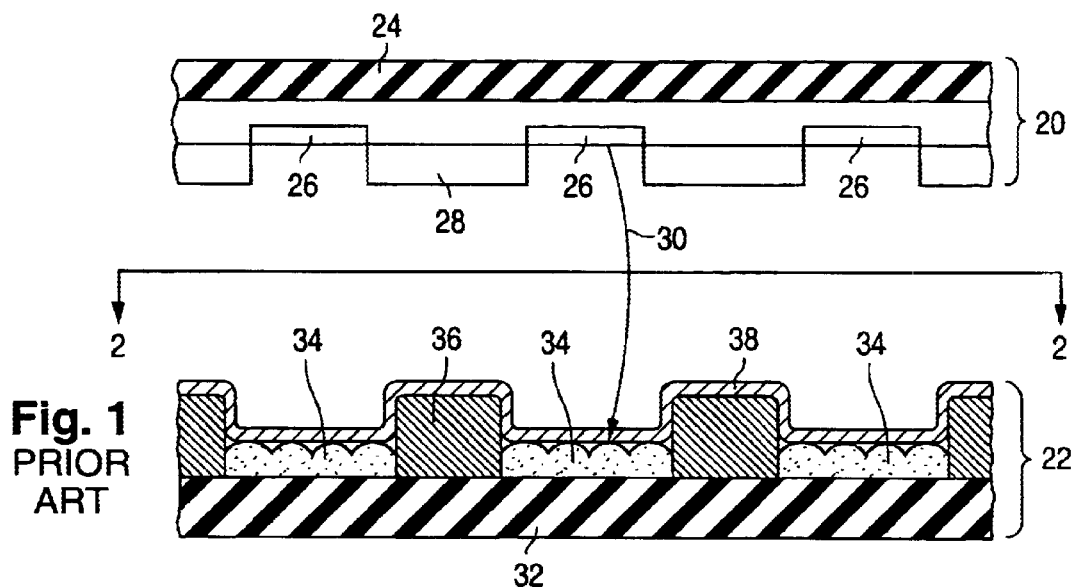
FIG. 1 is a cross-sectional side view of part of the active region of a conventional flat-panel CRT display.

Various configurations are described below for flat-panel CRT displays having light-emitting devices configured according to the invention. Each flat-panel CRT display is typically suitable for a flat-panel television or a flat-panel video monitor for a personal computer, a laptop computer, a workstation, or a hand-held device such as a personal digital assistant.

Each of the present flat-panel CRT displays is typically a color display but can be a monochrome, e.g., black-and-green or black-and-white, display. Each light-emissive region and the corresponding oppositely positioned electron-emissive region form a pixel in a monochrome display, and a sub-pixel in a color display. A color pixel typically consists of three sub-pixels, one for red, another for blue, and the third for green.

Certain of the present light-emitting devices have getter material situated in the active device portions. A high gettering surface area can thereby be achieved without significantly increasing the overall lateral device area. In addition, the getter material is typically distributed in a relatively uniform manner across the active device portion. Difficulties such as undesired active-portion pressure gradients, which can arise from non-uniform gettering in the active portion of a light-emitting device, are avoided in the present light-emitting devices having largely uniform getter material distribution.

The getter material, shaped as a layer, is normally porous in each of the preceding light-emitting devices of the invention. Contaminant gases gather along or near the outside surface of the getter layer, causing its gettering capability to decrease as time passes. By appropriately treating the getter layer according to an "activation" process, the gases accumulated along or near the outside surface of the getter layer are driven into its interior. This enables the getter layer to regain much of its gettering capability up to the point at which the internal gas-holding capability of the getter layer is reached. The getter layer can typically be activated a large number of times.

The getter layer is normally created before hermetically sealing the light-emitting and electron-emitting devices together to assemble the flat-panel CRT display having the getter layer. In a typical fabrication sequence, the completed light-emitting device is exposed to air prior to the display sealing operation. When the getter layer is a surface layer, contaminant gases then accumulate along much of its effective gettering surface. Accordingly, the getter layer typically needs to be activated during or subsequent to the display sealing operation while the enclosure between the light-emitting and electron-emitting devices is at a high vacuum.

Activation of the getter layer can be done in various ways. The getter layer can be activated by raising its temperature to a sufficiently high value, typically 300–900° C., for a sufficiently long period of time. In general, the amount of time needed to activate the getter layer decreases with increasing activation temperature. By sealing the display at a temperature in excess of 300° C., typically 350° C., in a highly evacuated environment, the activation can be automatically accomplished during the sealing operation. When a component adjoining the getter layer contains electrically resistive material, a voltage can sometimes be applied to the resistive material to raise its temperature high enough to activate the getter layer.

Depending on the configuration of the overall flat-panel display, electromagnetic wave energy can be directed locally toward the getter layer to activate it. For example, the getter layer can sometimes be activated with a beam of directed energy such as a laser beam. In some cases, the activation can be accomplished by directing radio-frequency energy, such as microwave energy, toward the getter layer. Some of the electrons emitted by the electron-emitting device may strike the getter layer. These electrons are typically of relatively high energy and, in certain cases, can activate the getter layer.

A field-emission display is a flat-panel CRT display in which the electron-emitting device, often referred to as a field emitter, emits electrons according to a field-emission technique. Each electron-emissive region in an electron-emitting device which utilizes the three-dimensional (non-planar) type of field emission contains one or more electron-emission elements such as cones, filaments, or randomly shaped particles. The one or more electron-emissive elements in each electron-emissive region emit electrons when a suitable electrical potential is applied between a control (or gate) electrode and the one or more electron-emissive elements. The electrical potential can typically be tailored to control the amount of electron emission from each electron-emissive region. When the magnitude of the electrical potential is below a threshold value, the electron-emissive region emits essentially no electrons.

In the following description, the term "electrically insulating" or "dielectric" generally applies to materials having a resistivity greater than $10^{10}$ ohm-cm. The term "electrically non-insulating" thus refers to materials having a resistivity of no more than $10^{10}$ ohm-cm. Electrically non-insulating materials are divided into (a) electrically conductive materials for which the resistivity is less than 1 ohm-cm and (b) electrically resistive materials for which the resistivity is in the range of 1 ohm-cm to $10^{10}$ ohm-cm. These categories are determined at an electric field of no more than 10 volts/$\mu$m.

An alloy of two or more materials is generally presented below in hyphenated form with the materials recited in order of increasing atomic number. For instance, "lithium-aluminum" means a lithium-aluminum alloy. Even though lithium, the material of lower atomic number, is recited first in the alloy, the lithium-aluminum alloy may contain more aluminum than lithium. The materials that form an alloy are distributed throughout the alloy, normally in a relatively uniform manner.

Electrophoretic deposition and dielectrophoretic deposition are sometimes grouped together as "electrophoretic deposition". The term "electrophoretic/dielectrophoretic deposition" is utilized here to emphasize that such deposition occurs by one or both of electrophoresis and dielectrophoresis.

Energy-Reducing Light-Reflective Layer

Figure 3:
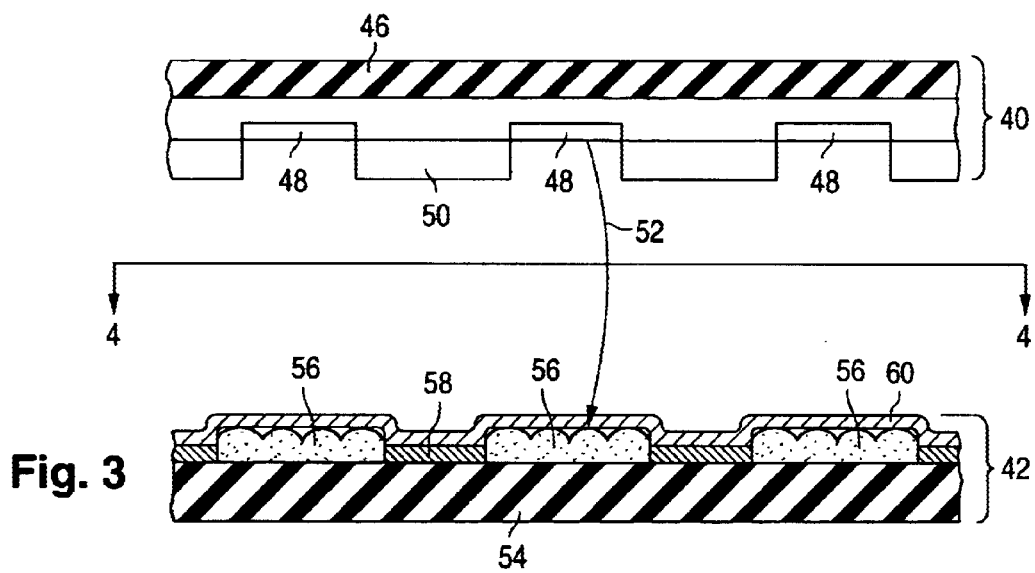
FIG. 3 is a cross-sectional side view of part of the active region of a flat-panel CRT display having a light-emitting device configured according to the invention.
Figure 4:
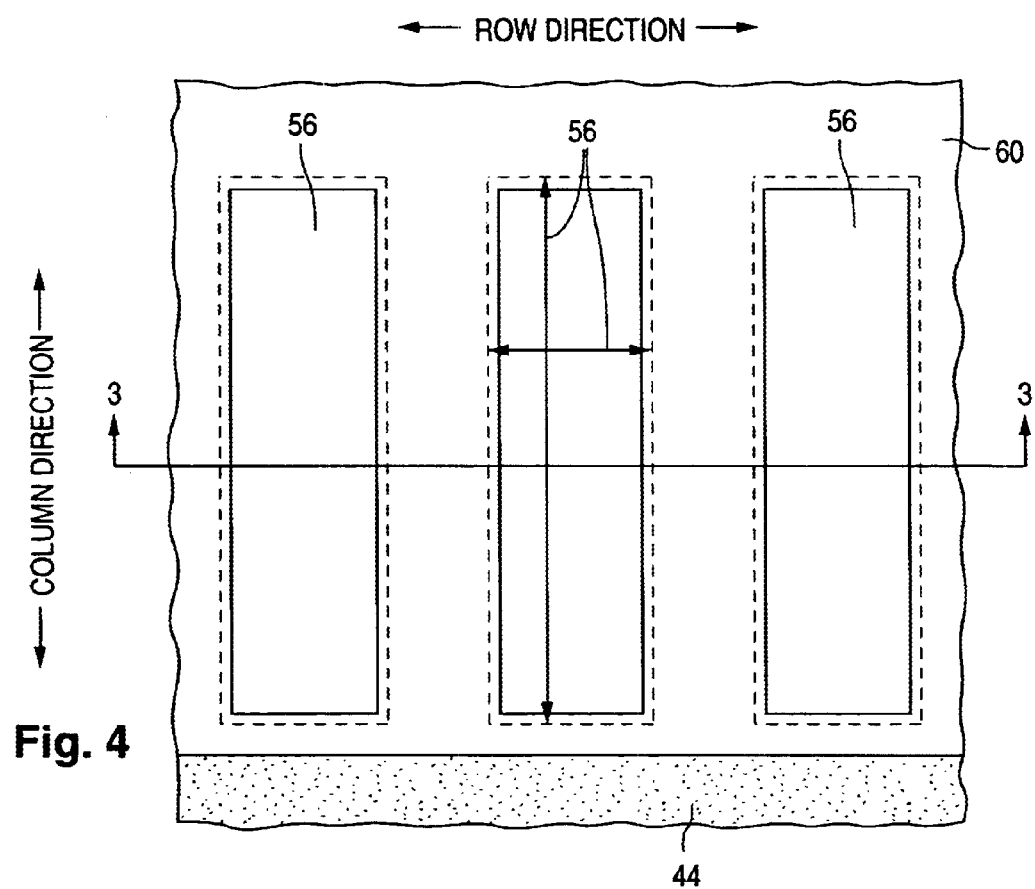
FIG. 4 is a cross-sectional plan view of part of the active region of the flat-panel CRT display, specifically the light-emitting device, of FIG. 3. The cross section of FIG. 3 is taken along plane 3—3 in FIG. 4. The cross section of FIG. 4 is taken along plane 4—4 in FIG. 3.

FIGS. 3 and 4 respectively illustrate side and plan-view cross sections of part of the active region of a flat-panel CRT display having an electron-emitting device 40 and an oppositely situated light-emitting device 42 configured according to the invention for reducing electron-energy loss. Devices 40 and 42 are connected together through an outer wall (not shown) to form a sealed enclosure maintained at a high vacuum, typically an internal pressure of no more than $10^{-6}$ torr. The plan-view cross section of FIG. 4 is taken in the direction of light-emitting device 42 a plane laterally through the sealed enclosure. Accordingly, FIG. 4 largely presents a plan view of part of the active portion of light-emitting device 42.

In addition to devices 40 and 42, the flat-panel display of FIGS. 3 and 4 normally includes a group of internal supports, referred to as spacers, which prevent external forces, such as the typical external-to-internal pressure differential of approximately 1 atm., from collapsing the display. The spacers also maintain a largely uniform spacing between devices 40 and 42. The spacers are typically shaped generally like flat walls, but can have other shapes such as posts. Item 44 in FIG. 4 indicates the location for a spacer wall. Getter material may be located at various places in the display.

Electron-emitting device, or backplate structure, 40 is formed with a generally flat electrically insulating backplate 46 and a group of layers and regions situated over the interior surface of backplate 46. These layers/regions include a two-dimensional array of rows and columns of laterally separated electron-emissive regions 48. Each electron-emissive region 48 consists of one or more electron-emissive elements (not separately shown) which emit electrons that are directed toward light-emitting device 42. The layers/regions also include an electron-focusing system 50 which extends vertically beyond electron-emissive regions and focuses electrons emitted by regions 46 on corresponding target areas of light-emitting device 42. Item 52 represents the trajectory of one of these electrons.

Electron-emitting device 40 typically operates according to field emission. In that case, each electron-emissive region 48 emits electrons in response to a suitable electrical potential. Preferably, each region 48 operates according to the three-dimensional type of field emission as described above. Examples of field-emission electron-emitting structures suitable for implementing device 40 are described in U.S. Pat. No. 6,049,165. Device 40 may, nonetheless, emit electrons according to another technique such as thermal emission.

Light-emitting device, or faceplate structure, 42 is formed with a generally flat electrically insulating faceplate 54 and a group of layers and regions situated over the interior surface of faceplate 54. Faceplate 54 is transparent, i.e., generally transmissive of visible light, at least where visible light is intended to pass through faceplate 54 to produce an image on the exterior surface (lower surface in FIG. 3) of faceplate 54 at the front of the display. Faceplate 54 typically consists of glass. The layers/regions overlying faceplate 54 consist of a two-dimensional array of rows and columns of light-emissive regions 56, a patterned light-blocking region 58, and a light-reflective layer 60.

Light-emissive regions 56 and light-blocking region 58 lie directly on faceplate 54. Light-emissive regions 56 are situated in openings extending through light-blocking region 58 at locations respectively opposite electron-emissive regions 48. Faceplate 54 is transmissive of visible light at least below light-emissive regions 56. In a color implementation of the display, three consecutive regions 56 in a row emit light of three different colors, normally red, blue, and green, when struck by electrons emitted from regions 48.

Each light-emissive region 56 consists of multiple phosphor particles distributed substantially randomly over faceplate 54. The thickness of each region 56 is typically greater than a monolayer (a one-particle-thick layer of particles packed as closely together as possible), e.g., 1.5 monolayers, but can be less than a monolayer. The phosphor particles in each region 56 can be constituted in various ways. The phosphor particles are typically metal sulfide phosphors, including metal oxysulfide phosphors. In a color implementation of the display of FIGS. 3 and 4, the phosphor particles can be $Y_2O_2S$:Eu phosphors for red light, ZnS:Ag,Al phosphors for blue light, and ZnS:Cu,Al phosphors for green light. Alternatively, the phosphor particles can be metal oxide phosphors or strontium thiogallate phosphors.

Light-reflective layer 60 lies over light-emissive regions 56 and light-blocking region 58. A parasitic transparent layer (not shown) of oxide of the material, normally metal, that forms the lower surface of layer 60 lies between layer 60, on one hand, and regions 56 and 58, on the other hand. The thickness of this parasitic transparent buried oxide layer is normally 1–5 nm, typically 2.5 nm. A parasitic layer (not shown) of oxide of the material, likewise normally metal, that forms the upper surface of layer 60 lies along the upper surface of layer 60 and forms the interior surface of the flat-panel display. The thickness of this parasitic surface oxide layer, also usually transparent, is normally 1–5 nm, typically 2.5 nm.

Light-blocking region 58 is generally non-transmissive of visible light. More particularly, region 58 largely absorbs visible light which impinges on the exterior surface of faceplate 54 at the front of the display, passes through faceplate 54, and then impinges on region 58. As viewed from the front of the display, region 58 is dark, largely black. For this reason, region 58 is referred to here as a "black matrix". Also, black matrix 58 is largely non-emissive of light when struck by electrons emitted from electron-emissive regions 48. The preceding characteristics enable matrix 58 to enhance the image contrast.

Black matrix 58 consists of one or more layers or regions, each of which may be electrically insulating, electrically resistive, or electrically conductive. Only part of the thickness of matrix 58 may consist of dark material that absorbs visible light. The dark portion of the thickness of matrix 58 can adjoin, or be vertically separated from, faceplate 54.

In the exemplary display of FIGS. 3 and 4, black matrix 58 is thinner (or shorter) than light-emissive regions 56 and preferably includes electrically conductive material that contacts light-reflective layer 60. As described further below, layer 60 receives a high anode electrical potential for the display. By having matrix 58 be electrically non-insulating, normally electrically conductive, it also receives the anode potential and thus cooperates with layer 60 in functioning as the display's anode. Furthermore, layer 60 need not extend fully over matrix 58 provided that layer 60 is in electrical contact with matrix 58.

Figure 5:
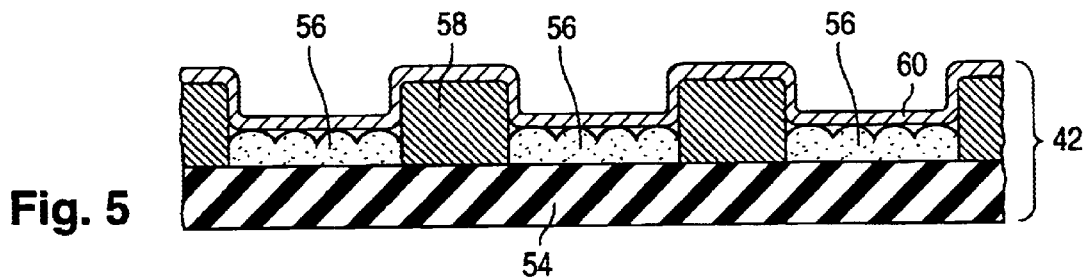
FIGS. 5–7 are cross sectional side views of parts of the active portions of three light-emitting devices configured according to the invention and substitutable for the light-emitting device of FIGS. 3 and 4.

FIG. 5 depicts a variation of light-emitting device 42 in which black matrix 58 is thicker (or taller) than light-emissive regions 56. In this variation, matrix 58 fully laterally surrounds each region 56. Also, matrix 58 typically includes electrically insulating material that contacts light-reflective layer 60.

As described further below, electrons emitted by regions 48 in electron-emitting device 40 pass through light-reflective layer 60 and strike light-emissive regions 56, causing them to emit light in all directions. Some of the electrons which strike regions 56 scatter backward rather than causing light emission. Black matrix 58 collects some of these backscattered electrons and thereby prevents the so-collected electrons from striking non-intended ones of regions 56 and causing image degradation. By having matrix 58 extend vertically beyond regions 56 as occurs in the variation of FIG. 5, the ability of matrix 58 to collect backscattered electrons is enhanced.

Light-reflective layer 60, by itself or in combination with black matrix 58 when matrix 58 consists of electrically conductive material, normally serves as the anode for the display. As such, layer 60 contains electrically non-insulating material, normally electrically conductive material. A selected anode electrical potential, typically in the vicinity of 500–10,000 volts is applied to the electrically non-insulating material of layer 60 from a suitable voltage source (not shown) during display operation. Light-reflective layer 60 enhances the light intensity of the display's image by reflecting forward some of the initially rear-directed light emitted by regions 56.

Light-reflective layer 60 extends across the entire active portion of light-emitting device 42 in the example of FIGS. 3 and 4. Layer 60 is generally flat, i.e., approximately (roughly) flat to nearly perfectly flat, above each region 56. Although layer 60 is illustrated as a non-perforated blanket layer in FIG. 3, layer 60 is typically perforated by microscopic pores situated at substantially random locations. Depending on its constituency, layer 60 has a thickness of 30–200 nm, typically 70 nm.

Electrons are negatively charged, whereas protons are positively charged. As electrons pass through a layer such as light-reflective layer 60, the positive charge on the protons of the atoms in the layer causes the electrons to slow down and lose energy. The amount of energy lost by an individual electron depends on how many protons are encountered by the electron in passing through the layer. The magnitude of the energy loss generally increases as an electron encounters more protons, and vice versa.

The average number of protons encountered by electrons passing through a layer depends on the thickness of the layer, the angles at which the electrons impinge on the layer, and the average number of protons per unit volume in the layer. The latter parameter is referred to here as the average volumetric proton density $N_P$. Consider two equally thick layers consisting of different materials so as to have different values of proton density $N_P$. For equally energetic electrons that impinge on the two layers at the same impingement angles, the difference in electron energy loss through the layers depends on the values of proton density $N_P$ for the two layers.

Average volumetric proton density $N_P$ for a layer of a single atomic element is given as:

$$N_P = \frac{Z\rho}{K_w W} \qquad (1)$$

where Z is the atomic number of the element, $\rho$ is the mass density of the element, $K_w$ is a constant, and W is the atomic weight of the element. Constant $K_w$ is the amount of mass in a unit of atomic weight. Eq. 1 also applies to a layer consisting of a compound. In that case, Z is the stoichiometric-weighted sum of the atomic numbers of the elements in the compound, $\rho$ is the mass density of the compound, and W is the molecular weight of the compound, i.e., the stoichiometric-weighted sum of the atomic weights of the elements in the compound.

For a layer containing two or more distinct components, proton density $N_P$ can be estimated as:

$$N_P = \sum_{i=1}^{n}\left(\frac{F_i Z_i}{W_i}\right) \bigg/ K_w \sum_{i=1}^{n}\left(\frac{F_i}{\rho_i}\right) \qquad (2)$$

where n is the number of components, i is a running integer, $F_i$ is the mass fraction of the ith component in the layer, $Z_i$ is the atomic number of the ith component or, if the ith component is a compound, the stoichiometric-weighted sum of the atomic numbers of the elements in the ith component, $W_i$ is the atomic weight of the ith component or, if the ith component is a compound, the molecular weight of the ith component, and $\rho_i$ is the mass density of the ith component.

In accordance with the invention, light-reflective layer 60 consists largely of metal whose average volumetric proton density $N_P$ is less than the average volumetric proton density $N_P(Al)$ of aluminum. This characteristic is achieved by constituting layer 60 largely (a) with non-aluminum metal having proton density Np less than $N_P(Al)$ or (b) with aluminum and non-aluminum metal having proton density $N_P$ less than $N_P(Al)$. By constituting layer 60 in either of these ways, the amount of proton charge that an electron of a given impingement energy and a given impingement angle experiences in passing through layer 60 is, on the average, less than the amount of proton charge that an electron of the same impingement energy and same impingement angle would experience in passing through an imaginary aluminum layer of the same thickness as layer 60. Consequently, electrons passing through layer 60 undergo, on the average, less energy loss than equally energetic electrons passing through an aluminum layer of the same thickness as layer 60.

By implementing light-reflective layer 60 in the preceding way, layer 60 can typically be made somewhat thicker than an aluminum layer while still yielding lower average electron energy loss than the aluminum layer. Making layer 60 thicker enables it to have more mechanical strength, thereby making the flat-panel display more robust. Also, the process window for display fabrication is enhanced so as to facilitate manufacturing the display in volume quantities.

Suitable non-aluminum metals having proton density $N_P$ less than $N_P(Al)$ are lithium, beryllium, boron, sodium, and magnesium. Hence, light-reflective layer 60 consists largely either (a) of one or more of lithium, beryllium, boron, sodium, and magnesium or (b) of aluminum and one or more of lithium, beryllium, boron, sodium, and magnesium. When layer 60 is formed with substantially only one of these non-aluminum metals, proton density $N_P$ is given by Eq. 1. When layer 60 consists of two or more of the non-aluminum metals, density $N_P$ is given approximately by Eq. 2. Similarly, when layer 60 consists of aluminum and one or more of the non-aluminum metals, density $N_P$ is given by Eq. 2 with aluminum being one of the n components.

In cases where light-reflective layer 60 consists largely of two or more of aluminum and the preceding five non-aluminum metals, i.e., (a) two or more of lithium, beryllium, boron, sodium, and magnesium or (b) aluminum and one or more of lithium, beryllium, boron, sodium, and magnesium, layer 60 can be constituted as an alloy of those two or more metals or as two or more sublayers of different metallic composition. Each sublayer can be substantially a single one of the six metals or an alloy containing two or more of the metals. When layer 60, or a sublayer of layer 60, consists of an alloy, the metals in the alloy are normally distributed in a relatively uniform manner throughout layer 60, or the sublayer of layer 60.

The cross section of light-emitting device 42 in FIGS. 3 and 5, although generally representing both (a) the situation in which light-reflective layer 60 is an alloy or consists largely of only a single one of the non-aluminum metals and (b) the situation in which layer 60 consists of two or more sublayers, is specifically directed to the situation in which layer 60 is an alloy or largely only a single one of the non-aluminum metals. When layer 60 is an alloy consisting largely of aluminum and non-aluminum metal formed with one or more of lithium, beryllium, boron, sodium, and magnesium, the non-aluminum metal normally constitutes 5–95%, preferably 20–80%, more preferably 30–60%, typically 50%, by mass of layer 60. The high light reflectivity of aluminum is largely achieved when the percentage of the non-aluminum metal falls into the more preferred 30–60% mass percentage range, the percentage of aluminum then being 40–70% by mass.

Figure 6:
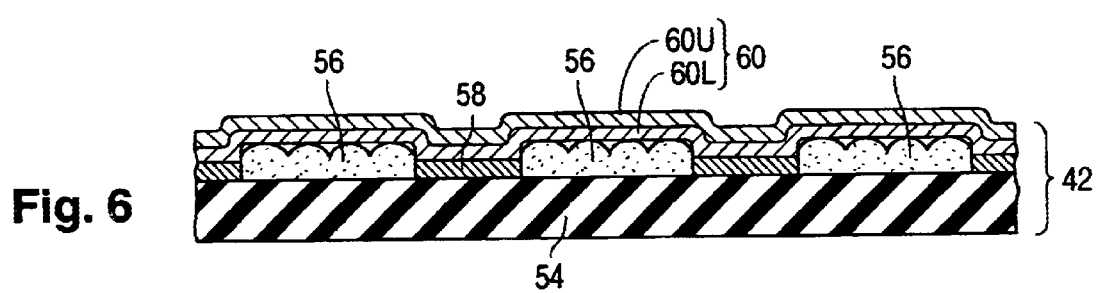
Figure 7:
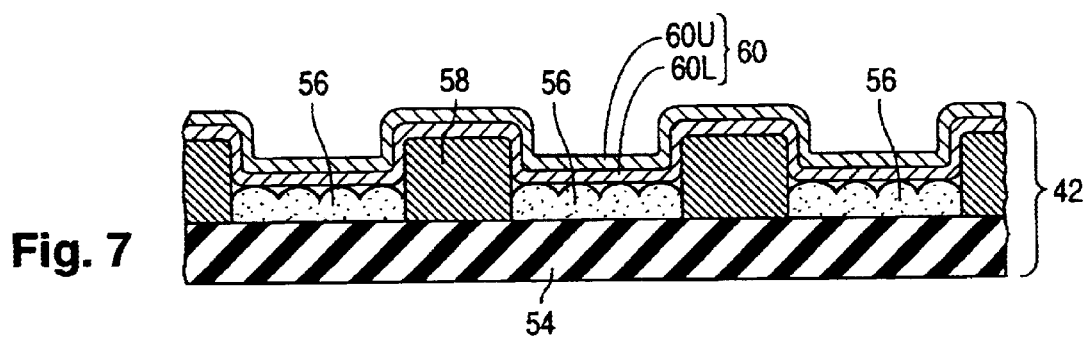

FIGS. 6 and 7 illustrate embodiments of light-emitting device 42 that implement the situation in which light-reflective layer 60 consists of multiple sublayers. In FIG. 6, black matrix 58 is configured as shown in FIG. 3 so as to be thinner than light-emissive regions 56. In FIG. 7, matrix 58 is configured as shown in FIG. 5 so as to be thicker than regions 56. Light-reflective layer 60 in the embodiment of FIGS. 6 and 7 consists specifically of a lower sublayer 60L and an upper sublayer 60U. Lower sublayer 60L, situated directly on regions 56 and matrix 58, is normally more reflective of visible light than upper sublayer 60U situated on sublayer 60L.

In the multiple-sublayer situation where light-reflective layer 60 contains aluminum and non-aluminum metal consisting of one or more of lithium, beryllium, boron, sodium, and magnesium, lower sublayer 60L normally consists primarily of aluminum. Preferably, largely all of sublayer 60L is aluminum. Upper sublayer 60U then normally consists of more by mass of the non-aluminum metal than aluminum. Largely or nearly all of sublayer 60U is typically the non-aluminum metal. Also, the non-aluminum metal in sublayer 60U is preferably one or more of beryllium, boron, and magnesium. By implementing layer 60 in the preceding way, lower sublayer 60L provides layer 60 with the high light reflectivity of aluminum, while upper sublayer 60U enables proton density $N_P$ to be less than $N_P(Al)$.

Beryllium, a gray metal, is especially attractive for light-reflective layer 60 by itself, in combination with aluminum as an alloy, or in a multi-sublayer stack. Although the beryllium is of lesser light reflectivity than aluminum, beryllium has the following advantageous properties over aluminum:

a. Lower density, 1.85 g/cm$^3$, compared to 2.70 g/cm$^3$ for aluminum,
b. Greater tensile strength, approximately 280 megapascals, compared to approximately 100 megapascals for aluminum.
c. Higher melting point, 1278±5° C., compared to 660° C. for aluminum,
d. Four to five times greater stiffness than aluminum, and
e. Approximately twice the heat capacity of aluminum.

In addition, beryllium has almost as high thermal conductivity as aluminum. When layer 60 is implemented with beryllium and aluminum in a two-sublayer stack, lower sublayer 60L normally consists largely of aluminum while upper sublayer 60U normally consists largely of beryllium.

Boron, a yellow metal, is attractive for use in light-reflective layer 60 because boron's melting point of approximately 2300° C. is much higher than aluminum's 660° C. melting point. Boron is also somewhat less dense, 2.34 g/cm$^3$, than aluminum, again 2.70 g/cm$^3$. When employed in layer 60, boron is typically alloyed with aluminum or utilized largely as upper sublayer 60U with lower sublayer 60L consisting largely of aluminum.

Magnesium, a silvery white metal, is attractive for use in light-reflective layer 60 because magnesium's density, 1.74 g/cm$^3$, is considerably less than aluminum's density of 2.70 g/cm$^3$. Magnesium's melting point, 649° C., is almost the same as aluminum's melting point. Magnesium has almost the same tensile strength as aluminum. Layer 60 can be implemented with magnesium by itself, in combination with aluminum as an alloy, or in a multi-sublayer stack. In a two-sublayer stack, magnesium largely forms upper sublayer 60U while lower sublayer 60L again consists largely of aluminum.

Lithium is a silvery white metal, while sodium is a silvery metal. Lithium and sodium have very low densities, 0.53 g/cm$^3$ for lithium and 0.97 g/cm$^3$ for sodium. Lithium also has a relatively high tensile strength. Lithium and sodium have relatively low melting points, 180° C. for lithium and 98° C. for sodium. Inasmuch as display assembly and sealing operations are typically performed at temperatures considerably greater than the melting points of lithium and sodium, their low melting points may substantially limit using lithium or sodium to form largely all, or a considerable fraction, of layer 60 or a sublayer of layer 60. When utilized in layer 60, lithium or sodium is typically alloyed with aluminum.

Given below is a table which presents color, melting point, atomic number, and the proton density parameter $Z\rho/W$ for aluminum and the non-aluminum metals lithium, beryllium, boron, sodium, and magnesium:

TABLE I

Properties of Materials for Light-reflective Layer 60

| Material | Color | Melting Point (° C.) | Atomic Number Z | $Z\rho/W$ (g/cm$^3$) |
|---|---|---|---|---|
| Aluminum | Silver-white | 660 | 13 | 1.30 |
| Lithium | Silver-white | 181 | 3 | 0.23 |
| Beryllium | Gray | 1278 ± 5 | 4 | 0.82 |
| Boron | Yellow | 2300 | 5 | 1.08–1.10 |
| Sodium | Silver | 98 | 11 | 0.46 |
| Magnesium | Silver-white | 649 | 12 | 0.86 |

This table is suitable for use in selecting materials to implement light-reflective layer 60.

Figure 8A:

FIGS. 8a–8c, 8d1, and 8d2 (collectively "FIG. 8") illustrate a general process for manufacturing light-emitting device 42 of FIGS. 3 and 4 in accordance with the invention and a variation for producing device 42 of FIG. 6 in accordance with the invention. Referring to FIG. 8a, the starting point for the process of FIG. 8 is faceplate 54.

Figure 8B:
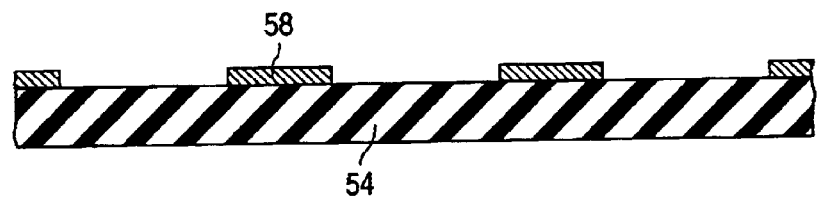
Figure 8C:
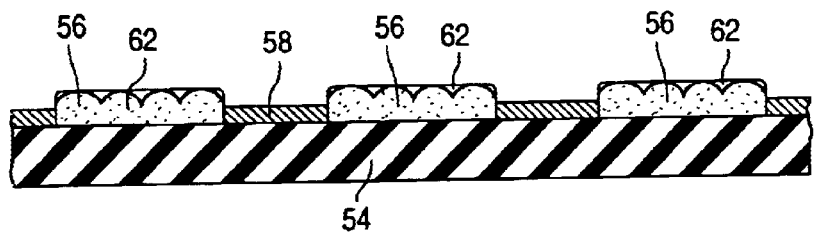

Black matrix 58 is formed on faceplate 54 as indicated in FIG. 8b. Matrix 58 can be formed according to various techniques. When matrix 58 is a single layer, a blanket layer of the black matrix material can be deposited on faceplate 54. Techniques such as evaporation, sputtering, thermal spraying, chemical vapor deposition ("CVD"), and electrophoretic/dielectrophoretic deposition can be utilized to deposit the blanket layer. A coating of a liquid formulation or slurry containing the black matrix material can be deposited on faceplate 54 and dried. Sintering or baking can be performed as needed. Using a suitable mask such as a photoresist mask, matrix 58 is created by removing portions of the blanket layer at the locations for light-emissive regions 56.

Alternatively, black matrix 58 can be formed by a blanket deposition/lift-off technique. As a further alternative, the black matrix material can be deposited through a shadow mask. If matrix 58 contains polymeric material as often arises when matrix 58 is configured as shown in FIGS. 5 and 7, a deposition/actinic radiation curing/development operation can be performed to create a patterned layer of the polymeric material. A pyrolysis step can, as needed, be done to blacken the patterned polymeric material. When matrix 58 consists of two or more layers, repetitions or/and combinations of the preceding techniques can be employed to create matrix 58. Matrix 58 can also be preformed and then mounted on faceplate 54 using a suitable adhesive.

Regions 62 which contain the phosphor material of light-emissive regions 56 are now formed in the openings through black matrix 58. See FIG. 8c. Depending on how regions 62 are created, they may be interconnected by non-phosphor material (not shown) utilized in regions 62. Regions 62 have generally flat upper surfaces. The formation of regions 62 can be accomplished in various ways.

For a color display, a slurry of actinic binder and phosphor capable of emitting light of only one of the three colors red, blue, and green can be introduced into the openings in black matrix 58. The actinic binder is typically of the polymeric crosslinkable type. One of every three of the openings is exposed to actinic radiation, such as ultraviolet light, to cure the so-exposed binder. To minimize misalignment of light-emissive regions 56 to black matrix 58, the exposure step is typically performed through the exterior surface (lower surface in FIG. 8c) of faceplate 54 using a mask to cover the openings whose binder material is not intended to be actinically exposed. Any unexposed slurry material is removed with a suitable developer. This procedure is repeated twice with slurries of actinic binder and phosphor capable of emitting light of the other two colors.

Intermediate layers of generally solid material which can be readily converted to gas are respectively formed on the regions of phosphor and cured binder to define regions 62 and provide them with generally flat upper surfaces. The intermediate layers are typically created by depositing lacquer on top of the structure and drying the lacquer. For convenience, the solid material that forms the intermediate layers is generally referred to below as "dried lacquer" or simply "lacquer" even though material other than lacquer can be employed to form the intermediate layers. Regions 62 then consist of phosphor material, cured binder, and dried lacquer.

The lacquer deposition is typically done in a blanket manner so that the intermediate lacquer layers of region 62 are interconnected by dried lacquer (not shown) situated on top of black matrix 58. Alternatively, the lacquer deposition can be performed through a screen having a deposition blocking region above matrix 58. In this case, very little dried lacquer is present on top of matrix 58.

Light-reflective layer 60 is deposited over black matrix 58 and regions 62. Depending on how layer 60 is to be constituted and configured, the light-reflective material consisting of one or more of lithium, beryllium, boron, sodium, and magnesium, often in combination with aluminum, can be deposited by techniques such as evaporation, sputtering, thermal spraying, and CVD. The deposition of layer 60 is performed in a suitable deposition chamber at low pressure varying from several torr for CVD down to $10^{-6}$ torr or less (a high vacuum) for evaporation or sputtering. Multiple deposition steps are preformed when layer 60 consists of two or more sublayers as 60L and 60U.

Subsequent to the deposition of light-reflective layer 60, the partially fabricated light-emitting device is removed from the deposition chamber and exposed to air. Due to the oxygen in air, a parasitic layer (not shown) of oxide of the metal that forms the upper surface of layer 60 grows along the upper surface of layer 60. A parasitic layer (not shown) of oxide of the metal that forms the lower surface of layer 60 similarly grows along the lower surface of layer 60 and thereby lies between layer 60, on one hand, and light-emissive regions 56 and black matrix 58, on the other hand. At least part of the oxygen needed to create the parasitic oxide layer along the lower surface of layer 60 reaches the light-reflective layer's lower surface through the pores in layer 60. Both parasitic oxide layers are transparent.

The binder material and lacquer in regions 62 are removed by appropriately heating the structure. Any lacquer situated on top of black matrix 58 is also removed during the heating step. The binder and lacquer thermally decompose into gases that escape through the pores in light-reflective layer 60. The remaining portions of regions 62 respectively constitute light-emissive regions 56. The removal of the binder material and lacquer is normally done in air according to a thermal profile that reaches a maximum temperature of 300–480° C., typically 400° C. The thicknesses of the parasitic transparent oxide layers along the lower and upper surfaces of layer 60 may increase during the binder/lacquer removal operation.

Figure 2:
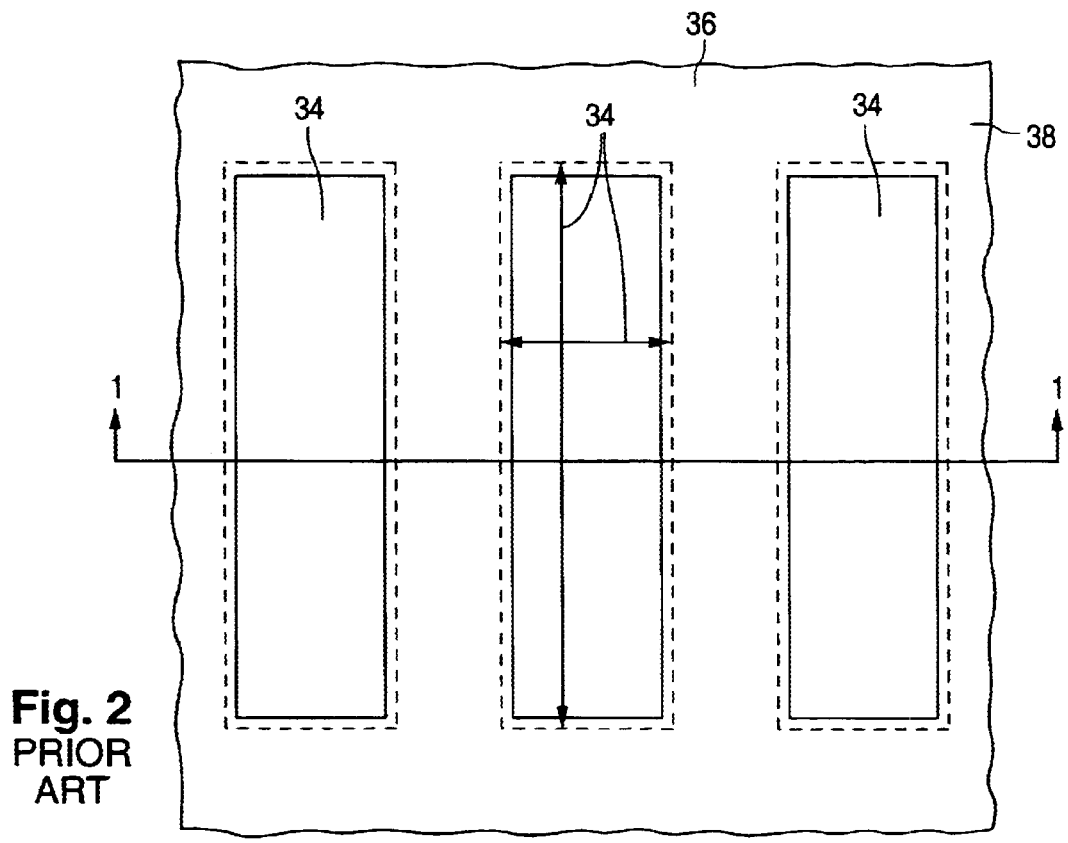
FIG. 2 is a cross-sectional plan view of the part of the active region of the conventional flat-panel CRT display, specifically the light-emitting device, of FIG. 1. The cross section of FIG. 1 is taken along plane 1—1 in FIG. 2. The cross section of FIG. 2 is taken along plane 2—2 in FIG. 1.

Except for the unshown parasitic oxide layers present along the upper and lower surfaces of light-reflective layer 60, the resultant structure appears as shown in FIG. 8d1 or 8d2 depending on how layer 60 is configured. FIG. 8d1 presents light-emitting device 42 in FIG. 3. Although FIG. 8d1 represents both (a) the situation in which layer 60 is an alloy or consists largely of only a single one of the non-aluminum metals lithium, beryllium, boron, sodium, and magnesium and (b) the situation in which layer 60 consists of multiple sublayers, FIG. 8d1 is specifically directed to the situation in which layer 60 is an alloy or consists largely of only one of these non-aluminum metals. FIG. 8d2, which repeats FIG. 6, presents an embodiment of layer 60 when it consists of sublayers 60L and 60U. Layer 60 largely retains the shape that existed when the binder and lacquer of regions 62 were present in the structure. Hence, layer 60 is generally flat above light-emissive regions 56.

Light-Reflective Getter Layer

The phosphor particles in light-emissive regions 56 may produce contaminant gases when struck by high-energy charged particles, especially electrons emitted by regions 48 of electron-emitting device 40. In the typical color display implementation mentioned above where the phosphor particles consist of metal sulfide phosphors (again including metal oxysulfide phosphors), the phosphor particles may outgas sulfur. The outgassed sulfur can be in the form of atomic/molecular sulfur or/and in the form of sulfur-containing compounds. Although sulfur is a solid at standard temperature (0° C.) and pressure (1 atm.), sulfur is a gas at the high vacuum, typically a pressure of $10^{-6}$ torr or less, present in the interior of the flat-panel display of FIGS. 3 and 4. Unless contaminants, such as sulfur, in phosphor-originated gases are prevented from leaving the immediate vicinity of regions 56 and light-reflective layer 60, the contaminants can enter the interior of the display and cause damage.

Light-reflective layer 60 functions, in accordance with the invention, as a getter for sorbing (again, adsorbing or absorbing) contaminant gases, especially sulfur, in a variation of light-emitting device 42. In this variation, light-reflective getter layer 60 preferably contains one or more of the metals magnesium, chromium, manganese, cobalt, copper, molybdenum, palladium, silver, platinum, and lead. Each of these nine metals is particularly suitable for sorbing sulfur. When layer 60 provides a gettering function, largely all of layer 60 typically consists of one or more of the preceding metals. The thickness of layer 60 is then 30–300 nm, typically 100 nm, depending on the specific metal(s) selected to implement layer 60.

When two or more of the preceding ten metals are utilized in light-reflective layer 60 to provide it with a gettering function, the metals are normally mixed together to form an alloy in which all the materials are distributed across layer 60. In such multi-metal gettering alloy implementations, layer 60 preferably contains an alloy of two or more of magnesium, chromium, manganese, cobalt, copper, palladium, silver, and lead. Implementing light-reflective getter layer 60 with two or more of these eight metals can, in certain combinations, provide better gettering, especially sulfur gettering, than that achievable individually with each of the component metals. Layer 60 may, for example, consist largely of magnesium and chromium where chromium normally constitutes 5–95 atomic percent ("at. %") of the magnesium-chromium oxide in the alloy.

In cases where light-reflective layer 60 functions as a getter, layer 60 can include aluminum in addition to one or more of magnesium, chromium, manganese, cobalt, copper, molybdenum, palladium, silver, platinum, and lead. The aluminum in layer 60 enhances its light reflectivity. Layer 60 can also include one or more of lithium, beryllium, boron, and sodium for reducing the electron energy lost through layer 60. Magnesium, which provides a gettering action, also serves to reduce the electron energy loss through layer 60. The aluminum or/and the one or more of lithium, beryllium, boron, sodium, and magnesium are distributed throughout the getter material of layer 60 to form an alloy. Beryllium, boron, and magnesium are particularly suitable for reducing electron energy loss in this implementation of light-reflective getter layer 60.

Light-reflective getter layer 60 is very close to light-emissive regions 56 and, importantly, is situated between regions 56 and the interior of the flat-panel display. If regions 56 outgas sulfur as a result, for example, of being struck by electrons emitted by regions 48, layer 60 is well positioned to sorb the so-released sulfur before it leaves the immediate vicinity of regions 56 and enters the display's interior to cause damage elsewhere in the display. The getter material in layer 60 is normally suitable for sorbing contaminants other than sulfur. Accordingly, layer 60 can sorb such non-sulfur contaminants released by regions 56 and similarly prevent the non-sulfur contaminants from leaving the immediate vicinity of regions 56 and causing damage at other locations.

Light-reflective getter layer 60 lies on black matrix 58. To the extent that the getter material of layer 60 is suitable for sorbing any contaminants which outgas from matrix 58, layer 60 is likewise well positioned to sorb these contaminants and prevent them from leaving the immediate vicinity of matrix 58 and causing damage elsewhere in the display.

Light-emitting device 42 having light-reflective layer 60 constituted to provide a gettering function is fabricated, in accordance with the invention, according to the process of FIGS. 8a–8c and 8d1, except that layer 60 contains the desired getter metal in place of, or in addition to, aluminum or/and one or more of lithium, beryllium, boron, sodium, and magnesium. The getter metal consisting of one or more of magnesium, chromium, manganese, cobalt, copper, molybdenum, palladium, silver, platinum, and lead is deposited in any of the ways described above for depositing aluminum or/and one or more of lithium, beryllium, boron, sodium, and magnesium. The fabrication process ends at the stage of FIG. 8d1 in which layer 60 consists largely of the getter metal possibly alloyed with one or more of aluminum, lithium, beryllium, boron, sodium, and magnesium.

General Overcoat Layer

Figure 9:
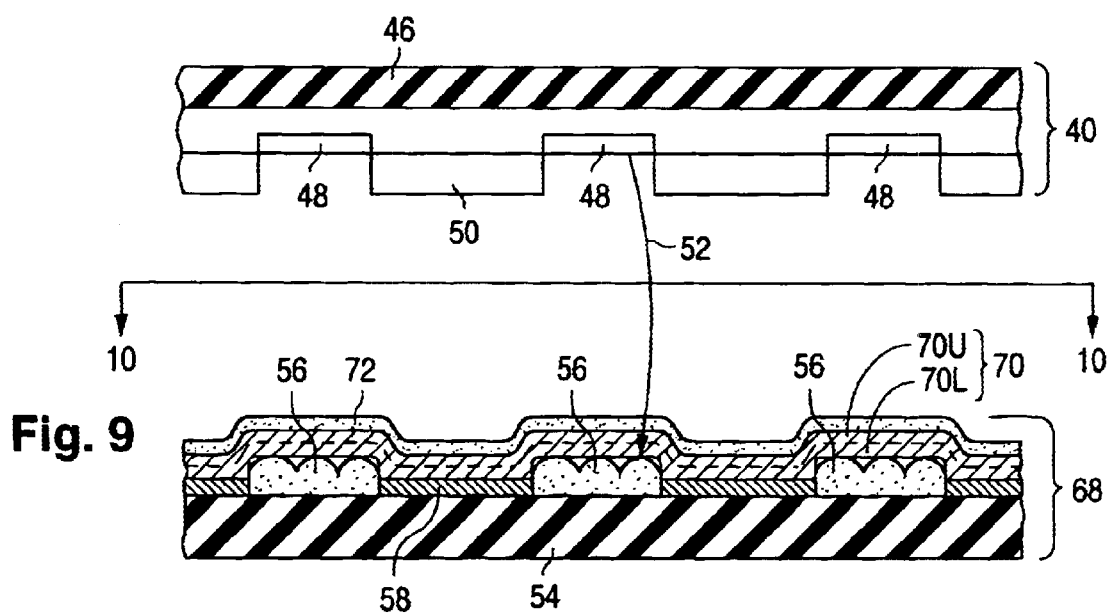
FIG. 9 is a cross-sectional side view of part of the active region of another flat-panel CRT display having a light-emitting device configured according to the invention.
Figure 10:
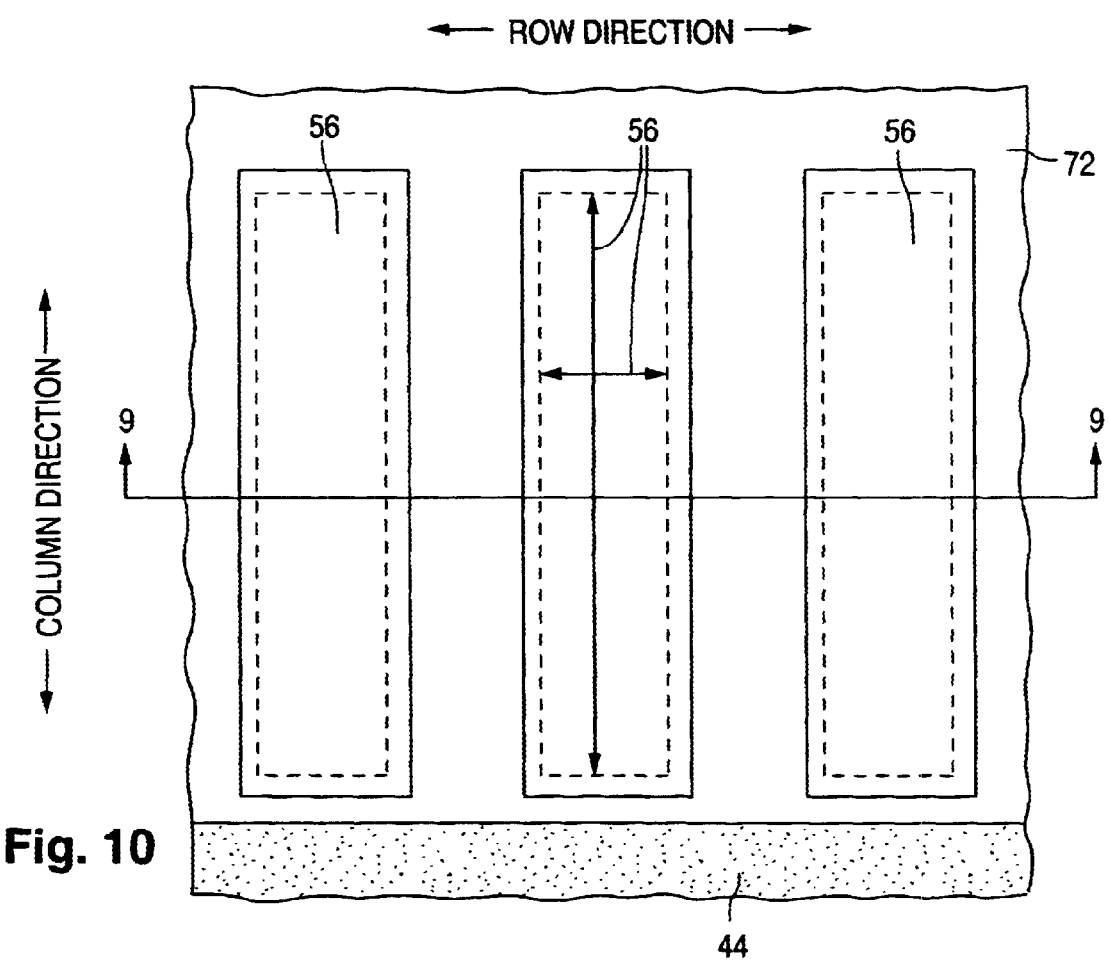
FIG. 10 is a cross-sectional plan view of the part of the active region of the flat-panel display, specifically the light-emitting device, of FIG. 9. The cross section of FIG. 9 is taken along plane 9—9 in FIG. 10. The cross section of FIG. 10 is taken along plane 10—10 in FIG. 9.

FIGS. 9 and 10 depict side and plan-view cross sections of part of the active region of a flat-panel CRT display having electron-emitting device 40, configured as described above, and an oppositely situated light-emitting device 68 whose interior surface is subjected to a high vacuum, typically an internal pressure of no more than $10^{-6}$ torr. In accordance with the invention, the vacuum-meeting interior surface of light-emitting device 68 achieves one or more of (a) lower chemical reactivity than an imaginary native coating of aluminum oxide formed along an imaginary aluminum layer, (b) lower secondary electron emission per unit area than the native aluminum oxide coating for largely the same high-energy electron impingement conditions, and (c) lower electron backscattering per unit area than the native oxide coating for largely the same high-energy electron impingement conditions.

Electron-emitting device 40 and light-emitting device 68 are connected together through an outer wall (not shown) to form a sealed enclosure maintained at the above-mentioned high vacuum. The plan-view cross section of FIG. 10 is taken in the direction of light-emitting device 68 along a plane extending laterally through the sealed enclosure. Hence, FIG. 10 largely presents a plan view of part of the active portion of device 68. Similar to the display of FIGS. 3 and 4, the display of FIGS. 9 and 10 typically includes spacers situated between devices 40 and 68 and may have getter material located at various places in the display. The location for a typical spacer, again represented as a spacer wall, is indicated by item 44 in FIG. 10.

Figure 11:
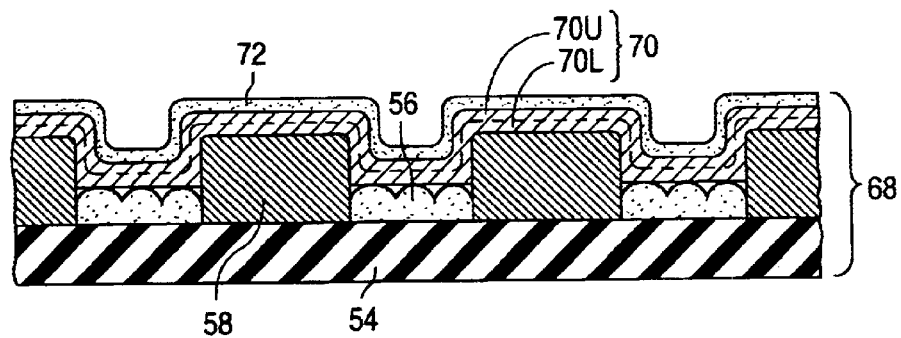
FIGS. 11–13 are cross-sectional side views of parts of the active portions of three light-emitting devices configured according to the invention and substitutable for the light-emitting device of FIGS. 9 and 10.

Light-emitting device 68 is formed with faceplate 54 and a group of layers/regions situated over the faceplate's interior surface. These layers/regions consist of light-emissive regions 56, black matrix 58, a light-reflective layer 70, and an overcoat layer 72. Components 54, 56, and 58 in device 68 are configured and constituted the same, and function the same, as in light-emitting device 42. As with device 42 in the display of FIGS. 3 and 4, black matrix 58 is thinner than light-emissive regions 56 in device 68 of the display in FIGS. 9 and 10. Similar to the variation shown in FIG. 5, FIG. 11 depicts a variation of device 68 in which matrix 58 is thicker than regions 56.

Light-reflective layer 70, which is analogous to light-reflective layer 60 in light-emitting device 42, lies over light-emissive regions 56 and black matrix 58 in light-emitting device 68. As with layer 60, layer 70 is normally perforated. Layer 70 contains electrically non-insulating material, normally electrically conductive material, and can be constituted in various ways. Aluminum is typically a constituent of layer 70. In one embodiment, largely all of layer 70 is aluminum.

Alternatively, light-reflective layer 70 may be the same as light-reflective layer 60 in the display of FIGS. 3 and 4. Accordingly, layer 70 may be configured to reduce the electron energy loss through layer 70. In that case, layer 70 is formed (a) with one or more of the non-aluminum metals consisting of lithium, beryllium, boron, sodium, and magnesium or (b) with aluminum and one or more of these five non-aluminum metals. Analogous to layer 60, layer 70 may consist of two or more sublayers. To pictorially indicate the sublayer situation, a dashed line in FIG. 9 divides layer 70 into a lower sublayer 70L and an upper sublayer 70U generally respectively corresponding to sublayers 60L and 60U of layer 60 in light-emitting device 42 of FIG. 6.

Light-reflective layer 70 may also function as a getter for sorbing contaminant gases, especially sulfur, in the manner described above for light-reflective getter layer 60. In that case, light-reflective layer 70 contains one or more of magnesium, chromium, manganese, cobalt, copper, molybdenum, palladium, silver, platinum, and lead. Similar to light-reflective getter layer 60, light-reflective getter layer 70 may also contain aluminum for enhancing the light-reflectivity or/and one or more of lithium, beryllium, boron, and sodium for reducing the electron energy loss through layer 70. Beryllium, boron, and magnesium are particularly attractive for incorporation into light-reflective getter layer 70 to reduce the electron energy loss.

Aside from how light-reflective layer 70 is constituted in the display of FIGS. 9 and 10, layer 70 is configured the same, and functions the same, as light-reflective layer 60. Hence, layer 70 serves as the display's anode, either by itself or in combination with black matrix 58 when matrix 58 consists of electrically non-insulating material. A suitable anode electrical potential, typically in the vicinity of 500–10,000 volts, is applied to layer 70 during display operation. Electrons emitted by regions 48 in electron-emitting device 40 pass through layer 70 before striking light-emissive regions 56 and causing them to emit light which produces the display's image on the exterior surface of light-emitting device 68. Since regions 56 emit light in all directions, layer 70 improves the light intensity of the image by reflecting forward some of the initially rear-directed light.

Overcoat layer 72 lies over light-reflective layer 70. In particular, layer 72 typically covers all, or nearly all, of layer 70 at least in the active portion of light-emitting device 68. At the minimum, layer 72 substantially covers layer 70 at the locations above light-emissive regions 56. Overcoat layer 72 has an outside surface, spaced apart from light-reflective layer 70, which forms the interior surface of device 68 and thus is exposed to the high vacuum present in the interior of the flat-panel display.

Similar to light-reflective layer 60, a parasitic transparent layer (not shown) of oxide of the metal that forms the lower surface of light-reflective layer 70 normally lies between layer 70, on one hand, and light-emissive regions 56 and black matrix 58, on the other hand. When the lower surface of layer 70 consists largely of aluminum, this parasitic transparent buried oxide layer is largely aluminum oxide having a thickness of 1–5 nm, typically 2.5 nm. Alternatively, substantially no oxide of the metal that forms the lower surface of layer 70 is situated between layer 70, on one hand, and regions 56 and black matrix 58, on the other hand.

A parasitic layer (not shown) of oxide lies between light-reflective layer 70 and overcoat layer 72 in one embodiment of light-emitting device 68. This further parasitic buried oxide layer, typically transparent, consists at least of oxide of the metal that forms the upper surface of light-reflective layer 70. When the upper surface of layer 70 is formed largely with aluminum, the further parasitic buried oxide layer contains aluminum oxide having a thickness of 1–5 nm, typically 2.5 nm. If the lower surface of overcoat layer 72 is formed with metal or/and semiconductor material, the parasitic buried oxide layer between layers 70 and 72 may include oxide of that metal or/and semiconductor material. In an alternative embodiment, substantially no oxide lies between layers 70 and 72.

A reference point for overcoat layer 72 is an imaginary native coating of aluminum oxide formed along an imaginary aluminum layer and subjected to electrons which impinge on the native aluminum oxide coating with generally the same energies and at generally the same angles that electrons emitted by regions 48 impinge on overcoat layer 72 from above light-emitting device 68. In accordance with the invention's teachings, layer 72 provides at least one of (a) lower chemical reactivity than the imaginary native aluminum oxide coating, (b) lower secondary electron emission per unit area than the native aluminum oxide coating, and (c) lower electron backscattering per unit area than the native aluminum oxide coating. Because layer 72 overlies light-reflective layer 70, electrons that pass through light-reflective layer 70 on their way to light-emissive regions 56 after having been emitted by regions 48 must pass through overcoat layer 72 before passing through light-reflective layer 70. Overcoat layer 72 then largely replaces light-reflective layer 70 and the parasitic oxide layer which, in the absence of overcoat layer 72, would lie along the upper surface of light-reflective layer 70 as the surface of concern with respect to secondary electron emission, electron backscattering, and contamination caused by electrons that strike the interior surface of device 68.

By having lower chemical reactivity than the imaginary native aluminum oxide coating, overcoat layer 72 normally has a lower gas sticking coefficient than the native oxide coating. Less gaseous material potentially harmful to the display adheres to layer 72 along the display's interior surface than, in the absence of layer 72, would adhere to the native oxide coating. When struck by electrons, layer 72 is thereby less likely to release material that could contaminate the display's interior.

Secondary electrons are emitted at energies typically suitable for ionizing gases to produce ions that can harm the flat-panel display. By having overcoat layer 72 provide lower secondary electron emission than the imaginary native aluminum oxide coating, the amount of display-damaging ionization is reduced. Also, the amount of image degradation caused by secondary electron emission along the interior surface of light-emitting device 68 is reduced. Likewise, the amount of image degradation caused by electron backscattering along the interior surface of device 68 is reduced when layer 72 provides lower electron backscattering than the imaginary oxide coating. The presence of layer 72 thereby improves the display performance and lifetime.

As noted above, electrons that strike light-emissive regions 56 after having been emitted by regions 48 must pass through both light-reflective layer 70 and overcoat layer 72.

The presence of layer 72 thus causes the electrons to lose some energy before they strike regions 56 to produce light emission. To keep the electron energy loss low, layer 72 is preferably made as thin as can feasibly be done without impairing the ability of layer 72 to provide one or more of the properties of reduced chemical reactivity, reduced secondary electron emission, and reduced electron backscattering. Layer 72 normally has a thickness of 2–100 nm, typically 10 nm, depending on the constituency of layer 72. With the typical thickness of light-reflective layer 70 being 70–100 nm, overcoat layer 72 is typically considerably thinner than light-reflective layer 70.

Overcoat layer 72 may consist of largely only a single material, or of an alloy or mixture of materials, that provides (a) one of the preceding chemical reactivity, secondary electron emission, and electron backscattering properties if only one of these properties is to be achieved in a particular embodiment of light-emitting device 68, (b) two of the properties if only two of the properties are to be achieved in a particular embodiment, or (c) all three of the properties. Alternatively, layer 72 may consist of multiple layers of different chemical composition where each different layer consists of largely only a single material or of a mixture or alloy of two or more materials.

When overcoat layer 72 consists of multiple layers, each different layer may provide one or two, but not all three, of the chemical reactivity, secondary electron emission, and electron backscattering properties. Two or more consecutive layers may, in some situations, provide the same property or properties. This type of situation usually arises when a layer of overcoat layer 72 is formed by depositing metal or/and semiconductor material in a low-pressure environment after which the upper surface of the deposited layer, i.e., its outer surface, is exposed to highly reactive gas, typically oxygen in air. Due to the exposure to the highly reactive gas, a compound of the gas and the metal or/and semiconductor material of the deposited layer grows along the exposed surface of the deposited layer to create a further layer of overcoat layer 72. If the originally deposited layer is perforated, layers formed with a compound of the reactive gas and the metal or/and semiconductor material of the deposited layer may grow along both its upper and lower surfaces.

The cross section of light-emitting device 68 in FIGS. 9 and 10, although generally directed to both (a) the situation in which overcoat layer 72 consists largely of only a single material or an alloy or mixture of materials and (b) the situation in which layer 72 consists of multiple layers of different composition, is specifically directed to the situation in which layer 72 consists of largely only a single material or an alloy or mixture of materials. In the situation specifically represented by device 68 in FIGS. 9 and 10, the single material of layer 72 or the mixture or alloy of materials that form layer 72 provide any one of the following: (a) reduced chemical reactivity, (b) reduced secondary electron emission, (c) reduced electron backscattering, (d) reduced chemical reactivity and reduced secondary electron emission, (e) reduced chemical reactivity and reduced electron backscattering, (f) reduced secondary electron emission and reduced electron backscattering, and (g) reduced chemical reactivity, reduced secondary electron emission, and reduced electron backscattering.

Figure 12:
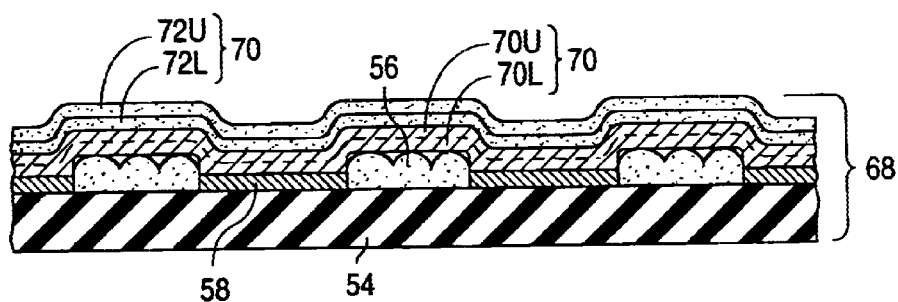
Figure 13:
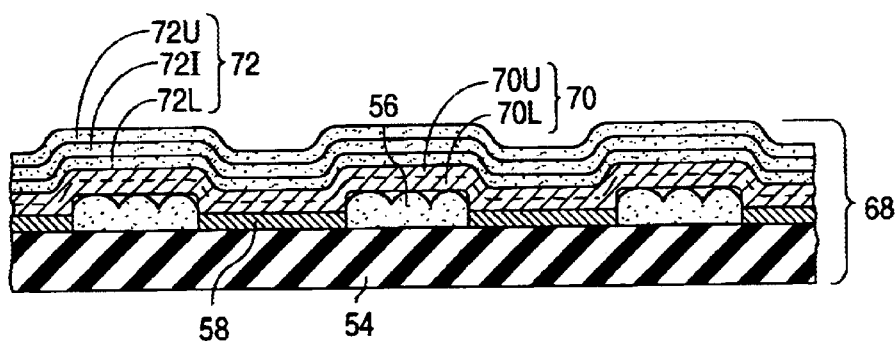

FIGS. 12 and 13 illustrate embodiments of light-emitting device 68 that implement situations in which overcoat layer 72 consists of multiple layers. In FIG. 12, layer 72 consists of a lower overcoat layer 72L and an upper overcoat layer 72U. Lower overcoat layer 72L lies over light-reflective layer 70, either directly on layer 70 if no parasitic oxide layer is situated along the upper surface of layer 70 or, when such a parasitic oxide layer is present, on that parasitic oxide layer. Upper overcoat layer 72U lies on lower layer 72L. In FIG. 13, overcoat layer 72 further includes an intermediate overcoat layer 72I situated on lower layer 72L. Upper layer 72U lies on intermediate overcoat layer 72I in FIG. 13. Each of layers 72U, 72I, and 72L substantially fully overlies each underlying layer 72I, 72L, or 70.

Insofar as introduction of contaminants into the interior of the display having electron-emitting device 40 and light-emitting device 68 is concerned, the chemical reactivity of overcoat layer 72 is determined largely by the characteristics of the material that forms the outside surface of layer 72, i.e., the surface exposed to the vacuum in the sealed enclosure between devices 40 and 68. For layer 72 to provide lower chemical reactivity than the above-mentioned imaginary native coating of aluminum oxide, the material along the outside surface of layer 72 thus has lower chemical reactivity than the native aluminum oxide coating. In an embodiment where layer 72 consists of multiple layers, the material that provides layer 72 with lower chemical reactivity than the native oxide coating consists at least of the uppermost layer, i.e., upper overcoat layer 72U in the implementations of FIGS. 12 and 13.

Heat of formation is a primary indicator of chemical reactivity. Increasing the heat of formation normally leads to a reduction in the gas sticking coefficient. Overcoat layer 72 provides lower chemical reactivity than the imaginary native aluminum oxide coating when the material forming the outside surface of layer 72 has a higher heat of formation than the imaginary native aluminum oxide coating. Also, compared to the imaginary native aluminum oxide coating, the material along the outside surface of layer 72 reacts less, preferably substantially not at all, with water. The material along the outside surface of layer 72 also reacts less, again preferably not at all, with fluorine.

Electron backscattering for a surface subjected to impinging electrons generally decreases as the average volumetric proton density of the material forming the surface decreases. Accordingly, overcoat layer 72 typically achieves lower electron backscattering than the imaginary native aluminum oxide coating by arranging for layer 72, or a suitable layer of layer 72, to be of lower average volumetric proton density than the native oxide coating.

When overcoat layer 72 is formed with multiple layers, a layer that provides reduced electron backscattering can be located below the outside surface of layer 72, i.e., below upper overcoat layer 72U in the embodiment of FIG. 12 or 13, provided that the material overlying the layer which provides reduced electron backscattering is sufficiently thin to enable the electron backscattering characteristics to be controlled through that material. Specifically, the thickness of the layer or layers which overlie the layer that provides reduced electron backscattering is normally no more than 1–5 nm, typically no more than 2 nm.

A layer that provides reduced secondary electron emission can directly underlie upper overcoat layer 72U when it provides reduced chemical reactivity. However, a layer which provides reduced secondary electron emission would normally be masked by an overlying layer which provides reduced electron backscattering and thus normally should not underlie a layer that provides reduces electron backscattering.

In light of the foregoing, the characteristics of reduced chemical reactivity, reduced secondary electron emission per unit area, and reduced electron backscattering per unit area can be variously implemented in the layers of overcoat layer 72 in light-emitting device 68 of FIG. 12 or 13. The following table presents appropriate ways for implementing these three characteristics in device 68 of FIG. 12 where overcoat layer 72 consists of lower overcoat layer 72L and upper overcoat layer 72U:

TABLE II

Property Allocation When Overcoat layer 72 Consists of Lower Layer 72L and Upper Layer 72U

| Embodiment | Upper Layer 72U | Lower Layer 72L |
|---|---|---|
| a | Reduced chemical reactivity | Reduced secondary electron emission per unit area |
| b | Reduced chemical reactivity | Reduced electron backscattering per unit area |
| c | Reduced chemical reactivity | Reduced secondary electron emission per unit area and reduced electron backscattering per unit area |
| d | Reduced chemical reactivity and reduced secondary electron emission per unit area | Reduced electron backscattering per unit area |
| e | Reduced chemical reactivity and reduced secondary electron emission per unit area | Reduced electron backscattering per unit area and reduced secondary electron emission per unit area |
| f | Reduced secondary electron emission per unit area | Reduced electron backscattering per unit area |

Upper overcoat layer 72U, intermediate overcoat layer 72I, and lower overcoat layer 72L in the embodiment of FIG. 13 respectively provide reduced chemical reactivity, reduced secondary electron emission, and reduced electron backscattering. Inasmuch as two or more consecutive layers of overcoat layer 72 can provide the same characteristic or pair of characteristics, each of layers 72U and 72L in Table II or each of layers 72U, 72I, and 72L in this three-layer situation may consist of multiple sublayers of different chemical composition.

Beryllium, boron, silver, gold, boron nitride, boron oxide, aluminum nitride, silicon nitride, silicon oxide, and chromium oxide are especially attractive candidate materials for implementing overcoat layer 72 to provide it with lower chemical reactivity than the imaginary native aluminum oxide coating when layer 72 consists largely of a single material or of an alloy of two or more materials. In single-layer implementations of layer 72, carbon is particularly attractive for providing layer 72 with reduced chemical reactivity when electron-emitting device 40 is a field emitter, especially one that operates according to the three-dimensional type of field emission. In single-layer implementations of layer 72, chromium is especially attractive for enabling layer 72 to furnish reduced chemical reactivity when device 40 operates according to three-dimensional field emission. When layer 72 is implemented in multiple layers with upper overcoat layer 72 providing the requisite reduced chemical reactivity, all twelve of these materials are especially attractive candidates for upper layer 72U.

Overcoat layer 72 consists largely of chromium oxide for achieving reduced chemical reactivity in one preferred embodiment of a single-layer implementation of layer 72. In another preferred embodiment of a single-layer implementation, layer 72 is formed largely with chromium for attaining reduced chemical reactivity when electron-emitting device 40 operates according to three-dimensional field emission. In a multi-layer implementation of layer 72 where upper overcoat layer 72U provided reduced chemical reactivity, upper layer 72U preferably consists largely of chromium or/and chromium oxide, typically an upper sublayer of chromium oxide situated on a lower sublayer of chromium.

Silicon, germanium, tin, and lead are attractive candidates for implementing overcoat layer 72 to achieve reduced chemical reactivity in single-layer implementations of layer 72. The same applies to multi-layer implementations in which upper overcoat layer 72U provides reduced chemical reactivity. Other candidate materials suitable for enabling layer 72 to achieve reduced chemical reactivity in single-layer implementations include cobalt, ruthenium, iridium, and platinum. Iron, nickel, and niobium are suitable for providing layer 72 with reduced chemical reactivity in single-layer implementations when electron-emitting device 40 operates according to three-dimensional field emission. Iron, cobalt, nickel, niobium, ruthenium, iridium, and platinum, along with molybdenum, are all suitable for providing upper layer 72U with reduced chemical reactivity in multi-layer implementations of layer 72. Two or more of the preceding materials can generally be employed to provide layer 72 or 72U with reduced chemical reactivity.

When overcoat layer 72 in single-layer implementations of layer 72, or upper overcoat layer 72U in multi-layer implementations, is constituted with two or more materials for achieving reduced chemical reactivity, the materials are normally mixed together to form an alloy in which all the materials are distributed across layer 72 or 72U. One such multi-metal alloy implementation of layer 72 or 72U is an alloy of oxide of chromium and aluminum where chromium oxide normally constitutes 10–90 at. %, typically 50 at. %, of the aluminum-chromium oxide in the alloy. For example, oxide of chromium and aluminum can typically be represented by the stoichiometric formula $Cr_{2x}Al_{2-2x}O_3$ where x is a ratio parameter which here varies from 0.1 to 0.9. Implementing layer 72 or 72U with aluminum-chromium oxide yields a lower gas sticking coefficient for carbon than typically attainable solely with chromium oxide.

In other such multi-metal alloy implementations, overcoat layer 72 or upper overcoat layer 72U is formed as oxynitride of two or more of boron, aluminum, silicon, and chromium for achieving a lower gas sticking coefficient, especially for carbon, than appears typically achievable solely with chromium oxide. Chromium oxide and boron nitride are combined to form an alloy of oxynitride of chromium and boron in one specific implementation. Chromium oxide is combined with aluminum nitride to form an alloy of oxynitride of chromium and aluminum in another implementation. In a third implementation, chromium oxide is combined with silicon nitride to form an alloy of oxynitride of chromium and silicon. Chromium oxide normally constitutes 10–90 at. % of the boron-chromium oxynitride, the aluminum-chromium oxynitride, or the silicon-chromium oxynitride in the alloy. For the case in which the oxynitrides of chromium and boron, of chromium and aluminum, and of chromium and silicon are respectively represented by the stoichiometric formulas $Cr_{2x}B_{1-x}O_{3x}N_{1-x}$, $Cr_{2x}Al_{1-x}O_{3x}N_{1-x}$, and $Cr_{2x}Si_{3-3x}O_{3x}N_{4-4x}$, ratio parameter x then varies from 0.1 to 0.9.

Beryllium oxide, vanadium oxide, chromium oxide, cerium oxide, and neodymium oxide are especially attractive candidate materials for implementing overcoat layer 72 to provide it with lower secondary electron emission per unit area than the imaginary native aluminum oxide coating in single-layer implementations of layer 72. Similar to reduced chemical reactivity, carbon is particularly attractive for providing reduced secondary electron emission in single-layer implementations of layer 72 when electron-emitting device 40 is a field emitter, especially one operating according to three-dimensional field emission. Also similar to reduced chemical reactivity, chromium is especially attractive for enabling layer 72 to attain reduced secondary electron emission in single-layer implementations of layer 72 when device 40 operates according to three-dimensional field emission. When layer 72 is implemented (a) in two layers with upper overcoat layer 72U or lower overcoat layer 72L providing the requisite reduced secondary electron emission or (b) in three layers with intermediate overcoat layer 72I providing reduced secondary electron emission, all seven of these materials are especially attractive candidates for layer 72U, 72L, or 72I that provides reduced secondary electron emission.

Overcoat layer 72 consists largely of chromium oxide for achieving reduced secondary electron emission in one preferred embodiment of a single-layer implementation of layer 72. In another preferred embodiment of a single-layer implementation, layer 72 is formed largely with carbon or chromium for attaining reduced secondary electron emission when electron-emitting device 68 operates according to three-dimensional field emission. In multi-layer implementations of layer 72 where upper overcoat layer 72U, lower overcoat layer 72L, or intermediate overcoat layer 72I, layer 72U, 72L, or 72I that provides reduced secondary electron emission is preferably formed largely with carbon, chromium, or/and chromium oxide, typically a chromium oxide upper sublayer on a chromium lower sublayer.

Silver, gold, vanadium phosphorus oxide, silver oxide, and europium oxide are attractive candidates for implementing overcoat layer 72 to achieve reduced secondary electron emission in single-layer implementations of layer 72. In single-layer implementations of layer 72, barium is also an attractive candidate for layer 72 when electron-emitting device 40 operates according to three-dimensional field emission. All six of these materials are attractive for appropriately enabling upper overcoat layer 72U, lower overcoat layer 72L, or intermediate overcoat layers 72I to attain reduced secondary electron emission in multi-layer implementations of layer 72. Other materials suitable for enabling layer 72 to achieve reduced secondary electron emission in single-layer implementations or for enabling layer 72U, 72L, or 72I to attain reduced secondary electron emission in multi-layer implementations include neodymium, copper oxide, and molybdenum oxide. Two or more of the preceding sixteen materials can generally be utilized to provide layer 72, 72U, 72L, or 72I with reduced secondary electron emission.

When overcoat layer 72 is constituted with two or more materials for achieving reduced secondary electron emission in single-layer implementations of layer 72, the materials are normally mixed together to form an alloy in which all the materials are distributed across layer 72. The same applies to multi-layer alloy implementations when upper overcoat layer 72U, lower overcoat layer 72L, or intermediate overcoat layer 72I consists of two or more metals for achieving reduced secondary electron emission.

The alloy in these multi-metal implementations of overcoat layer 72, upper overcoat layer 72U, lower overcoat layer 72L, or intermediate overcoat layer 72I typically consists of oxide of two or more of the metals vanadium, chromium, cerium, and neodymium. In one specific metal oxide alloy implementation, chromium oxide and neodymium oxide are combined to form an alloy of oxide of chromium and neodymium where chromium oxide constitutes 10–90 at. % of the chromium-neodymium oxide in the alloy. For the case in which oxide of chromium and neodymium is represented by the stoichiometric formula $Cr_{2x}Nd_{2-2x}O_3$, ratio parameter x then varies from 0.1 to 0.9. Depending on the atomic percentage of chromium oxide to the atomic percentage of neodymium oxide in the alloy of chromium-neodymium oxide, the alloy can achieve lower secondary electron emission than pure chromium oxide while having superior adhesion/chemical stability than neodymium oxide.

Chromium oxide and vanadium oxide are combined to form an alloy of oxide of vanadium and chromium in another specific metal oxide alloy implementation of overcoat layer 72, upper overcoat layer 72U, lower overcoat layer 72L, or intermediate overcoat layer 72I. Chromium oxide constitutes 10–90 at. % of the vanadium-chromium oxide in the alloy. When oxide of chromium and vanadium is represented by the stoichiometric formula $Cr_{2x}V_{2-2x}O_{5-2x}$ (where the $O_{5-2x}$ term is derived by combining $O_{3x}$ for chromium and $O_{5-5x}$ for vanadium), ratio parameter x is then 0.1–0.9. Depending on the atomic percentage of chromium oxide to the atomic percentage of vanadium oxide in the alloy of vanadium-chromium oxide, the alloy can achieve lower secondary electron emission than pure chromium oxide while having superior chemical stability to electron bombardment than vanadium oxide.

Two further metal oxide alloy implementations for overcoat layer 72, upper overcoat layer 72U, lower overcoat layer 72L, or intermediate overcoat layer 72I consist of (a) combining vanadium oxide and neodymium oxide to form an alloy of oxide of vanadium and neodymium and (b) combining chromium oxide and cerium oxide to form an alloy of oxide and chromium and cerium. Each metal oxide in each of these alloys constitutes 10–90 at. % of the two metal oxides in that alloy. For the cases in which oxide of vanadium and neodymium is represented by the stoichiometric formula $V_{2x}Nd_{2-2x}O_{3+2x}$ (where the $O_{3+2x}$ term is derived by combining $O_{5x}$ for vanadium and $O_{3-3x}$ for neodymium) and in which oxide of chromium and cerium is represented by the stoichiometric formula $Cr_{2x}Ce_{2-2x}O_3$, ratio parameter x then varies from 0.1 to 0.9.

In certain cases, overcoat layer 72 may include a substantially pure metal for achieving reduced secondary electron emission per unit area. The pure metal either forms largely all of layer 72 or, in cases where layer 72 consists of multiple layers, largely all of upper overcoat layer 72U, lower overcoat layer 72L, or intermediate overcoat layer 72I that provides reduced secondary electron emission. The melting point of the pure metal is normally at least 600° C. The pure metal can be silver or gold in single-layer implementations of layer 72. When electron-emitting device 40 operates according to three-dimensional field emission, the pure metal can also be chromium or barium in single-layer implementations of layer 72. The pure metal can be any of these four metals in multi-layer implementations of layer 72.

Boron and boron oxide are especially attractive candidate materials for implementing overcoat layer 72 to provide it with lower electron backscattering per unit area than the imaginary native aluminum oxide coating in single-layer implementations of layer 72. Similar to reduced chemical reactivity and reduced secondary electron emission, carbon is particularly attractive for providing reduced electron backscattering in single-layer implementations of layer 72 when light-emitting device 68 is a field emitter, especially one that operates according to a three-dimensional field emission. In multi-layer implementations of layer 72 where lower overcoat layer 72L provides reduced electron backscattering, each of boron, carbon, and boron oxide is especially attractive for enabling lower layer 72L to achieve reduced electron backscattering.

Overcoat layer 72 is formed with carbon for achieving reduced electron backscattering in a preferred embodiment of a single-layer implementation of layer 72 when light-emitting device 68 is a field emitter, especially one operating according to three-dimensional field emission. In multi-layer implementations of layer 72 where lower overcoat layer 72L provides reduced electron backscattering, lower layer 72L likewise preferably consists of carbon.

Beryllium, magnesium, boron nitride, boron-magnesium, and aluminum nitride are attractive for enabling overcoat layer 72 to achieve reduced electron backscattering in single-layer implementations of layer 72. These five materials, along with aluminum carbide, are all attractive for enabling lower overcoat layer 72L to achieve reduced electron backscattering in multi-layer implementations of layer 72. Other materials that can be employed to provide layer 72, 72U, or 72L with reduced electron backscattering per unit area are lithium-aluminum, beryllium-boron, beryllium carbide, beryllium-aluminum, boron-aluminum, sodium carbide, sodium nitride, sodium oxide, sodium-aluminum, and magnesium-aluminum. In general, two or more of the preceding materials can be combined to provide layer 72, 72U, or 72L with reduced electron backscattering per unit area.

A large number of materials generally suitable for providing overcoat layer 72 with lower electron backscattering than the imaginary native oxide coating can be described as following into the class consisting of beryllium, boron, magnesium, alloys of these three metals, and certain compounds of beryllium, boron, and sodium with carbon, nitrogen, or/and oxygen. All of the materials falling into this class are of lower average volumetric proton density than aluminum oxide and are also of lower average volumetric proton density than aluminum. See the following table which presents stoichiometric formula, mass density ρ, and proton density parameter Zρ/W for the materials in this class:

TABLE III

Properties of Materials for Achieving Reduced Electron Backscattering with Overcoat Layer 72

| Material | Stoichiometric Formula | Density ρ (g/cm³) | Zρ/W (g/cm³) |
| --- | --- | --- | --- |
| Beryllium | Be | 1.85 | 0.82 |
| Beryllium carbide | Be₂C | 1.90 | 0.89 |
| Boron | B | 2.34–2.37 | 1.08–1.10 |
| Boron nitride | BN | 2.25 | 1.09 |
| Boron oxide | B₂O₃ | 1.81 | 0.88 |
|  | B₂O₃ | 2.46 | 1.20 |
| Sodium | Na | 0.97 | 0.46 |
| Sodium carbide | Na₂C₂ | 1.58 | 0.52 |
| Sodium nitride | Na₃N | — | — |
| Sodium oxide | Na₂O | 2.27 | 1.10 |
| Magnesium Reference Material | Mg | 1.74 | 0.86 |
| Aluminum | Al | 2.70 | 1.30 |
| Aluminum oxide | Al₂O₃ | 3.97 | 1.32 |

Table III is suitable for use in selecting materials to achieve reduced electron backscattering with overcoat layer 72, upper overcoat layer 72U, or lower overcoat layer 72L.

When overcoat layer 72 or upper overcoat layer 72U is created by depositing metal (either pure metal or an alloy or mixture of two or more metals) or/and semiconductor material, layer 72 or 72U normally includes a parasitic layer (not separately shown) of oxide of that metal or/and semiconductor material. This parasitic oxide layer forms the upper surface of layer 72 or 72U and thus constitutes the interior surface of light-emitting device 68. The parasitic surface oxide layer cooperates with the metal or/and semiconductor material of layer 72 or 72U to provide one or more of reduced chemical reactivity, reduced secondary electron emission, and reduced electron backscattering. The thickness of the parasitic surface oxide layer is normally 1–10 nm, typically 2.5 nm, depending on the constituency of layer 72 or 72U.

Certain of the materials which enable overcoat layer 72 to achieve one of the properties of reduced chemical reactivity, reduced secondary electron emission, and reduced electron backscattering enable layer 72 to achieve one or both of the other two of these properties. By appropriately choosing the materials that provide layer 72 with these properties, the number of materials needed to provide layer 72 with all three of these properties can be one or two. Also, when upper sublayer 60U of light-reflective layer 60 in light-emitting device 42 of FIG. 6 or 7 consists largely of one or more of beryllium, boron, magnesium, and chromium, layer 60U is the same as overcoat layer 72 or lower overcoat layer 72L when layer 72 or 72L consists largely of one or more of beryllium, boron, magnesium, and chromium.

FIGS. 14*a*, 14*b*1, 14*b*2, and 14*b*3 (collectively "FIG. 14") illustrate a general process for fabricating light emitting device 68 of FIGS. 9 and 10 in accordance with the invention and variations for producing devices 68 of FIGS. 12 and 13 in accordance with the invention. Depending on how overcoat layer 72 is to be configured, the process of FIG. 14 starts essentially with the stage of FIG. 8*d*1 or 8*d*2 in the process of FIG. 8 subject to changing light reflective layer 60 to light reflective layer 70 with the understanding that layer 70 may consist largely of aluminum or may be layer 60 constituted to reduce electron energy loss or/and provide a gettering function. See FIG. 14*a*. To cover both the stage of FIG. 8*d*1 and the stage of FIG. 8*d*2, layer 70 in FIG. 14*a* is depicted with an internal dashed line which, for the stage of FIG. 8*d*2, divides layer 70 into lower sublayer 70L and upper sublayer 70U as in FIGS. 9, 12, and 13.

In the process of reaching the stage of FIG. 14*a*, light-reflective layer 70 has been created in the same way as light-reflective layer 60 in light-emitting device 42 subject to layer 70 potentially consisting of different metal than layer 60. Accordingly, parasitic layers (not shown) of the metal(s) that respectively form the upper and lower surfaces of layer 70 respectively lie along the upper and lower surfaces of layer 70. Also, the binder material and lacquer originally present in regions 62 have been removed to get to the stage of FIG. 14*a*. Any lacquer originally present on top of black matrix 58 has also been removed in getting to the stage of FIG. of 14*a*.

Overcoat layer 72 is now deposited over light-reflective layer 70 and, in particular, on the parasitic oxide layer that extends along the upper surface of layer 70. Depending on the desired constituency and configuration of overcoat layer 72, the deposition of the overcoat material(s) can be done by various techniques such as evaporation, sputtering, thermal spraying, CVD, and electrophoretic/dielectrophoretic deposition. The deposition of layer 72 is performed in a suitable deposition chamber at a low pressure ranging from several torr for CVD down to $10^{-6}$ torr or less (a high vacuum) for evaporation or sputtering. Multiple deposition steps are performed when layer 72 consists of multiple layers such as layers 72L and 72U or layers 72L, 72I and 72U.

Light-emitting device 68, now virtually complete, is removed from the deposition chamber and exposed to air, and thus to oxygen. In the case where overcoat layer 72 or upper overcoat layer 72U was formed by depositing metal or/and semiconductor material, the subsequent exposure to oxygen causes a parasitic layer (not separately shown) of oxide of that metal or/and semiconductor material to grow along the upper surface of the deposited metal or/and semiconductor material. This surface native oxide layer forms part of layer 72 or 72U. If layer 72 is perforated and if layer 72 or lower overcoat layer 72L consists of metal or/and semiconductor material, the parasitic oxide layer along the upper surface of light-reflective layer 70 may grow to include oxide of that metal or/and semiconductor material. This latter parasitic oxide layer is a buried layer lying between layers 70 and 72.

Except for the parasitic oxide layers along the upper and lower surfaces of light reflective layer 70, the resultant structure is illustrated in FIG. 14$b$1, 14$b$2, or 14$b$3 dependent on the configuration of overcoat layer 72. FIG. 14$b$1 presents light emitting device 68 of FIG. 9. Although FIG. 14$b$1 represents both (a) the situation in which overcoat layer 72 consists largely of only a single material or of an alloy or mixture of materials and (b) the situation in which layer 72 consists of multiple layers, FIG. 14$b$1 is directed specifically to the situation in which layer 72 consists largely of only a single material or of an alloy or mixture of materials. FIG. 14$b$2, which repeats FIG. 12, presents the embodiment of device 68 in which layer 72 is formed with layers 72L and 72U. FIG. 14$b$3, which repeats FIG. 13, presents the embodiment of device 68 in which layer 72 consists largely of layers 72L, 72I, and 72U.

In an alternative embodiment, light-reflective layer 70 is deposited over light-emissive regions 56 and black matrix 58 in a high-vacuum environment which is maintained on the partially fabricated light-emitting device during the elevated-temperature removal of the binder material and lacquer in regions 62 and also during the subsequent deposition of overcoat layer 72. As a result, largely no oxide forms along the upper or lower surface of light-reflective layer 70 during the time period extending from the deposition of layer 70 through the deposition of overcoat layer 72. If layer 72 is largely impervious to oxygen, largely no oxide forms along the upper or lower surface of light-reflective layer 70 when the structure is exposed to air, and thus to oxygen, subsequent to the deposition of layer 72. Specifically, largely no aluminum oxide forms along the upper or lower surface of light-reflective layer 70 when it consists largely of, or includes, aluminum.

Overcoating Getter Layer

Overcoat layer 72 functions, in accordance with the invention, as a getter for sorbing contaminant gases, especially sulfur, in a variation of light-emitting device 68. In this variation, overcoating getter layer 72 contains one or more of the metals magnesium, cobalt, copper, palladium, silver, platinum, and lead. Another candidate metal for overcoating getter layer 72 is chromium, especially when electron-emitting device 40 is a field emitter that operates according to three-dimensional field emission. Alternately or additionally, overcoat layer 72 contains oxide of one or more of the metals magnesium, chromium, manganese, cobalt, nickel, and lead. All fourteen of these metals and metal oxides are suitable for sorbing sulfur.

In cases where overcoating getter layer 72 contains two or more of the preceding fourteen getter materials, the two or more getter materials can be mixed together to form an alloy or mixture. Alternatively, the two or more getter materials can be variously distributed across multiple overcoating layers such as layers 72U and 72L in a two-layer embodiment. Each layer of overcoating getter layer 72 then contains one or more of the fourteen getter materials. The thickness of overcoating getter layer 72 is 2–20 nm, typically 10 nm, depending on the specific material(s) chosen to implement layer 72.

When two or more of the preceding fourteen materials are employed in layer 72 to provide it with a gettering function in single-layer implementations of layer 72, the materials are normally mixed together to form an alloy in which all the materials are distributed across layer 72. The same applies to multi-layer implementations in which upper overcoating layer 72U or lower overcoating layer 72L consists of two or more materials for sorbing contaminants. In multi-metal alloy implementations, the alloy preferably consists of oxide of two or more of magnesium, chromium, manganese, cobalt, nickel, and lead. Implementing layer 72, 72U, or 72L with an alloy of two or more of these six metal oxides can, for certain combinations, provide better gettering, especially sulfur gettering, than is typically individually achievable with each of the corresponding component metal oxides.

Overcoating getter layer 72 or upper overcoating layer 72U consists largely of an alloy of oxide of chromium and magnesium in one multi-metal alloy implementation. Chromium oxide normally constitutes 5–95 at. % of the magnesium-chromium oxide in the alloy. For the case in which oxide of chromium and magnesium is represented by the stoichiometric formula $Cr_{2x}Mg_{1-x}O_{1+2x}$ (where the $O_{1+2x}$ term is derived by combining $O_{3x}$ for chromium and $O_{1-x}$ for magnesium), ratio parameter x then varies from 0.05 to 0.95. The alloyed combination of magnesium oxide and chromium oxide has greater ability to break sulfur-oxygen and sulfur-hydrogen bonds in sulfur-containing compounds than does magnesium oxide or chromium oxide by itself. Consequently, implementing layer 72 or 72U with magnesium-chromium oxide enhancing sorbing of sulfur in sulfur-containing compounds.

Alternatively, the alloy in these multi-metal implementations of overcoating getter layer 72 or upper overcoating layer 72U consists of two or more of the metals magnesium, chromium, manganese, cobalt, copper, palladium, nickel, silver, and lead. Similar to light-reflective getter layer 60, overcoating getter layer 72 consists largely of an alloy of magnesium and chromium in one specific implementation. Chromium normally constitutes 5–95 at. % of the magnesium and chromium in the alloy.

When layer 72 functions as a getter for sorbing contaminant gases, especially sulfur, light-reflective layer 70 normally does not function as a getter for sorbing the same contaminant gases. At the minimum, layers 70 and 72 are differently constituted. For instance, light-reflective layer 70 may consist largely of aluminum in the variation of light-emitting device 68 where layer 72 is a getter. Alternatively, layer 70 may be formed largely with one or more of lithium, beryllium, boron, sodium, and magnesium, preferably one or more of beryllium, boron, and magnesium, often combined with aluminum, for reducing the electron energy loss provided that, in this variation, layer 72 either does not contain magnesium or contains magnesium at a significantly different atomic percentage than layer 70.

Overcoating getter layer 72 is very close to light-emission regions 56 and, importantly, is located between regions 56 and the interior of the flat-panel display. Should regions 56 outgas sulfur as a result, for example, of being struck by electrons emitted by regions 48 of electron-emitting device 40, and should the sulfur pass through the pores in light-reflective layer 70, layer 72 is well positioned to sorb the outgassed sulfur before it leaves the immediate vicinity of regions 56 and enters the display's interior to cause damage elsewhere. The same applies to other contaminants which are released by regions 56 and are readily sorbable by layer 72.

Overcoating getter layer 72 overlies black matrix 58. To the extent that the getter material of layer 72 is suitable for sorbing any contaminants which originate from matrix 58 and pass through light-reflective layer 70, layer 72 is likewise well positioned to sorb these contaminants and prevent them from leaving the immediate vicinity of matrix 58 and causing damage at other locations in the display.

Light-emitting device 68 having overcoating getter layer 72 can be modified in various ways. Inasmuch as layer 72 sorbs contaminants gases released by underlying light-emissive regions 56 and, in some cases, by underlying black matrix 58 before these contaminants leave the immediate vicinity of regions 56 and matrix 58, layer 72 can be extended to multiple layers in which the lowermost layer contains one or more of the above metals for sorbing contaminant gases, again especially sulfur, and in which the other layer or layers provide one or more of the reduced chemical reactivity, reduced secondary electron emission, and reduced electron backscattering properties described above.

Passivation Undercoat Layer

Figure 15:
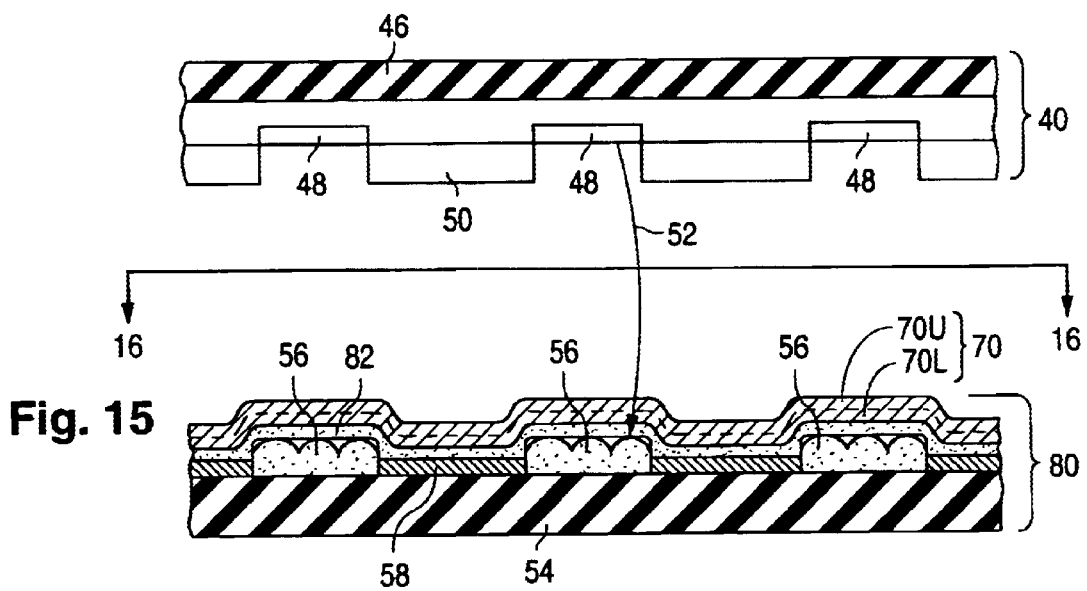
FIG. 15 is a cross-sectional side view of part of the active region of a flat-panel CRT display having a light-emitting device configured according to the invention.
Figure 16:
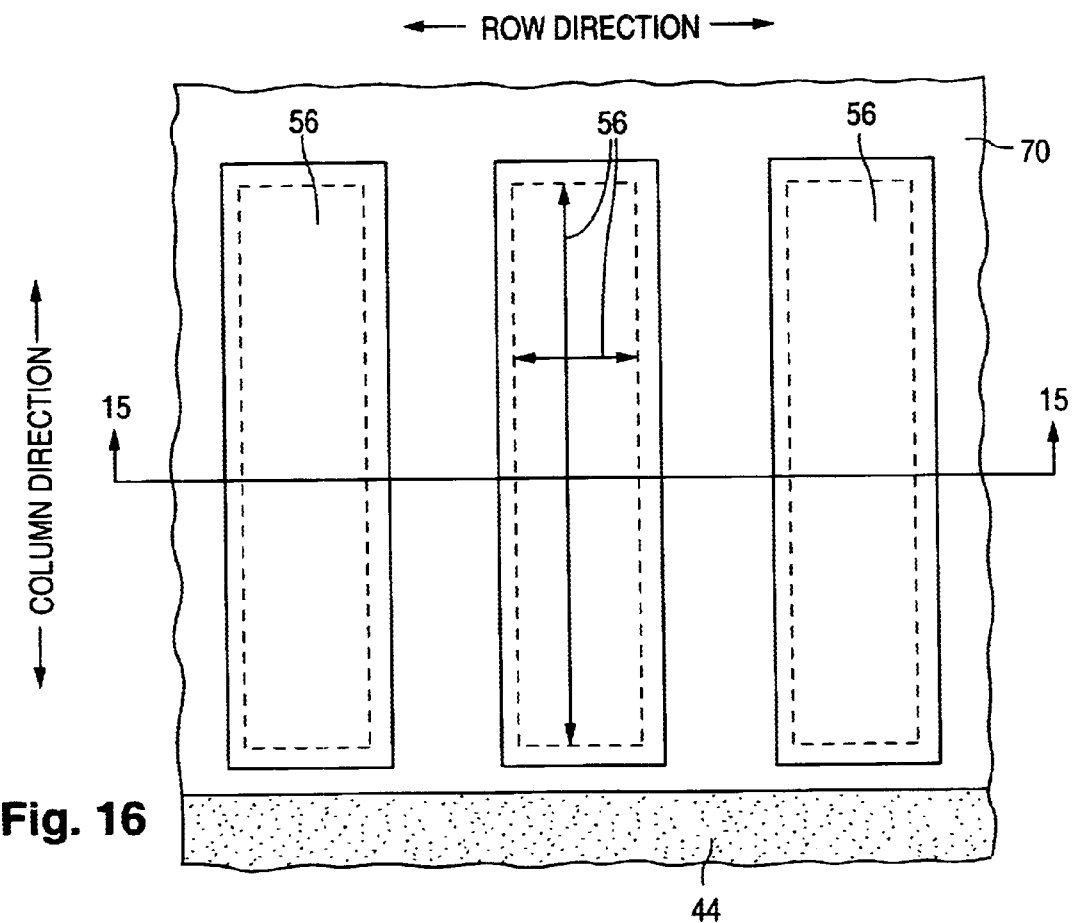
FIG. 16 is a cross-sectional plan view of the part of the active region of the flat-panel display, specifically the light-emitting device, of FIG. 15. The cross section of FIG. 15 is taken along plane 15—15 in FIG. 16. The cross section of FIG. 16 is taken along plane 16—16 in FIG. 15.

FIGS. 15 and 16 illustrate side and plan-view cross sections of part of the active region of a flat-panel CRT display having electron-emitting region 40, again configured as described above, and an oppositely situated light-emitting device 80 configured according to the invention for inhibiting the formation of undesired material along the lower surface of light-reflective material in light-emitting device 80. Devices 40 and 80 are connected together through an outer wall (not shown) to form a sealed enclosure maintained at a high vacuum, again normally an internal pressure of no more than $10^{-6}$ torr. The plan-view cross section of FIG. 16 is taken in the direction of light-emitting device 80 along a plane extending laterally through the sealed enclosure. Consequently, FIG. 16 largely presents a plan view of part of the active portion of device 80. As with the previously mentioned displays of the invention, the display of FIGS. 15 and 16 may include getter material and typically has spacers, item 44 in FIG. 16 indicating the location for a spacer in the form of a spacer wall.

Light-emitting device 80 is formed with faceplate 54 and a group of layers and regions overlying the faceplate's interior surface. The layers/regions consist of light-emissive regions 56, black matrix 58, a passivation undercoat layer 82, and light-reflective layer 70. Passivation undercoat layer 82 lies on light-emissive regions 56 and black matrix 58. Layer 82 typically fully covers regions 56 and matrix 58. Light-reflective layer 70 lies on undercoat layer 82 and typically fully covers layer 82 at least in the active portion of device 80. A parasitic layer (not shown) of oxide of the metal that forms the upper surface of light-reflective layer 70 lies along the upper surface of layer 70.

Figure 17:
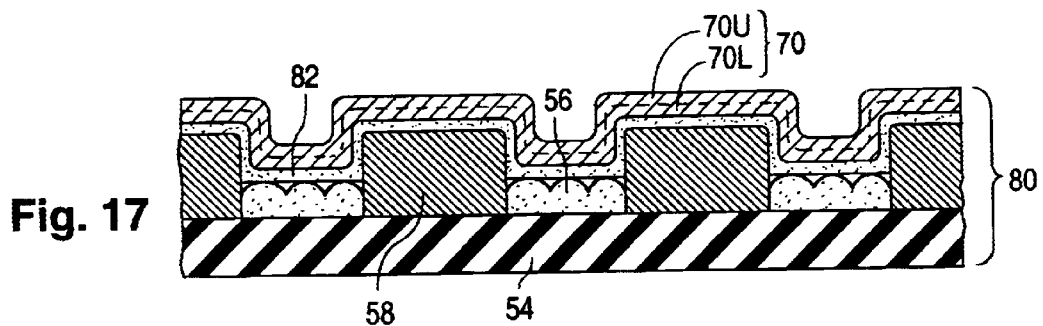
FIGS. 17–20 are cross-sectional side views of parts of the active portions of three light-emitting devices configured according to the invention and substitutable for the light-emitting device of FIGS. 15 and 16.

Aside from the presence of undercoat layer 82, components 54, 56, 58, and 70 in light-emitting device 80 are configured and constituted the same, and function the same, as in light-emitting device 68 of the display of FIGS. 9 and 10. The lower (inside) surface of light-reflective layer 70 is thus typically formed with aluminum but can be formed with one or more of lithium, beryllium, boron, sodium, and magnesium, possibly in combination with aluminum, for reducing electron energy loss or/and with one or more of chromium, manganese, cobalt, copper, molybdenum, palladium, silver, platinum, and lead, again possibly in combination with aluminum, for providing a gettering function to sorb contaminant gases, especially sulfur. As in the displays of FIGS. 3, 4, 9, and 10, black matrix 58 is thinner than light-emissive regions 56 in the display of FIGS. 15 and 16. Similar to the variations depicted in FIGS. 5 and 11, FIG. 17 depicts a variation of light-emitting device 80 in which matrix 58 is thicker than regions 56.

Undercoat layer 82 is general transmissive of visible light, i.e., transparent. Some of the rear-directed light emitted by light-emissive regions 56 passes through layer 82, is reflected forward off light-reflective layer 70 generally along its lower surface, passes through layer 82 again, and then passes through regions 56 and faceplate 54 to enhance the display's image. Although layer 82 is depicted as a blanket layer in FIG. 15, layer 82 is normally perforated by microscopic pores situated at substantially random locations. Since light-reflective layer 70 is perforated in a similar manner, microscopic openings extend through the combination of layers 82 and 70 at substantially random locations. Undercoat layer 82 is generally flat above each region 56, thereby enabling light-reflective layer 70 to be generally flat above each region 56.

A reference point for undercoat layer 82 is an imaginary native layer of aluminum oxide formed along an imaginary aluminum layer. In accordance with the invention's teaching, layer 82 more strongly inhibits light-reflective layer 70 from undergoing chemical reactions, especially with oxygen, along where layer 70 is closest to layer 82, i.e., along the lower surface of layer 70, than does the imaginary native aluminum oxide coating inhibit the imaginary aluminum layer from undergoing chemical reactions, especially with oxygen, along the interface between the native oxide coating and the aluminum layer. In essence, undercoat layer 82 passivates the lower surface of light-reflective layer 70 so that the lower surface of layer 70 is less chemically reactive than what would arise if the lower surface of layer 70 consisted of aluminum covered with a native aluminum oxide layer.

By utilizing undercoat layer 82 to effectively reduce the chemical reactivity along the lower surface of light-reflective layer 70, the metal that forms the lower surface of layer 70 is less likely to form compounds with other materials, especially compounds that can damage the light-reflecting capability of layer 70. For instance, the formation of light-emissive regions 56 and layer 70 typically includes, as discussed further below, removing (a) the binder material in the slurry used to create regions 56 and (b) the lacquer that enables layer 70 to be generally flat above regions 56. Although the binder and lacquer largely decompose into gases that escape from light-emitting device 80, the binder and lacquer typically include some material which remains as residue in device 80.

Some of the residue of the binder and lacquer can move upward to the lower surface of light-reflective layer 70 and form compounds with the metal that forms the lower surface of layer 70, especially during the subsequent elevated-temperature heating step employed to remove at least the lacquer and also often the binder. Some of the compounds so formed along the lower surface of layer 70 can be opaque, i.e., strongly absorptive of visible light. Inasmuch as the rear-directed light emitted by regions 56 is reflected forward generally along the lower surface of layer 70, the presence of opaque compounds along the lower surface of layer 70 effectively degrades its light-reflective capability.

Compared to what would happen if a native coating of aluminum oxide were present along the lower surface of light-reflective layer 70, undercoat layer 82 more strongly inhibits such opaque compounds from forming along the lower surface of layer 70. The increased resistance that layer 82 provides to the formation of such opaque compounds along the lower surface of layer 70 occurs, at least in part, because layer 82 more effectively blocks residue of the binder and lacquer from moving upward to reach the lower surface of layer 70. Undercoat layer 82 thereby lessens the loss in light-reflective capability caused by these opaque compounds. In effect, layer 82 improves the light-reflecting capability of layer 70.

Also, oxygen may reach the lower surface of light-reflective layer 70 during display fabrication or/and display operation. The oxygen may originate from the binder or/and the lacquer. The oxygen may also originate from the phosphor material in light-emissive regions 56, e.g., when they consist of metal oxide phosphors, including metal oxysulfide phosphors. Because undercoat layer 82 effectively reduces the chemical reactivity along the lower surface of layer 70, especially with oxygen, the metal that forms the lower surface of layer 70 is less likely to react with oxygen to form metal oxide that can change the characteristics along the lower surface of layer 70. Undercoat layer 82 thus stabilizes the lower surface of layer 70 against exposure to oxygen subsequent to the formation of layer 70. The characteristics of light-emitting device 80 are more stable with time. This facilitates display manufacture and makes display performance more consistent.

Consider the typical situation in which the lower surface of light-reflective layer 70 is formed, at least partly, with aluminum. Undercoat layer 82 then significantly inhibits the formation of undesired aluminum oxide along the lower surface of layer 70 due to the penetration of oxygen to the lower surface of layer 70 subsequent to its formation. This includes significantly inhibiting the formation of additional aluminum oxide along the lower surface of layer 70 in the implementation, described further below, where undercoat layer 82 is formed with aluminum oxide of greater thickness than the imaginary native aluminum oxide coating.

No aluminum may be utilized in forming the lower surface of light-reflective layer 70. For example, layer 70 may be an implementation of light-reflective layer 60 in which the lower surface of layer 70 is formed with one or more of the non-aluminum metals lithium, beryllium, boron, sodium, and magnesium for reducing electron energy loss through layer 70. Alternatively, the lower surface of layer 70 may be formed with one or more of chromium, manganese, cobalt, copper, molybdenum, palladium, silver, platinum, and lead for sorbing contaminants, particularly sulfur. In either case, undercoat layer 82 significantly inhibits undesired oxide of the non-aluminum metal which forms the lower surface of layer 70 from being created along the lower surface of layer 70 as a result of oxygen penetration to the lower surface of layer 70 subsequent to its formation.

Electrons that strike light-emissive regions 56 to produce light emission after having been emitted by regions 48 in electron-emitting device 40 must pass through both light-reflective layer 70 and undercoat layer 82. Accordingly, the presence of layer 82 causes the electrons to lose some energy before they strike regions 56. To keep the electron energy loss low, layer 82 is preferably made as thin as can feasibly be done without significantly impairing the ability of layer 82 to provide its passivation function. Layer 82 normally has a thickness of 2–10 nm, typically 3 nm, dependent on the composition of layer 82. With the thickness of light-reflective layer 70 again normally being 30–200 nm, typically 70–100 nm, undercoat layer 82 is considerably thinner than light-reflective layer 70.

Undercoat layer 82 consists of material which, at least at the thickness of layer 82, is transparent. The transparent electrical insulators silicon nitride, aluminum nitride, and chromium oxide are especially attractive for layer 82. In a preferred embodiment, largely all of layer 82 is chromium oxide. Magnesium oxide, zirconium oxide, indium oxide, indium tin oxide, and tin oxide, all of which are transparent metal oxides, are also suitable for layer 82. Silicon oxide, a transparent semiconductor oxide, is likewise suitable for layer 82. Two or more of the preceding materials may be present in layer 82 in the form of an alloy or mixture of the materials or as two or more sublayers. Layer 82 may also include, or consist largely of, one or more transparent metal or/and semiconductor oxides besides the previously mentioned ones.

When undercoat layer 82 consists of one or more of the metal or/and semiconductor oxides identified above, layer 82 inhibits oxygen present below layer 82 from reaching the lower surface of light-reflective layer 70 and causing damage. Forming layer 82 with aluminum oxide of greater thickness than the imaginary native aluminum oxide coating yields a similar benefit. With the thickness of the imaginary native aluminum oxide coating being 1–5 nm the thickness of layer 82 is normally at least 10 nm and up to 30 nm or more when it consists largely of aluminum oxide.

Figure 18:
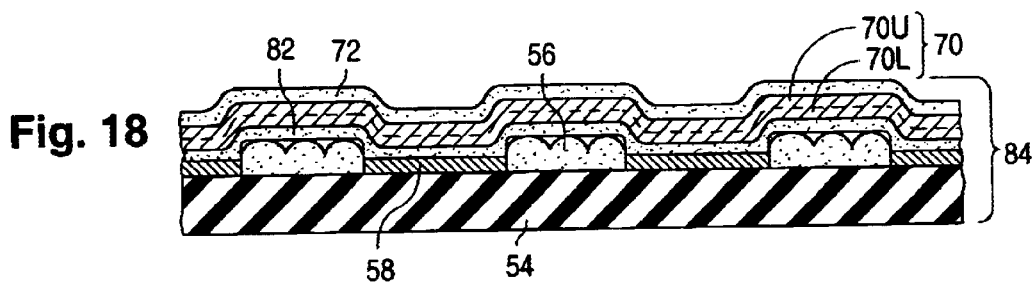
Figure 19:
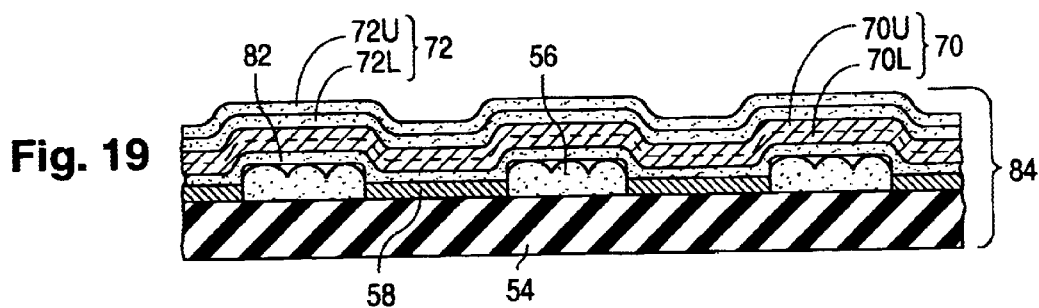
Figure 20:
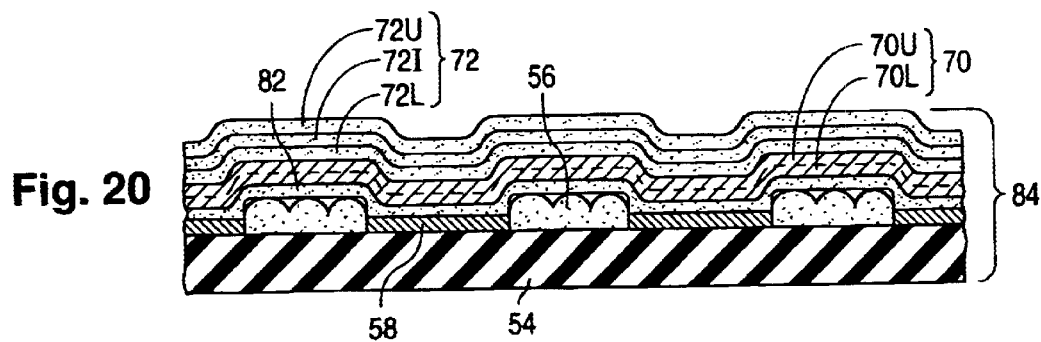

A flat-panel CRT display configured according to the invention may include both undercoat layer 82 and overcoat layer 72. FIGS. 18–20 illustrate variations of a light-emitting device 84 provided with layers 72 and 82. Aside from the presence of overcoat layer 72, each light-emitting device 84 is the same as light-emitting device 80 in FIGS. 15 and 16. FIG. 18 presents the general case in which overcoat layer 72 can be configured and constituted in various ways. Relative to FIGS. 19 and 20, FIG. 18 is specifically directed to the situation in which layer 72 consists substantially of only a single material or an alloy or mixture of two or more materials. FIG. 19 illustrates the situation in which layer 72 consists of lower layer 72L and upper layer 72U. FIG. 20 depicts the situation in which layer 72 consists of lower layer 72L, intermediate layer 72I, and upper layer 72U.

Figure 21:
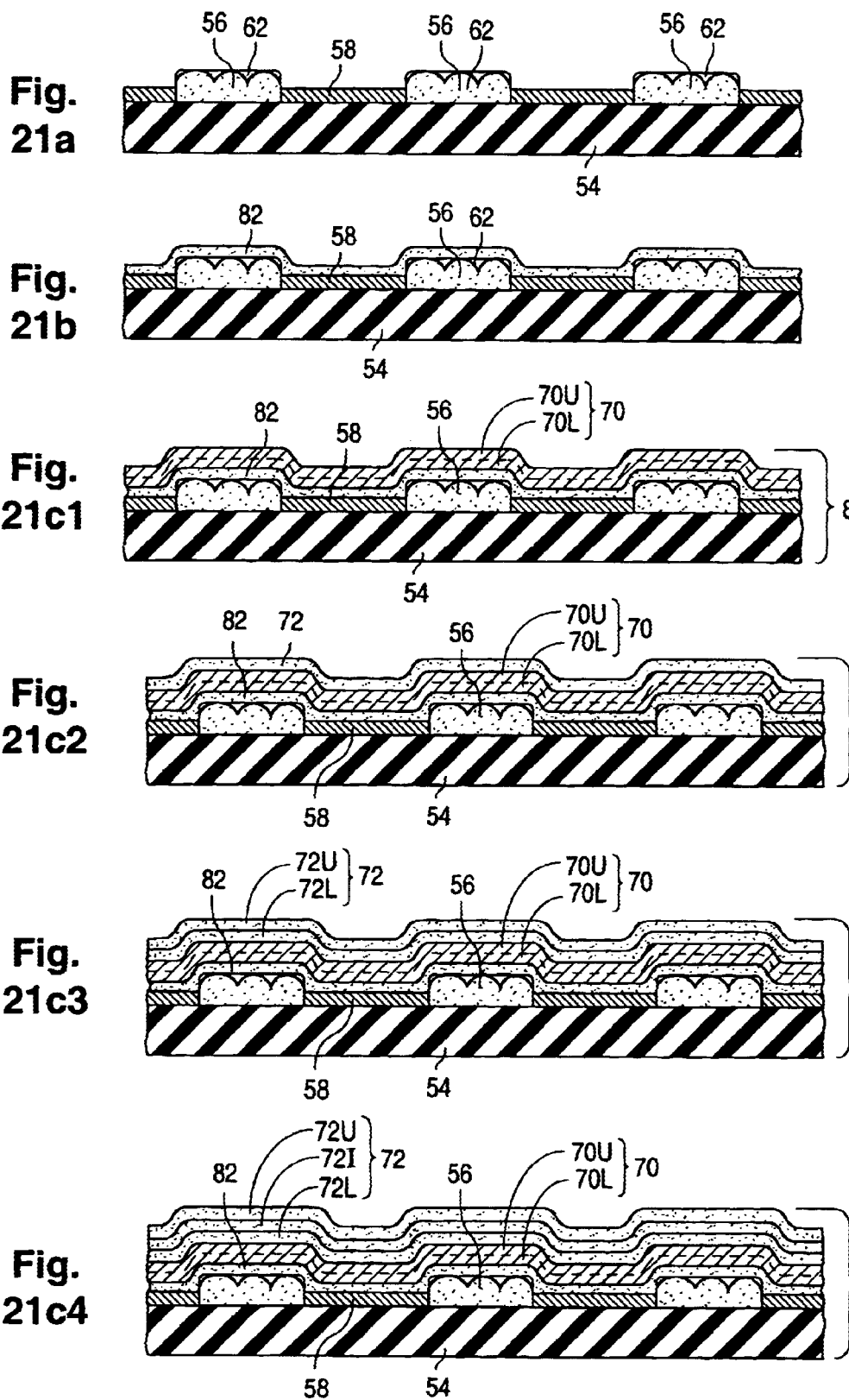

FIGS. 21*a*, 21*b*, and 21*c*1–21*c*4 (collectively "FIG. 21") illustrate a general process for manufacturing light-emitting device 80 of FIGS. 15 and 16 in accordance with the invention and variations for producing light-emitting device 84 of each of FIGS. 18–20 in accordance with the invention. The process of FIG. 21 starts largely at the stage of FIG. 8*c* of the process of FIG. 8. See FIG. 21*a* which largely repeats FIG. 8*c*.

At the stage of FIG. 21*a*, regions 62 are situated on faceplate 54 in the black-matrix openings. Each region 62 consists at least of phosphor and an intermediate layer of generally solid material, normally dried lacquer, which can readily be converted to gas and which provides that region 62 with a generally flat upper surface. Depending on how the lacquer is provided over the structure during the formation of regions 62, the intermediate lacquer layers of regions 62 may be interconnected by further dried lacquer (not shown) situated on top of black matrix 58. Regions 62 may also include the cured binder for the phosphor material. Optionally, prior to deposition and drying of the lacquer, the binder material can be removed by appropriately heating the structure, typically in air. When this optional step is performed, the binder thermally decomposes into gases that leave the structure. The subsequent lacquer deposition and drying then results in regions 62 consisting largely of phosphor and lacquer.

The structure of FIG. 21a is placed in a high-vacuum deposition chamber. Undercoat layer 82 is deposited on top of regions 62 and black matrix 58 as depicted in FIG. 21b. The deposition of layer 82 is done at a high vacuum, normally a pressure of $10^{-6}$ torr or less. Various high-vacuum deposition techniques such as evaporation, sputtering, and thermal spraying can be utilized to deposit layer 82.

Without removing the partially fabricated light-emitting device from the vacuum chamber used for depositing undercoat layer 82, light-reflective layer 70 is deposited on undercoat layer 82. See FIG. 21c1. The deposition of light-reflective layer 70 is performed under high-vacuum conditions according to any of the techniques mentioned above. Importantly, the high vacuum is maintained on the partially fabricated light-emitting device during the time period between the deposition of undercoat layer 82 and the deposition of light-reflective layer 70. Consequently, the upper surface of undercoat layer 82 is largely not subjected to oxygen which might cause undesired oxide to be produced between layers 70 and 82.

If the light-emitting device under fabrication is intended to be light-emitting device 80 and thus is not intended to have overcoat layer 72, the structure of FIG. 21b is removed from the deposition chamber and exposed to air. Due to oxygen in the air, a parasitic layer (not shown) of oxide of the metal that forms the upper surface of light-reflective layer 70 grows along the upper surface of layer 70. The structure is subsequently heated to remove the dried lacquer and, when present, the cured binder in regions 62. The lacquer, including any lacquer situated on top of black matrix 58, thermally decomposes into gases that escape through pores in layers 82 and 70. The same occurs with the binder when it is present. The remaining portions of regions 62 are light-emissive regions 56.

The heating operation for removing the lacquer and, when present, the binder is normally done in air according to a thermal profile that reaches a maximum temperature of 300–480° C., typically 400° C., i.e., in generally the same way that the lacquer and binder are removed in the process of FIG. 8. Because undercoat layer 82 is present along the lower surface of light-reflective layer 70, very little oxide, e.g., aluminum oxide when layer 70 consists of aluminum, grows along the lower surface of layer 70 during the heating operation. Except for the unshown parasitic metal oxide layer along the upper surface of layer 70, the resultant structure appears as shown in FIG. 21c1. The structure of FIG. 21c1 constitutes light-emitting device 80.

Various process sequences can be utilized after the formation of undercoat 82 and light-reflective layer 70 when the light-emitting device is intended to be device 84 having overcoat layer 72. For instance, starting from the structure of FIG. 21c1 in which a parasitic metal oxide layer (again, not shown) lies along the upper surface of light-reflective layer 70 and in which the lacquer and, when present, the binder have been removed, overcoat layer 72 can be deposited on the parasitic oxide layer above layer 70. See FIGS. 21c2–21c4. The deposition of layer 72 is performed in an appropriate chamber at low pressure according to any of the techniques utilized for depositing layer 72 in the process of FIG. 14. The resultant structure is removed from the deposition chamber.

Alternatively, without removing the partially fabricated light-emitting device from the vacuum chamber employed for depositing undercoat layer 82 and light-reflective layer 70, a heating operation is performed under high-vacuum conditions to thermally decompose the lacquer and, when present, the binder into gases that escape through pores in layers 82 and 70. With the structure still situated in the vacuum chamber, overcoat layer 72 is deposited on light-reflective layer 70 according to any of the high-vacuum techniques employed here for depositing layer 70. Again see FIGS. 21c2–21c4. The high vacuum is maintained on the structure during the time period extending from the deposition of undercoat layer 82 through the deposition of overcoat layer 72.

The structure created according to the preceding alternative is subsequently removed from the vacuum chamber and exposed to air. Because the structure was not exposed to air during the time period between the deposition of light-reflective layer 70 and the deposition of overcoat layer 72, largely no oxide grows along the upper surface of layer 70 during that time period. If overcoat layer 72 is largely impervious to oxygen penetration, largely no oxide grows along the upper surface of light-reflective layer 70 when the structure is exposed to air, and thus to oxygen, subsequent to forming overcoat layer 72.

A further alternative entails depositing overcoat layer 72 on light-reflective layer 70 without removing the partially fabricated light-emitting device from the vacuum chamber employed for depositing layers 82 and 70. Once again, see FIGS. 21c2–21c4. The deposition of overcoat layer 72 is performed according to any of the high-vacuum techniques utilized here for depositing light-reflective layer 70. A high vacuum is maintained on the structure during the time period extending from the deposition of undercoat layer 82 through the deposition of overcoat layer 72. The structure is subsequently removed from the vacuum chamber and exposed to air. Due to oxygen in the air, a parasitic layer (not shown) of oxide of the metal that forms the upper surface of light-reflective layer 70 grows along the upper surface of layer 70. With overcoat layer 72 being perforated, a heating operation is performed on the structure in air to thermally decompose the lacquer and, when present, the cured binder into gases that escape through the pores in layers 82, 70, and 72.

In at least the first and third process sequences described above for providing the light-emitting device with overcoat layer 72, a parasitic oxide layer lies along the upper surface of light-reflective layer 70. However, substantially no undesired oxide lies along the lower surface of layer 70. The presence of undercoat layer 82 strongly inhibits any undesired oxide from growing along the lower surface of layer 70. Except for the unshown parasitic oxide layer along the upper surface of layer 72 the structure produced according to each of the three process sequences is depicted in FIGS. 21c2–21c4 depending on whether overcoat layer 72 is essentially a single layer (FIG. 21c2), consists of upper layer 72U and lower layer 72L (FIG. 21c3), or consists of upper layer 72U, intermediate layer 72I, and lower layer 72L (FIG. 21c4). The structures of FIGS. 21c2–21c4 respectively are light-emitting devices 84 of FIGS. 18–20.

Undercoating Getter Layer

Figure 22:
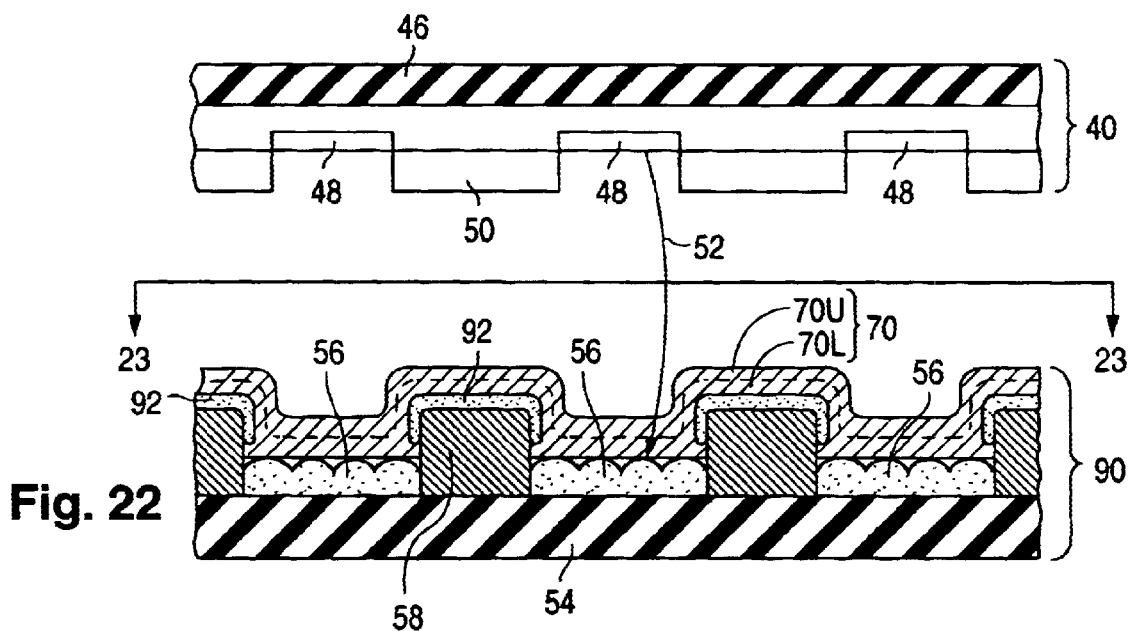
FIG. 22 is a cross-sectional side view of part of the active region of yet another flat-panel CRT display having a light-emitting device configured according to the invention.
Figure 23:
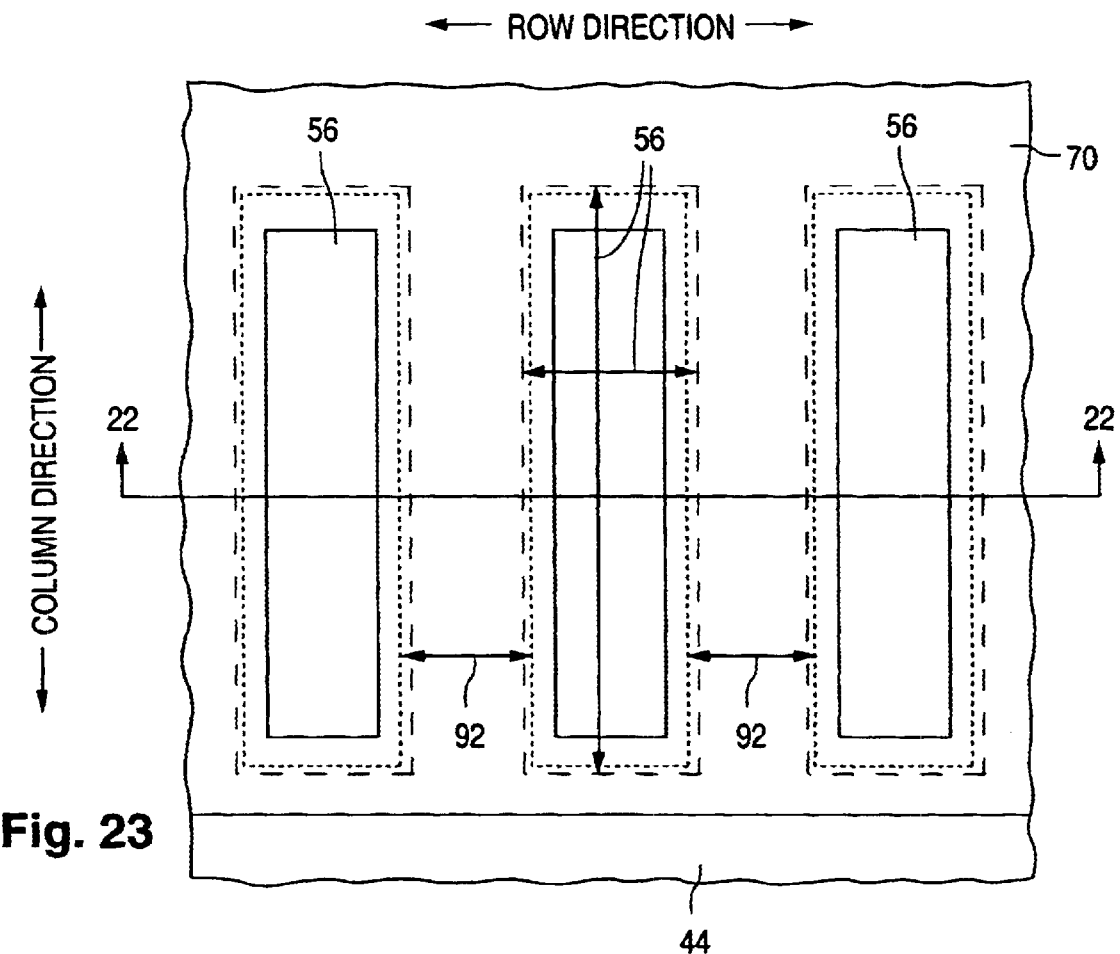
FIG. 23 is cross-sectional plan view of the part of the active region of the flat-panel display, specifically the light-emitting device, of FIG. 22. The cross section of FIG. 22 is taken along plane 22—22 in FIG. 23. The cross section of FIG. 23 is taken along plane 23—23 in FIG. 22.

FIGS. 22 and 23 depict side and plan-view cross sections of part of the active region of a flat-panel CRT display having electron-emitting device 40, once again configured as described above, and an oppositely situated light-emitting device 90 configured according to the invention for providing a getter function to sorb contaminant gases, especially sulfur. Device 40 and 90 are connected together through an outer wall (not shown) to form a sealed enclosure maintained at a high vacuum, again normally an internal pressure of no more than $10^{-6}$ torr. The plan-view cross section of FIG. 23 is taken in the direction of light-emitting device 90 along a plane extending laterally through the sealed enclosure. Hence, FIG. 23 presents a plan view of part of the active portion of device 90. Similar to the previously described displays of the invention, the display of FIGS. 22 and 23 typically has internal spacers. Item 44 in FIG. 23 indicates the location for a spacer implemented as a spacer wall.

Light-emitting device 90 is formed with faceplate 54 and a group of layers and regions overlying the faceplate's interior surface. The layer/regions consist of light-emissive regions 56, black matrix 58, a patterned undercoating getter layer 92, and light-reflective layer 70. As in light-emitting device 42 of FIG. 5, matrix 58 here is thicker than regions 56 and thus extends further away from faceplate 54 than do regions 56. Each region 56 is situated fully in a black-matrix opening. Alternatively, regions 56 can extend further away from faceplate 54 than does matrix 58 as occurs in light-emitting device 42 of FIGS. 3 and 4.

Undercoating getter layer 92 lies on black matrix 58. More particularly, getter layer 92 in FIGS. 22 and 23 lies on top of matrix 58, extends at least partway down its sidewalls into the black-matrix openings where light-emissive regions 56 are situated, but does not extend more than partway across light-emissive regions 56. In the example of FIGS. 22 and 23, layer 92 does extend significantly over regions 56. Layer 92 typically extends only partway down the portions of the sidewalls of matrix 68 above regions 56 and thus only partway to regions 56 in the black matrix openings. Light-reflective layer 70 lies over regions 56 and layer 92. Aside from the presence of layer 92, components 54, 56, and 58 are configured and constituted the same, and function the same, as in device 42 of FIG. 5.

Undercoating getter layer 92 sorbs contaminant gases, especially sulfur. For this purpose, layer 92 consists largely of one or more of the metals magnesium, chromium, manganese, cobalt, nickel, copper, palladium, silver, platinum, and lead. Alternatively or additionally, layer 92 may contain oxide of one or more of the metals magnesium, chromium, manganese, cobalt, nickel, and lead.

When two or more of the preceding sixteen getter materials are present in undercoating getter layer 92, the two or more materials are typically mixed together to form an alloy or mixture. Alternatively, the two or more getter materials can be variously distributed across multiple sublayers of layer 92. Each undercoating getter sublayer contains one or more of the sixteen materials. The thickness of layer 92 is 2 nm–10 $\mu$m, typically 2 $\mu$m, depending on the specific material(s) chosen to implement layer 92.

In cases where undercoating getter layer 92 contains two or more of the preceding sixteen getter materials, the materials are normally mixed together to form an alloy in which all the materials are distributed across layer 92. The alloy preferably consists of oxide of two or more of the metals magnesium, chromium, manganese, cobalt, nickel, and lead for achieving better gettering, especially sulfur gettering, than is typically individually achievable with each of the corresponding component metal oxides. Layer 92 consists largely of an alloy of oxide of chromium and magnesium in one multi-metal alloy implementation. As with the usage of magnesium-chromium oxide to implement overcoating getter layer 82, the chromium oxide in layer 92 normally constitutes 5–95 at. % of the magnesium-chromium oxide in the alloy.

The alloy that implements undercoating getter layer 92 may alternatively consist of two or more of the metals magnesium, chromium, manganese, cobalt, nickel, and lead.

As with light reflective getter layer 60 and overcoating getter layer 72, layer 92 consists largely of an alloy of magnesium and chromium in one specific alloy implementation. The chromium again normally constitutes 5–95 at. % of the magnesium and chromium in the alloy.

Similar to what was said above about light-reflective layer 70 when overcoat layer 72 functions as a getter in light-emitting device 68, light-reflective layer 70 in light-emitting device 90 normally does not function as a getter for sorbing the same contaminant gases as overcoat layer 92. At the minimum, layers 70 and 92 are differently constituted. Light-reflective layer 70 may consist largely of aluminum in device 90. Alternatively, layer 70 in device 90 may be formed largely with one or more of lithium, beryllium, boron, sodium, and magnesium, preferably one or more of beryllium, boron, and magnesium, often in combination with aluminum, for reducing the electron energy loss provided that layer 92 either does not contain magnesium or contains magnesium at a significantly different atomic percentage than layer 70. Aside from this and the presence of getter layer 92, layer 70 is configured the same, and functions the same, as in light-emitting device 68 of FIG. 11.

Undercoating getter layer 92 is close to light-emissive regions 56. As a result, sulfur outgassed by regions 56 due, for example, to being struck by electrons emitted by regions 48 in electron-emitting device 48 can readily reach layer 92 and be sorbed by it before the outgassed sulfur leaves the immediate vicinity of regions 56 and causes damage at other locations in the display. The same applies to other contaminants released by regions 56 and readily sorbable by layer 92.

Getter layer 92 is very close to black matrix 58 and, importantly, is located between matrix 58 and the interior of the flat-panel display. Insofar as the getter material of layer 92 is suitable for sorbing contaminants released by matrix 58, layer 92 is very well positioned to sorb these contaminants and thereby to prevent them from causing contaminant damage elsewhere in the display.

Light-emitting device 90 can be modified in various ways. For instance, getter layer 92 can be converted into a blanket layer that extends over light-emissive regions 56 below light-reflective layer 70. In that case, layer 92 is either largely transparent or functions as a reflector in combination with layer 70 for reflecting forward some of the rear-directed light emitted by regions 56. By arranging for getter layer 92 to extend over regions 56, layer 92 lies between regions 56 and the display's interior and is thus very well positioned to sorb contaminant gases, such as sulfur, released by regions 56. Although some additional electron energy loss occurs because electrons emitted by regions 48 must pass through layer 90 before the electrons strike regions 56, the improved gas-sorption position of layer 90 compensates for the additional electron energy loss.

Light-emitting device 90 can be modified to include overcoat layer 72 or/and undercoat layer 82. In a modification that includes undercoat layer 82, undercoating getter layer 92 is preferably situated between undercoat layer 82, on one hand, and light-emissive regions 56, on the other hand.

Figure 24A:
FIGS. 24a–24e are cross-sectional side view representing steps in fabricating the light-emitting device of FIGS. 22 and 23 according to the invention.
Figure 24B:
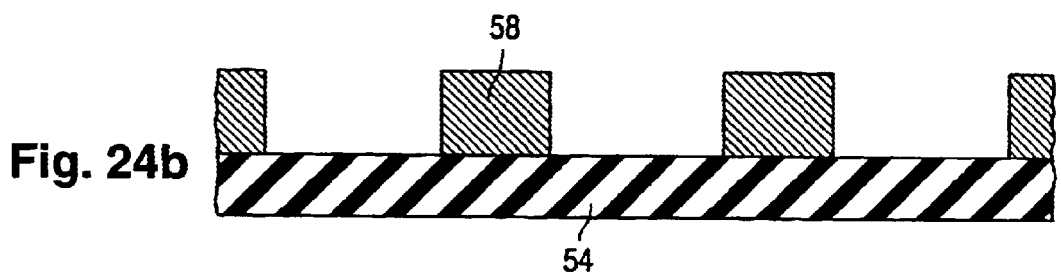
Figure 24C:
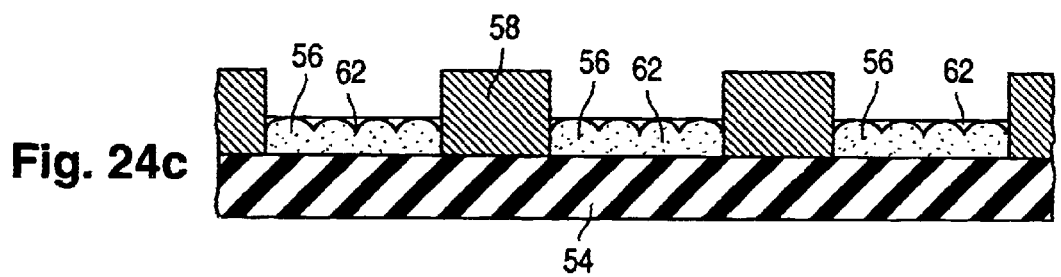
Figure 24D:
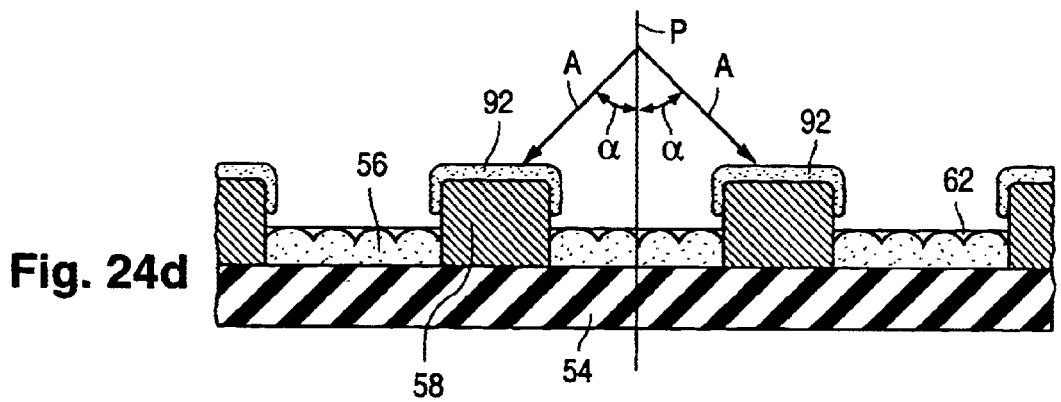

FIGS. 24a–24e (collectively "FIG. 24") illustrate a process for manufacturing light-emitting device 90 of FIGS. 22 and 23 in accordance with the invention. The starting point for the process of FIG. 24 is faceplate 54. See FIG. 24a. Black matrix 58 is formed on faceplate 54 as indicated in FIG. 24b. Subject to being taller than later-formed light-emissive regions 56, matrix 58 can be created according to any of the techniques utilized for creating matrix 58 in the process of FIG. 8. Referring to FIG. 24c, regions 62 consisting of phosphor, cured binder, and dried lacquer are formed in the black-matrix openings, typically according to the procedure employed for creating regions 62 in the process of FIG. 8. Depending on how lacquer is deposited over the structure, the lacquer of regions 62 may again be interconnected by further lacquer (not shown) situated on top of matrix 58.

Undercoating getter layer 92 is formed by depositing the desired getter material on black matrix 58 in such a way that the getter material accumulates on top of matrix 58 and at least partway down its sidewalls but does not accumulate on regions 62. The deposition of layer 92 is preferably done according to an angled physical deposition technique such as angled evaporation, angled sputtering, or angled thermal spraying. The getter material is provided from a deposition source which can be translated relative to the plate structure formed with faceplate 54 and matrix 58. The plate structure and deposition source are situated in a high vacuum environment where the pressure is normally $10^{-6}$ torr or lower.

Particles, each consisting of one or more atoms of the getter material, impinge on black matrix 68 at an average tilt angle $\alpha$ to a line extending perpendicular to (the upper surface of) faceplate 54 during the angled physical deposition. Item P in FIG. 24d indicates such a line. The getter particles thus follow paths which, on the average, instantaneously extend roughly parallel to a principal impingement axis which is at tilt angle $\alpha$ to line P. To obtain relatively uniform deposition, the plate structure and deposition source are arranged to be at different rotational (azimuthal) positions relative to each other during the deposition. The principal impingement axis is thus rotated about line P. Arrows A in FIG. 24d indicate the principal impingement axis at two different rotational positions.

The angled deposition can be done for a group of significant time periods during each of which the plate structure and deposition source are at a largely fixed rotational position relative to each other. Alternatively, the plate structure and deposition source are continuously rotated relative to each other during the deposition. The rotational speed is normally approximately constant but can be variable. The deposition is performed for at least one full rotation. Tilt angle $\alpha$ and the constituency of the getter source can be changed during the deposition.

The value of tilt angle $\alpha$ is chosen to be sufficiently large that black matrix 58 functions as a shield (or shadow) to prevent the getter material from accumulating on regions 58. Angle $\alpha$ is normally 5–45°, typically 15°, depending on the lateral size of the black-matrix openings, and on how far matrix 58 extends above light-emissive regions 56. By carefully choosing the value of angle $\alpha$, it may sometimes be possible to have getter layer 92 nearly touch regions 62 without having any of the getter material accumulate on regions 62. If a small amount of the getter material accumulates on regions 62, a cleaning operation can be performed to remove that getter material without significantly reducing the thickness of layer 92.

Light-reflective layer 70 is deposited on getter layer 92 and regions 62. See FIG. 24e. The deposition of layer 70 is performed at a high vacuum, normally a pressure of $10^{-6}$ torr or less, according to technique such as evaporation, sputtering, or thermal spraying. The high vacuum may be maintained on the partially fabricated light-emitting device for the time period extending from the deposition of layer 92 through the deposition of layer 70 so as to largely avoid producing any metal oxide between layers 92 and 70 during that time period.

Figure 24E:
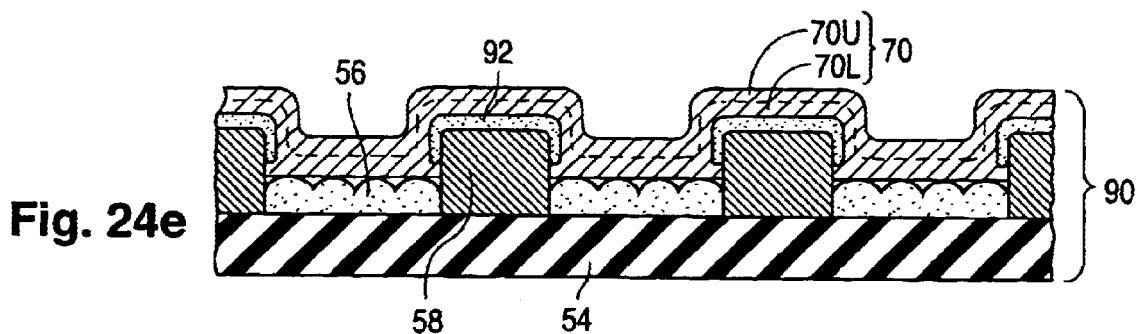

A heating operation in air is subsequently performed on a partially fabricated light-emitting device to remove the binder and lacquer in regions 62, including any lacquer overlying black matrix 58. The binder and lacquer thermally decompose into gases which escape through the pores in light-reflective layer 70. Due to oxygen in the air, parasitic layers (not shown) of oxide of the metal or metals that form the upper and lower surfaces of layer 70 grow along its upper and lower surfaces. Except for these parasitic oxide layers, the resultant structure appears as shown in FIG. 24e. The structure of FIG. 24e is light-emitting device 90 of FIGS. 22 and 23.

Further Variations and Global Considerations

Figure 25:
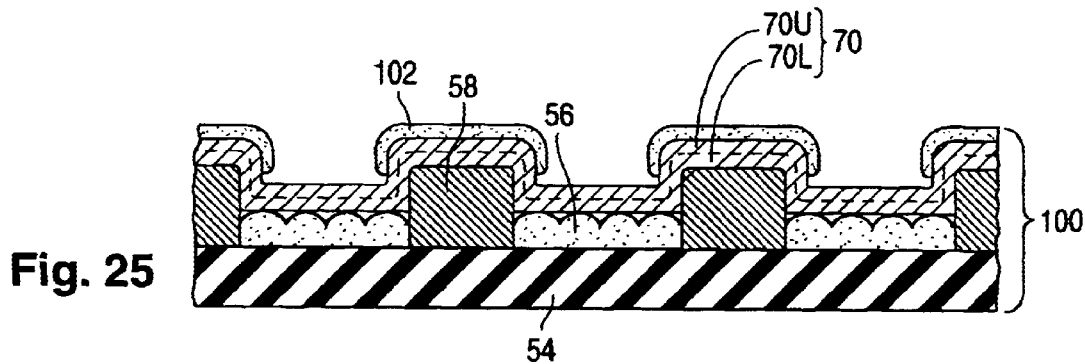
FIGS. 25–27 are cross-section side views of parts of the active portions of variations of the light-emitting device of FIG. 11 according to the invention.
Figure 26:
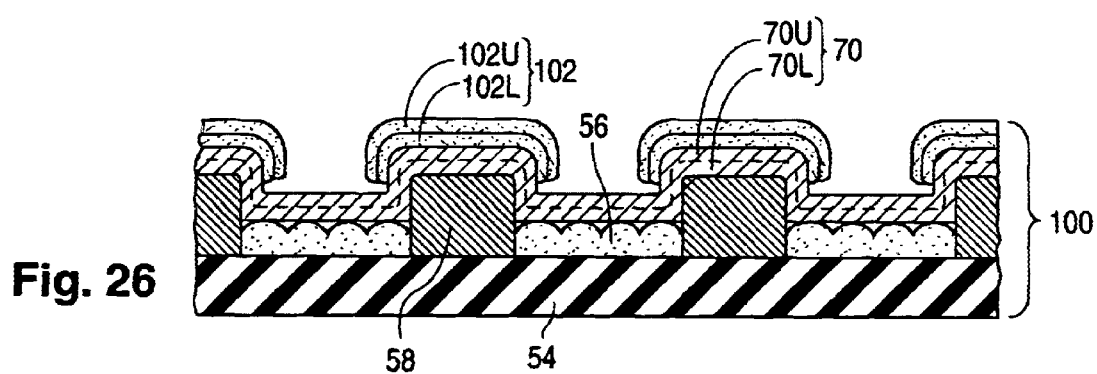
Figure 27:
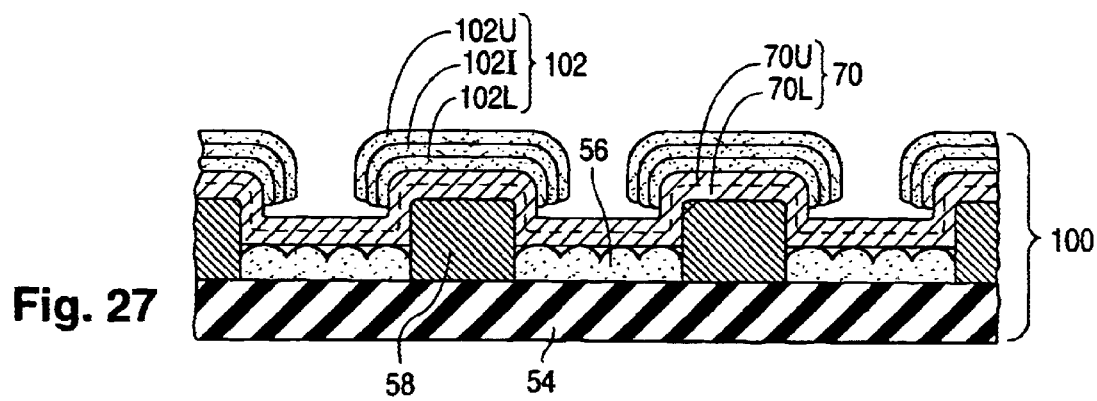

Overcoat layer 72 in light-emitting devices 68 of FIGS. 9–13 can be replaced with an overcoat layer patterned similarly to undercoating getter layer 92 in light-emitting device 90, especially when black matrix 58 is taller than light-emissive regions 56. FIGS. 25–27 depict three examples of a light-emitting device 100 configured according to the invention to include a patterned overcoat layer 102 that replaces layer 72 of device 68. Aside from this difference, device 100 contains components 54, 56, and 58 configured and constituted the same, and functioning the same, as in device 68 of FIG. 11. Hence, black matrix 58 in device 100 extends further away from faceplate 54 than do light-emissive regions 56. Each region 56 is situated fully in a black-matrix opening.

Light-reflective layer 70 in light-emitting device 100 is configured the same, and functions the same, as in light-emitting device 68 of FIG. 11. For exemplary purposes, FIGS. 25–27 illustrate layer 70 as consisting of upper sublayer 70U and lower sublayer 70L. Device 100 in each of FIGS. 25–27 can be substituted for device 68 in the flat-panel display of FIGS. 9 and 10.

Overcoat layer 102 lies on the portion on light-reflective layer 70 located above the top of black matrix 58 and extends at least partway down the portions of layer 70 situated over the sidewalls of matrix 58. Overcoat layer 102 covers no more than part of each light-emissive region 56. In the examples of FIGS. 25–27, layer 102 does not extend significantly over the portions of layer 70 covering regions 56. Layer 102 typically extends only partway down the portions of layer 70 along the sidewalls of matrix 58 and thus only partway to the portions of layer 70 covering regions 56 in the black-matrix openings. Matrix 58 can be shorter than regions 56. In that case, layer 102 is situated on the portion of light-reflective layer 70 above the top of matrix 58, extends at least partway up the portions of layer 70 situated over the sidewalls of regions 56, and does not extend more than partway, normally not significantly, over the portions of layer 70 covering regions 56.

Aside from the patterning difference, patterned overcoat layer 102 consists of one or more layers analogous to how blanket overcoat layer 72 consists of one or more layers. Hence, each layer of overcoat layer 102 normally consists largely of a single material or of an alloy or mixture of materials. FIG. 25 represents the general situation in which layer 102 consists of one or more layers and is specifically directed to the situation in which layer 102 is a single layer. FIG. 26 presents the two-layer situation in which layer 102 consists of a lower overcoat layer 102L and an upper overcoat layer 102U respectively analogous to lower layer 72L and upper layer 72U in a two-layer implementation of layer 72. FIG. 27 present the three-layer situation in which layer 102 consists of lower overcoat layer 102L, an intermediate overcoat layer 102I, and upper overcoat layer 102U respectively analogous to layers 72L, 72I, and 72U in a three-layer implementation of layer 72.

Patterned upper overcoat layer 102 provides the same function, or functions, as blanket overcoat layer 72. Referring again to an imaginary native aluminum oxide coating formed on an imaginary aluminum layer, overcoat layer 102 provides one or more of (a) lower chemical reactivity than the native coating, (b) lower secondary electron emission per unit area than the native coating, and (c) lower electron backscattering per unit area than the native coating. Overcoat layer 102, upper overcoat layer 102U, intermediate overcoat layer 102I, and lower overcoat layer 102L are variously constituted with the same materials described above for respectively implementing layers 72, 72U, 72I, and 72L to variously achieve these chemical reactivity, secondary electron emission, and electron backscattering properties.

Some of the electrons emitted by regions 48 in electron-emitting device 40 strike light-emitting device 100 to the sides of light-emissive regions 56. Hence, some electrons impinge on light-reflective layer 70 to the sides of regions 56 and, in the absence of patterned upper overcoat layer 102, could raise secondary electron emission/electron backscattering concerns and could also cause contaminant gases to be dislodged from the portions of light-reflective layer overlying black matrix 58. Layer 70 alleviates these concerns when it provides one or more of the preceding chemical reactivity, secondary electron emission, and electron backscattering properties.

Inasmuch as overcoat layer 102 does not fully cover light-reflective layer 70, layer 102 does not provide as much improvement in the chemical reactivity, secondary electron emission and electron backscattering properties as blanket overcoat layer 72. However, electrons emitted by regions 44 do not pass through layer 102 before striking electron-emissive regions 56 in light-emitting device 100 and thereby incur slightly less electron energy loss than in light-emitting device 68 having blanket overcoat layer 72. This compensates for the lesser improvement in the chemical reactivity, secondary electron emission, and electron backscattering properties.

As with blanket overcoat layer 72, patterned overcoat layer 102 can alternatively or additionally provide a getter function for sorbing contaminant gases, especially sulfur. For this purpose, layer 102 contains one or more of the metals magnesium, cobalt, copper, palladium, silver, platinum, and lead. Layer 102 may also contain chromium, especially when electron-emitting device 40 is a field emitter operating according to three-dimensional field emission. Alternatively or additionally, layer 102 contains oxide of one or more of the metals magnesium, chromium, manganese, cobalt, nickel, and lead. Layer 102 can also be implemented as an alloy of two or more of these fourteen getter materials in the same ways as described above for layer 72.

Overcoat layer 102 is relatively close to light-emissive regions 56. Should regions 56 outgas sulfur or similar contaminants, layer 102 is positioned suitably to sorb some of these contaminants before they leave the immediate vicinity of layer 102. To the extent that black matrix 58 outgasses sulfur and similar contaminants, layer 102 is well positioned to sorb these contaminants.

Light-reflective layer 70 in light-emitting device 100 is generally constituted the same as in light-emitting device 68 of FIGS. 9 and 10 when upper overcoat layer 102 provides one or more of the above-mentioned chemical reactivity, secondary electron emission, and electron backscattering characteristics. However, when layer 102 alternatively or additionally functions as a getter for sorbing contaminant gases, especially sulfur, underlying light-reflective layer 70 normally does not function as a getter for sorbing the same contaminant gases. At the minimum, layers 70 and 102 in this case are differently constituted in the same way that layers 70 and 72 are differently constituted when upper overcoat layer 72 provides such a gettering function.

Aside from upper overcoat layer 102, light-emitting device 100 is manufactured according to the invention in generally the way described above for manufacturing light-emitting device 68 subject to creating black matrix 58 to be taller than light-emissive regions 56. Overcoat layer 102 is typically deposited by an angled physical deposition procedure of the type employed to deposit undercoating getter layer 92 in the process of FIG. 24. Hence, the material of layer 102 is deposited on light-reflective layer 70 over black matrix 58 at a non-zero tilt angle to a line extending generally perpendicular to faceplate 54 such that the deposited material accumulates on the portion of layer 70 covering the top of matrix 58 but only partway down the portions of layer 70 covering the sidewalls of matrix 58 and thus only partway down into the black-matrix openings. The tilt angle is sufficiently great that matrix 58 and the overlying portions of layer 70 serve as shields to substantially prevent the material of layer 102 from accumulating on the portions of layer 70 covering regions 56. The angled deposition is employed both in the situation where layer 102 consists of getter material and in the situation where layer 102 provides one or more of the chemical reactivity, secondary electron emission, and electron backscattering properties.

Rather than being a continuous (but perforated) region, black matrix 58 can be implemented as a group of laterally separated black-matrix stripes extending generally in a selected direction, such as the column direction, in some variations of the present light-emitting devices. Light-emissive regions 56 are then situated in the channels between the black matrix stripes. In such a variation of light-emitting device 90 or 100 where the black-matrix stripes extend further away from faceplate 54 than do regions 56, angled physical deposition can still be employed to form patterned undercoating getter layer 92 or patterned overcoat layer 102 provided that the range of rotational orientations of the deposition source to the plate structure formed with faceplate 54 and the overlying material is restricted sufficiently to avoid having the material of layer 92 or 102 accumulate above regions 56. For instance, the angled deposition can be performed at rotational angles of +90° and −90° to the direction of the black matrix stripes.

Black matrix 58 is shorter than light-emissive regions 56 in some implementations of light-emitting device 90 and 100. In such a case, undercoating getter layer 92 or overcoat layer 102 is normally created by a technique other than angled deposition. For example, layer 92 or 102 can be created by a blanket deposition/selective removal procedure using a suitable mask or by a lift-off technique.

Subject to fabricating light-emitting devices 42, 68, 80, 90, and 100 in the manner described above, each of the flat-panel CRT displays of the invention is manufactured generally in the following way. Electron-emitting device 40 is fabricated separately from light-emitting device 42, 68, 80, 84, 90, or 100. Internal supports, such as spacer walls, are mounted on electron-emitting device 40 or on light-emitting device 42, 68, 80, 84, 90, or 100. Electron-emitting device 40 is subsequently sealed to light-emitting device 42, 68, 80, 84, 90, or 100 through the above-mentioned outer wall in such a way that the assembled, sealed display is at a very low internal pressure, typically no more than $10^{-6}$ torr.

Directional terms such as "lateral", "vertical", "above", and "below" have been employed in describing the present invention to establish a frame of reference by which the reader can more easily understand how the various parts of the invention fit together. In actual practice, the components of a flat-panel CRT display may be situated at orientations different from that implied by the directional terms used here. Inasmuch as directional terms are used for convenience to facilitate the description, the invention encompasses implementations in which the orientations differ from those strictly covered by the directional terms employed here. Similarly, the terms "row" and "column" are arbitrary relative to each other and can be reversed.

While the invention has been described with reference to particular embodiments, this description is solely for the purpose of illustration and is not to be construed as limiting the scope of the invention claimed below. Field emission includes the planar phenomenon generally termed surface conduction emission. Various modifications and applications may thus be made by those skilled in the art without departing from the true scope and spirit of the invention as defined in the appended claims.

We claim:

1. A structure comprising:
   a plate;
   a light-emissive region overlying the plate where the plate is generally transmissive of visible light;
   a light-blocking region overlying the plate generally lateral to the light-emissive region, the light-blocking region being generally non-transmissive of visible light; and
   a light-reflective layer extending over the light-emissive region and comprising non-aluminum metal consisting of at least one of lithium, beryllium, boron, sodium, and magnesium.

2. A structure as in claim 1, wherein the non-aluminum metal consists substantially of beryllium.

3. A structure as in claim 1, wherein the light-reflective layer further includes aluminum.

4. A structure as in claim 3, wherein the non-aluminum metal is alloyed with aluminum in the light-reflective layer.

5. A structure as in claim 4, wherein the non-aluminum metal constitutes 5–95% by mass of the light-reflective layer.

6. A structure as in claim 3, wherein the light-reflective layer comprises:
   a first sublayer overlying the light-emissive region and consisting primarily of aluminum; and
   a second sublayer overlying the first sublayer and comprising more by mass of the non-aluminum metal than aluminum.

7. A structure as in claim 6 wherein the non-aluminum metal in the second sublayer consists primarily of at least one of beryllium, boron, and magnesium.

8. A structure as in claim 6 wherein the non-aluminum metal in the second sublayer consists substantially of beryllium.

9. A structure as in claim 1 wherein the light-reflective layer also extends over the light-blocking region.

10. A structure as in claim 1 further including an electron-emitting device for emitting electrons which pass through the light-reflective layer and strike the light-emissive region, causing it to emit visible light.

11. A structure comprising:
    a plate;
    a light-emissive region overlying the plate where the plate is generally transmissive of visible light;
    a light-blocking region overlying the plate generally lateral to the light-emissive region, the light-blocking region being generally non-transmissive of visible light; and
    a light-reflective getting layer extending over the light-emissive region and comprising at least one of magnesium, chromium, manganese, cobalt, copper, molybdenum, palladium, silver, platinum, and lead.

12. A structure as in claim 11 wherein the light-reflective getter layer comprises an alloy of at least two of magnesium, chromium, manganese, cobalt, copper, palladium, silver, and lead.

13. A structure as in claim 11 wherein the light-reflective getter layer also extends over the light-blocking region.

14. A structure as in claim 11 wherein the light-reflective getter layer sorbs sulfur.

15. A structure as in claim 11 further including an electron-emitting device for emitting electrons which pass through the light-reflective layer and strike the light-emissive region, causing it to emit visible light.

16. A structure comprising:
    a plate;
    a light-emissive region overlying the plate where the plate is generally transmissive of visible light;
    a light-blocking region overlying the plate generally lateral to the light-emissive region, the light-blocking region being generally non-transmissive of visible light;
    a light-reflective layer extending over the light-emissive region; and
    an overcoat layer overlying the light-reflective layer, providing at least one of (a) lower chemical reactivity than an imaginary native coating of aluminum oxide formed along an imaginary aluminum layer and subjected to electrons which impinge on the native coating with generally the same energies and at generally the same angles as electrons impinge on the overcoat layer from above the structure, (b) lower secondary electron emission per unit area than the native coating, and (c) lower electron backscattering per unit area than the native coating, and comprising at least one of beryllium, boron, magnesium, silicon, chromium, cobalt, germanium, ruthenium, silver, tin, neodymium, iridium, platinum, gold, lead, lithium-aluminum, beryllium-boron, beryllium carbide, beryllium oxide, beryllium-aluminum, boron nitride, boron oxide, boron-magnesium, boron-aluminum, sodium carbide, sodium nitride, sodium oxide, sodium-aluminum, magnesium-aluminum, aluminum nitride, silicon nitride, silicon oxide, vanadium oxide, vanadium phosphorus oxide, chromium oxide, copper oxide, molybdenum oxide, silver oxide, cerium oxide, neodymium oxide, and europium oxide.

17. A structure as in claim 16 wherein the overcoat layer comprises chromium.

18. A structure as in claim 16 wherein the overcoat layer comprises chromium oxide.

19. A structure as in claim 16 wherein the overcoat layer provides lower chemical reactivity than the native coating.

20. A structure as in claim 19 wherein the overcoat layer comprises at least one of beryllium, boron, silicon, chromium, cobalt, germanium, ruthenium, silver, tin, iridium, platinum, gold, lead, boron nitride, boron oxide, aluminum nitride, silicon nitride, silicon oxide, and chromium oxide.

21. Structure as in claim 19 wherein the overcoat layer comprises at least one of beryllium, boron, silicon, chromium, germanium, silver, tin, gold, lead, boron nitride, boron oxide, aluminum nitride, silicon nitride, silicon oxide, and chromium oxide.

22. A structure as in claim 19 wherein the overcoat layer comprises at least one of beryllium, boron, chromium, silver, gold, boron nitride, boron oxide, silicon nitride, silicon oxide, and chromium oxide.

23. A structure as in claim 19 wherein the overcoat layer comprises an alloy of one of (a) oxide of chromium and aluminum and (b) oxynitride of at least two of boron, aluminum, silicon, and chromium.

24. A structure as in claim 19 wherein the overcoat layer also provides lower secondary electron emission per unit area than the native coating.

25. A structure as in claim 19 wherein the overcoat layer also provides lower electron backscattering per unit area than the native coating.

26. A structure as in claim 16 wherein the overcoat layer provides lower secondary electron emission per unit area than the native coating.

27. A structure as in claim 26 wherein the overcoat layer comprises at least one of chromium, silver, neodymium, gold, beryllium oxide, vanadium oxide, vanadium phosphorus oxide, chromium oxide, copper oxide, molybdenum oxide, silver oxide, cerium oxide, neodymium oxide, and europium oxide.

28. A structure as in claim 26 wherein the overcoat layer comprises at least one of chromium, silver, gold, beryllium oxide, vanadium oxide, vanadium phosphorus oxide, chromium oxide, silver oxide, cerium oxide, neodymium oxide, and europium oxide.

29. A structure as in claim 26 wherein the overcoat layer comprises at least one of chromium, beryllium oxide, vanadium oxide, chromium oxide, cerium oxide, and neodymium oxide.

30. A structure as in claim 26 wherein the overcoat layer comprises an alloy of oxide of at least two of vanadium, chromium, cerium, and neodymium.

31. A structure as in claim 26 wherein the overcoat layer comprises an alloy of at least two of vanadium, chromium, cerium, and neodymium.

32. A structure as in claim 26 wherein the overcoat layer also provides lower electron backscattering per unit area than the native coating.

33. A structure as in claim 16 wherein the overcoat layer provides lower electron backscattering per unit area than the native coating.

34. A structure as in claim 33 wherein the overcoat layer is of lower average volumetric proton density than the light-reflective layer.

35. A structure as in claim 34 wherein the light-reflective layer comprises aluminum, the overcoat layer comprising at least one of beryllium, boron, magnesium, and a compound of at least one of beryllium, boron, and sodium with at least one of carbon, nitrogen, and oxygen.

36. A structure as in claim 33 wherein the overcoat layer comprises at least one of beryllium, boron, magnesium, lithium-aluminum, beryllium-boron, beryllium carbide, beryllium-aluminum, boron nitride, boron oxide, boron-magnesium, boron-aluminum, sodium carbide, sodium nitride, sodium oxide, sodium-aluminum, magnesium-aluminum, and aluminum nitride.

37. A structure as in claim 33 wherein the overcoat layer comprises at least one of beryllium, boron, magnesium, boron nitride, boron oxide, boron-magnesium, and aluminum nitride.

38. A structure as in claim 33 wherein the overcoat layer comprises at least one of boron and boron oxide.

39. A structure as in claim 33 wherein the light-reflective layer comprises aluminum.

40. A structure as in claim 39 wherein the light-reflective layer further includes non-aluminum metal consisting of at least one of lithium, beryllium, boron, sodium, and magnesium.

41. A structure as in claim 39 further including aluminum oxide situated between the light-reflective and overcoat layers.

42. A structure as in claim 16 wherein the overcoat layer extends over the light-emissive region.

43. A structure as in claim 16 wherein the light-reflective layer also extends over the light-blocking region.

44. A structure as in claim 16 further including an electron-emitting device for emitting electrons which pass through the light-reflective layer and strike the light-emissive region, causing it to emit visible light.

45. A structure comprising:

a plate;

a light-emissive region overlying the plate where the plate is generally transmissive of visible light;

a light-blocking region overlying the plate generally lateral to the light-emissive region, the light-blocking region being generally non-transmissive of visible light;

a light-reflective layer extending over the light-emissive region; and an overcoat layer overlying the light-reflective layer and comprising at least one of beryllium, boron, silicon, chromium, cobalt, germanium, ruthenium, silver, tin, iridium, platinum, gold, lead, boron nitride, boron oxide, aluminum nitride, silicon nitride, silicon oxide, and chromium oxide.

46. A structure comprising:

a plate;

a light-emissive region overlying the plate where the plate is generally transmissive of visible light;

a light-blocking region overlying the plate generally lateral to the light-emissive region, the light-blocking region being generally non-transmissive of visible light;

a light-reflective layer extending over the light-emissive region; and an overcoat layer overlying the light-reflective layer and comprising at least one of chromium, silver, neodymium, gold, beryllium oxide, vanadium oxide, vanadium phosphorus oxide, chromium oxide, copper oxide, molybdenum oxide, silver oxide, cerium oxide, neodymium oxide, and europium oxide.

47. A structure comprising:

a plate;

a light-emissive region overlying the plate where the plate is generally transmissive of visible light;

a light-blocking region overlying the plate generally lateral to the light-emissive region, the light-blocking region being generally non-transmissive of visible light;

a light-reflective layer extending over the light-emissive region; and an overcoat layer overlying the light-reflective layer and comprising at least one of beryllium, boron, magnesium, lithium-aluminum, beryllium-boron, beryllium carbide, beryllium-aluminum, boron nitride, boron oxide, boron-magnesium, boron-aluminum, sodium carbide, sodium nitride, sodium oxide, sodium-aluminum, magnesium-aluminum, and aluminum nitride.

48. A structure comprising:

a plate;

a light-emissive region overlying the plate where the plate is generally transmissive of visible light;

a light-blocking region overlying the plate generally lateral to the light-emissive region, the light-blocking region being generally non-transmissive of visible light;

a light-reflective layer extending over the light-emissive region;

a lower overcoat layer overlying the light-reflective layer; and an upper overcoat layer overlying the lower overcoat layer, the two overcoat layers being of different chemical composition, each overcoat layer providing at least one of (a) lower chemical reactivity than an imaginary native coating of aluminum oxide formed along an imaginary aluminum layer and subjected to electrons which impinge on the native coating with generally the same energies and at generally the same angles as electrons impinge on the overcoat layers from above the structure, (b) lower secondary electron emission per unit area than the native coating, and (c) lower electron backscattering per unit area than the native coating.

49. A structure as in claim 48 wherein the lower overcoat layer provides lower electron backscattering per unit area than the native coating.

50. A structure as in claim 49 wherein the lower overcoat layer comprises at least one of beryllium, boron, carbon, magnesium, lithium-aluminum, beryllium-boron, beryllium carbide, beryllium-aluminum, boron nitride, boron oxide, boron-magnesium, boron-aluminum, sodium carbide, sodium nitride, sodium oxide, sodium-aluminum, magnesium-aluminum, aluminum carbide, and aluminum nitride.

51. A structure as in claim 49 wherein the lower overcoat layer comprises at least one of beryllium, boron, carbon, magnesium, boron nitride, boron oxide, boron-magnesium, aluminum carbide, and aluminum nitride.

52. A structure as in claim 49 wherein the lower overcoat layer comprises at least one of boron, carbon, and boron oxide.

53. A structure as in claim 48 wherein a specified one of the overcoat layers provides lower secondary electron emission per unit area than the native coating.

54. A structure as in claim 53 wherein the specified overcoat layer comprises at least one of carbon, chromium, silver, barium, neodymium, gold, beryllium oxide, vanadium oxide, vanadium phosphorus oxide, chromium oxide, copper oxide, molybdenum oxide, silver oxide, cerium oxide, neodymium oxide, and europium oxide.

55. A structure as in claim 53 wherein the specified overcoat layer comprises at least one of carbon, chromium, silver, barium, gold, beryllium oxide, vanadium oxide, vanadium phosphorus oxide, chromium oxide, silver oxide, cerium oxide, neodymium oxide, and europium oxide.

56. A structure as in claim 53 wherein the specified overcoat layer comprises at least one of carbon, chromium, beryllium oxide, vanadium oxide, chromium oxide, cerium oxide, and neodymium oxide.

57. A structure as in claim 48 wherein the upper overcoat layer provides lower chemical reactivity than the native coating.

58. A structure as in claim 57 wherein the upper overcoat layer comprises at least one of beryllium, boron, carbon, silicon, chromium, iron, cobalt, nickel, germanium, niobium, molybdenum, ruthenium, silver, tin, neodymium, iridium, platinum, gold, lead, boron nitride, boron oxide, aluminum nitride, silicon nitride, silicon oxide, and chromium oxide.

59. A structure as in claim 57 wherein the upper overcoat layer comprises at least one of beryllium, boron, carbon, silicon, chromium, germanium, silver, tin, gold, lead, boron nitride, boron oxide, aluminum nitride, silicon nitride, silicon oxide, and chromium oxide.

60. A structure as in claim 57 wherein the upper overcoat layer comprises at least one of beryllium, boron, carbon, chromium, silver, gold, boron nitride, boron oxide, aluminum nitride, silicon nitride, silicon oxide, and chromium oxide.

61. A structure as in claim 57 wherein the lower overcoat layer provides lower secondary electron emission per unit area than the native coating.

62. A structure as in claim 57 wherein the lower overcoat layer provides lower electron backscattering per unit area than the native coating.

63. A structure as in claim 62 including further an intermediate overcoat layer situated between, and of different chemical composition than, the other two overcoat layers, the intermediate overcoat layer providing lower secondary electron emission per unit area than the native coating.

64. A structure as in claim 57 wherein the lower overcoat layer provides both lower secondary electron emission per unit area than the native coating and lower electron backscattering per unit area than the native coating.

65. A structure as in claim 48 wherein the upper overcoat layer provides both lower chemical reactivity than the native coating and lower secondary electron emission per unit area than the native coating.

66. A structure as in claim 65 wherein the lower overcoat layer provides lower electron backscattering per unit area than the native coating.

67. A structure as in claim 66 wherein the lower overcoat layer also provides lower secondary electron emission per unit area than the native coating.

68. A structure as in claim 48 wherein the upper and lower overcoat layers respectively provide lower secondary electron emission per unit area than the native coating and lower electron backscattering per unit area than the native coating.

69. A structure as in claim 48 wherein the light-reflective layer comprises aluminum.

70. A structure as in claim 69 further including aluminum oxide situated between the light-reflective layer and the lower overcoat layer.

71. A structure as in claim 48 wherein the overcoat layers extend over the light-emissive region.

72. A structure as in claim 48 wherein the light-reflective layer also extends over the light-blocking region.

73. A structure as in claim 48 further including an electron-emitting device for emitting electrons which pass through the light-reflective layer and strike the light-emissive region, causing it to emit visible light.

74. A structure comprising:

a plate;

a light-emissive region overlying the plate where the plate is generally transmissive of visible light;

a light-blocking region overlying the plate generally lateral to the light-emissive region, the light-blocking region being generally non-transmissive of visible light;

a light-reflective layer extending over the light-emissive region; and an overcoat getter overlying the light-reflective layer and comprising at least one of magnesium, chromium, cobalt, copper, palladium, silver, platinum, lead, and oxide of at least one of magnesium, chromium, manganese, cobalt, nickel, and lead.

75. A structure as in claim 74 wherein the overcoating getter layer comprises an alloy of oxide of at least two of magnesium, chromium, manganese, cobalt, nickel, and lead.

76. A structure as in claim 74 wherein the overcoating getter layer comprises an alloy of at least two of magnesium, chromium, manganese, cobalt, nickel, copper, palladium, silver, and lead.

77. A structure as in claim 74 wherein the overcoating getter layer overlies the light-reflective layer above largely all of the light-emissive region.

78. A structure as in claim 74 wherein the overcoating getter layer sorbs sulfur.

79. A structure as in claim 74 further including an electron-emitting device for emitting electrons which pass through the light-reflective layer and strike the light-emissive region, causing it to emit visible light.

80. A structure comprising:

a plate;

a light-emissive region overlying the plate where the plate is generally transmissive of visible light;

a light-blocking region overlying the plate generally lateral to the light-emissive region, the light-blocking region being generally non-transmissive of visible light;

a light-reflective layer extending over the light-emissive and light-blocking regions; and an overcoating getter layer overlying the light-reflective layer above the light-blocking region and comprising at least one of magnesium, chromium, cobalt, copper, palladium, silver, platinum, lead, and oxide of at least one of magnesium, chromium, manganese, cobalt, nickel, and lead.

81. A structure as in claim 80 wherein the overcoating getter layer sorbs sulfur.

82. A structure as in claim 80 wherein the overcoating getter layer overlies the light-reflective layer above no more than part of the light-emissive region.

83. A structure as in claim 80 wherein the overcoating getter layer overlies the light-reflective layer above largely all of the light-emissive region.

84. A structure comprising:

a plate;

a light-emissive region overlying the plate;

a light-blocking region overlying the plate generally lateral to the light-emissive region, the light-blocking region being generally non-transmissive of visible light;

an undercoat layer overlying the light-emissive region and being generally transmissive of visible light; and a light-reflective layer overlying the undercoat layer and extending above the light-emissive region, the undercoat layer more strongly inhibiting the light-reflective layer from undergoing chemical reactions along where it is closest to the undercoat layer than does an imaginary native coating of aluminum oxide formed along an imaginary aluminum layer inhibit the aluminum layer from undergoing chemical reactions along its interface with the native coating.

85. A structure as in claim 84 wherein the undercoat layer more strongly inhibits chemical reactions of the light-reflective layer with oxygen than does the native coating inhibit chemical reactions of the aluminum layer with oxygen.

86. A structure as in claim 84 wherein the undercoat layer comprises at least one of silicon nitride, silicon oxide, magnesium oxide, aluminum nitride, chromium oxide, zirconium oxide, indium oxide, indium tin oxide, and tin oxide.

87. A structure as in claim 84 wherein the undercoat layer comprises at least one of silicon nitride, silicon oxide, aluminum nitride, and chromium oxide.

88. A structure as in claim 84 wherein the light-reflective layer comprises aluminum.

89. A structure as in claim 84 further including an overcoat layer overlying the light-reflective layer above the light-emissive region, the overcoat layer providing at least one of (a) lower chemical reactivity than the native coating as electrons impinge on the native coating with generally the same energies and at generally the same angles as electrons impinge on the overcoat layer, (b) lower secondary electron emission per unit area than the native coating, and (c) lower electron backscattering per unit area than the native coating.

90. A structure as in claim 84 further including an electron-emitting device for emitting electrons which pass through the light-reflective layer and strike the light-emissive region, causing it to emit visible light.

91. A structure comprising:

a plate;

a light-emissive region overlying the plate where the plate is generally transmissive of visible light;

a light-blocking region overlying the plate generally lateral to the light-emissive region, the light-blocking region being generally non-transmissive of visible light;

an undercoat layer overlying the light-emissive region, being generally transmissive of visible light, and comprising at least one of silicon nitride, silicon oxide, magnesium oxide, aluminum nitride, aluminum oxide of greater thickness than an imaginary native coating of aluminum oxide formed along an imaginary aluminum layer, chromium oxide, zirconium oxide, indium oxide, indium tin oxide, and tin oxide; and a light-reflective layer overlying the undercoat layer and extending above the light-emissive region.

92. A structure comprising:

a plate;

a light-emissive region overlying the plate where the plate is generally transmissive of visible light;

a light-blocking region overlying the plate generally lateral to the light-emissive region, the light-blocking region being generally non-transmissive of visible light;

an undercoating getter layer overlying the light-blocking region and comprising at least one of magnesium, chromium, manganese, cobalt, nickel, copper, palladium, silver, platinum, lead, and oxide of at least one of magnesium, chromium, manganese, cobalt, nickel, and lead; and a light-reflective layer extending over the getter layer above the light-blocking region.

93. A structure as in claim 92 wherein the undercoating getter layer comprises an alloy of oxide of at least two of magnesium, chromium, manganese, cobalt, nickel, and lead.

94. A structure as in claim 92 wherein the undercoating getter layer comprises an alloy of at least two of magnesium, chromium, manganese, cobalt, nickel, copper, palladium, silver, and lead.

95. A structure as in claim 92 wherein the undercoating getter layer sorbs sulfur.

96. A structure as in claim 95 wherein the undercoating getter layer extends above no more than part of the light-emissive region.

97. A structure as in claim 92 further including an electron-emitting device for emitting electrons which pass through the light-reflective layer and strike the light-emissive region, causing it to emit visible light.

98. A structure as in claim 1 wherein the light-blocking region absorbs visible light.

99. A structure as in claim 1 wherein the light-blocking region substantially laterally surrounds the light-emissive region as viewed perpendicular to the plate.

100. A structure as in claim 1 further including at least one additional light-emissive region overlying the plate where the plate is generally transmissive of visible light, each light-emissive legion spaced laterally apart from each other light-emissive region, the light-blocking region laterally surrounding each light-emissive region as viewed perpendicular to the plate, the light-reflective layer extending above each additional light-emissive region.

101. A structure as in claim 11 wherein the light-blocking region absorbs visible light.

102. A structure as in claim 11 wherein the light-blocking region substantially laterally surrounds the light-emissive region as viewed perpendicular to the plate.

103. A structure as in claim 11 further including at least one additional light-emissive region overlying the plate where the plate is generally transmissive of visible light, each light-emissive region spaced laterally apart from each other light-emissive region, the light-blocking region laterally surrounding each light-emissive region as viewed perpendicular to the plate, the light-reflective layer extending above each additional light-emissive region.

104. A structure as in claim 16 wherein the overcoat layer extends above the light-emissive and light-blocking regions.

105. A structure as in claim 16 wherein the overcoat layer extends above the light-blocking region and no more than partially above the light-emissive region.

106. A structure as in claim 16 wherein the light-blocking region absorbs visible light.

107. A structure as in claim 16 wherein the light-blocking region substantially laterally surrounds the light-emissive region as viewed perpendicular to the plate.

108. A structure as in claim 16 further including at least one additional light-emissive region overlying the plate where the plate is generally transmissive of visible light, each light-emissive region spaced laterally apart from each other light-emissive region, the light-blocking region laterally surrounding each light-emissive region as viewed perpendicular to the plate, the light-reflective layer extending above each additional light-emissive region.

109. A structure as in claim 45 wherein the overcoat layer extends above the light-emissive and light-blocking regions.

110. A structure as in claim 45 further including at least one additional light-emissive region overlying the plate where the plate is generally transmissive of visible light, each light-emissive region spaced laterally apart from each other light-emissive region, the light-blocking region laterally surrounding each light-emissive region as viewed perpendicular to the plate, the light-reflective layer extending above each additional light-emissive region.

111. A structure as in claim 46 wherein the overcoat layer extends above the light-emissive and light-blocking regions.

112. A structure as in claim 46 further including at least one additional light-emissive region overlying the plate where the plate is generally transmissive of visible light, each light-emissive region spaced laterally apart from each other light-emissive region, the light-blocking region laterally surrounding each light-emissive region as viewed perpendicular to the plate, the light-reflective layer extending above each additional light-emissive region.

113. A structure as in claim 47 wherein the overcoat layer extends above the light-emissive and light-blocking regions.

114. A structure as in claim 47 further including at least one additional light-emissive region overlying the plate where the plate is generally transmissive of visible light, each light-emissive region spaced laterally apart from each other light-emissive region, the light-blocking region laterally surrounding each light-emissive region as viewed perpendicular to the plate, the light-reflective layer extending above each additional light-emissive region.

115. A structure as in claim 48 wherein the overcoat layers extend above the light-emissive and light-blocking regions.

116. A structure as in claim 48 wherein the overcoat layers extend above the light-blocking region and no more than partially above the light-emissive region.

117. A structure as in claim 48 wherein the light-blocking region absorbs visible light.

118. A structure as in claim 48 wherein the light-blocking region substantially laterally surrounds the light-emissive region as viewed perpendicular to the plate.

119. A structure as in claim 48 further including at least one additional light-emissive region overlying the plate where the plate is generally transmissive of visible light, each light-emissive region spaced laterally apart from each other light-emissive region, the light-blocking region laterally surrounding each light-emissive region as viewed perpendicular to the plate, the light-reflective layer extending above each additional light-emissive region.

120. A structure as in claim 74 further including at least one additional light-emissive region overlying the plate where the plate is generally transmissive of visible light, each light-emissive region spaced laterally apart from each other light-emissive region, the light-blocking region laterally surrounding each light-emissive region as viewed perpendicular to the plate, the light-reflective layer extending above each additional light-emissive region.

121. A structure as in claim 80 further including at least one additional light-emissive region overlying the plate where the plate is generally transmissive of visible light, each light-emissive region spaced laterally apart from each other light-emissive region, the light-blocking region laterally surrounding each light-emissive region as viewed perpendicular to the plate, the light-reflective layer extending above each additional light-emissive region.

122. A structure as in claim 84 wherein the undercoat layer extends over the light-blocking region.

123. A structure as in claim 84 wherein the light-reflective layer also extends over the light-blocking region.

124. A structure as in claim 84 wherein the light-blocking region absorbs visible light.

125. A structure as in claim 84 wherein the light-blocking region substantially laterally surrounds the light-emissive region as viewed perpendicular to the plate.

126. A structure as in claim 84 further including at least one additional light-emissive region overlying the plate where the plate is generally transmissive of visible light, each light-emissive region spaced laterally apart from each other light-emissive region, the light-blocking region laterally surrounding each light-emissive region as viewed perpendicular to the plate, the light-reflective layer extending above each additional light-emissive region.

127. A structure as in claim 91 further including at least one additional light-emissive region overlying the plate where the plate is generally transmissive of visible light, each light-emissive region spaced laterally apart from each other light-emissive region, the light-blocking region laterally surrounding each light-emissive region as viewed perpendicular to the plate, the light-reflective layer extending above each additional light-emissive region.

128. A structure as in claim 92 further including at least one additional light-emissive region overlying the plate where the plate is generally transmissive of visible light, each light-emissive region spaced laterally apart from each other light-emissive region, the light-blocking region laterally surrounding each light-emissive region as viewed perpendicular to the plate, the light-reflective layer extending above each additional light-emissive region.

\* \* \* \* \*